(12) United States Patent
Mizukawa et al.

(10) Patent No.: US 6,756,424 B2
(45) Date of Patent: Jun. 29, 2004

(54) COLORING COMPOSITION, INK-JET INK, AND INK JET RECORDING METHOD

(75) Inventors: Yuki Mizukawa, Kanagawa (JP); Keizo Kimura, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/800,572

(22) Filed: Mar. 8, 2001

(65) Prior Publication Data

US 2002/0017217 A1 Feb. 14, 2002

(30) Foreign Application Priority Data

Mar. 27, 2000 (JP) .......................................... 2000-87538

(51) Int. Cl.⁷ ........................ C09D 11/02; C09D 11/10; C08K 5/3415; C08K 5/3432; C08K 5/3462
(52) U.S. Cl. ........................ 523/160; 524/91; 524/94; 524/99; 524/100; 524/102; 524/105; 106/31.47
(58) Field of Search ................................ 523/160, 161; 524/87, 91, 94, 99, 100, 102, 104, 105, 106; 106/31.27, 31.47

(56) References Cited

U.S. PATENT DOCUMENTS

| | | | |
|---|---|---|---|
| 4,246,154 A | | 1/1981 | Yao |
| 4,409,039 A | | 10/1983 | Lepesant et al. |
| 4,597,794 A | | 7/1986 | Ohta et al. |
| 4,665,411 A | * | 5/1987 | Kiritani et al. ............. 503/213 |
| 5,344,933 A | * | 9/1994 | Mikoshiba et al. ......... 544/282 |
| 5,753,017 A | * | 5/1998 | Onodera et al. ......... 106/31.49 |
| 5,837,753 A | | 11/1998 | Caputo |
| 6,020,400 A | | 2/2000 | Anton et al. |
| 6,031,019 A | * | 2/2000 | Tsutsumi et al. ............ 523/160 |
| 6,344,497 B1 | * | 2/2002 | Meyrick et al. ............. 523/160 |
| 6,383,276 B1 | | 5/2002 | Yamakawa et al. |
| 2001/0045176 A1 | | 11/2001 | Kimura et al. |
| 2002/0007762 A1 | | 1/2002 | Arakawa |
| 2002/0067399 A1 | | 6/2002 | Yabuki et al. |
| 2002/0112641 A1 | | 8/2002 | Naruse et al. |

FOREIGN PATENT DOCUMENTS

| | | |
|---|---|---|
| JP | 56-157468 | 12/1981 |
| JP | 58-45272 | 3/1983 |
| JP | 62-207375 | 9/1987 |
| JP | 01-170674 | 7/1989 |
| JP | 03-103484 | 4/1991 |
| JP | 4-18468 | 1/1992 |
| JP | 04-039365 | 2/1992 |
| JP | 6-340835 | 12/1994 |
| JP | 7-268254 | 10/1995 |
| JP | 7-268257 | 10/1995 |
| JP | 7-268260 | 10/1995 |
| JP | 08-183920 | 7/1996 |
| JP | 08269374 | * 10/1996 |
| JP | 08-286340 | 11/1996 |
| JP | 10-110126 | 4/1998 |
| JP | 10-195355 | 7/1998 |
| JP | 10-279873 | 10/1998 |
| JP | 11-286637 | 10/1999 |
| JP | 2000-303009 | 10/2000 |
| JP | 2000-327939 A | * 11/2000 |

OTHER PUBLICATIONS

EPO Search Report dated Sep. 19, 2003 in EP Application No. 01106957.2–2102.

Derwent Publications Ltd., London, GB; Class G02, AN 1996–368459, XP 002253061, JP 08 176482 A, Jul. 9, 1996.

Derwent Publications Ltd., London, GB; Class A97, AN 1995–220901, XP 002253062, JP 07 133454 A, May 23, 1995.

Derwent Publications Ltd., London, GB; Class G02, AN 1996–036042, XP 002253063, JP 07 305010 A, Nov. 21, 1995.

(List continued on next page.)

*Primary Examiner*—Callie Shosho
(74) *Attorney, Agent, or Firm*—Burns, Doane, Swecker & Mathis, L.L.P.

(57) ABSTRACT

An ink-jet ink comprising a coloring composition including an oil-soluble dye represented by general formula (I) below.

General formula (I)

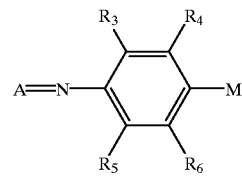

wherein A represents a group represented by general formula II, $R_3$–$R_6$ each independently represents a hydrogen atom or a substituent, M represents —OY or —N($R_7$)($R_8$), Y represents a hydrogen atom or a cation necessary for neutralizing charge of an oxygen ion, $R_7$ and $R_8$ each independently represents one of an alkyl group, aryl group, heterocyclic group, acyl group, alkylsulfonyl group, and arylsulfonyl group, and general formula (II) is as follows:

General formula (II)

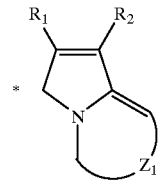

wherein $R_1$ represents a hydrogen atom or a substituent, $R_2$ represents a substituent, $Z_1$ represents a group of non-metal atoms necessary for forming a 6-membered nitrogen-containing heterocycle, and * represents a bonding position.

18 Claims, No Drawings

OTHER PUBLICATIONS

Derwent Publications Ltd., London, GB; Class E16, AN 1996–036040, XP 002253064, JP 07 305007 A, Nov. 21, 1995.

Derwent Publications Ltd., London, GB; Class A97, AN 1987–097821, XP 002253066, JP 62 045675 A, Feb. 27, 1987.

Derwent Publications Ltd., London, GB; Class E24, AN 1986–110429, XP 002253068, JP 61 053374 A, Mar. 17, 1986.

Derwent Publications Ltd., London, GB; Class E24, AN 1986–110428, XP 002253069, JP 61 053373 A, Mar. 17, 1986.

Derwent Publications Ltd., London, GB; Class E24, AN 1986–110427, XP 002253070, JP 61 053372 A, Mar. 17, 1986.

* cited by examiner

COLORING COMPOSITION, INK-JET INK, AND INK JET RECORDING METHOD

BACKGROUND OF THE INVENTION

1. Field of the Invention

The present invention relates to an aqueous coloring composition containing an oil-soluble dye, to an ink-jet ink, and to an ink jet recording method using the ink-jet ink, and in particular to a coloring composition that is excellent in color reproduction and suitable for aqueous ink, aqueous printing ink, information-recording ink and the like, as well as to an ink-jet ink and an ink jet recording method that are suitable for thermal, piezoelectric, electric field or acoustic ink jetting systems.

2. Description of the Related Art

As computers have spread in recent years, ink jet printers have been widely used for recording on paper, film, cloth and the like not only in offices but also in homes. As ink jet recording inks, oil-soluble inks, water-based inks and solid inks are known. Of these inks, water-based inks are advantageous in view of ease of production and handling, smell, safety and so on. Thus, water-based inks are mainly used.

The reason why water-soluble inks in water-based inks are used is that a water-soluble ink has advantages of ease of production of the ink, superior preservation stability, good color hue and high color density. However, water-soluble dye has poor water resistance, so that bleeding is caused if recording is carried out with the ink on plain paper. As a result, problems that recording quality deteriorates remarkably and light resistance is poor arise.

Thus, for example, Japanese Patent Application Laid-Open (JP-A) No. 56-157468, JP-A No. 4-18468, JP-A No. 10-110126 and JP-A No. 10-195355 suggest water-based inks containing a pigment or a dispersed dye in order to solve the above-mentioned problems.

The water resistance of these water-based inks is improved to some extent. However, it is difficult to say that water resistance is sufficient, and the following problems arise: a dispersant of the pigment or the dispersed dye in the water-based ink has insufficient preservation stability, such that an ink jet opening is easily blocked with the water-based ink; and the water-based inks in general have insufficient hue, and color reproducibility deteriorates because of the insufficient hue.

JP-A No. 58-45272, JP-A No. 6-340835, JP-A No. 7-268254, JP-A No. 7-268257 and JP-A No. 268260 suggest methods of causing a dye to be capsuled in urethane or polyester dispersant particles.

These methods however have the following problems: color reproducibility is insufficient because of insufficient color tone; and dispersion-stability and water resistance of the dye-capsuled polymer dispersant, when the dye is capsuled at a desired level, are not necessarily sufficient.

JP-A No. 11-286637 discloses ink-jet ink that contain as a cyan dye a phenol-type, naphthol-type or pyrrolotriazol-type azomethine. These inks are desirable in having improved light fastness, heat fastness, color reproducibility, dispersion stability of a dye dispersed product, and so on.

SUMMARY OF THE INVENTION

An object of the present invention is to provide a coloring composition that is superior in water resistance, light resistance, preservation stability, color reproducibility, recording density, recording quality and the like, and can attain recording without dependency on kind of paper; an ink-jet ink containing the coloring composition; and an ink jet recording method using the ink-jet ink.

The above-mentioned object can be attained by the following means.

A first aspect of the present invention is an ink-jet ink, which includes a coloring composition including an oil-soluble dye represented by following general formula (I):

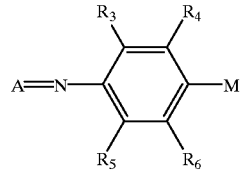

General formula (I)

wherein A represents a group represented by general formula (II), $R_3$–$R_6$ each independently represents a hydrogen atom or a substituent, M represents —OY or —N($R_7$)($R_8$), Y represents a hydrogen atom or a cation necessary for neutralizing charge of an oxygen ion, $R_7$ and $R_8$ each independently represents one of an alkyl group, aryl group, heterocyclic group, acyl group, alkylsulfonyl group, and arylsulfonyl group, $R_7$ and $R_8$ may be bonded to each other to form a ring, any of a pair $R_4$ and $R_7$ and a pair $R_6$ and $R_8$ may be bonded to each other to form a ring, any of a pair $R_3$ and $R_4$ and a pair $R_5$ and $R_6$ may be bonded to each other to form a ring, and general formula (II) is as follows:

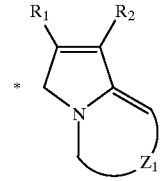

General formula (II)

wherein $R_1$ represents a hydrogen atom or a substituent, $R_2$ represents a substituent, $Z_1$ represents a group of non-metal atoms necessary for forming a 6-membered nitrogen-containing heterocycle, and * represents a bonding position.

A second aspect of the present invention is a coloring composition comprising an oil-soluble dye represented by following general formula (I):

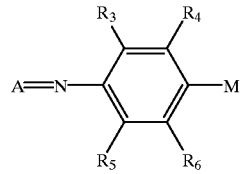

General formula (I)

wherein A represents a group represented by general formula (II), $R_3$–$R_6$ each independently represents a hydrogen atom or a substituent, M represents —OY or —N($R_7$)($R_8$), Y represents a hydrogen atom or a cation necessary for neutralizing charge of an oxygen ion, $R_7$ and $R_8$ each independently represents one of an alkyl group, aryl group, heterocyclic group, acyl group, alkylsulfonyl group, and arylsulfonyl group, $R_7$ and $R_8$ may be bonded to each other to form a ring, any of a pair $R_4$ and $R_7$ and a pair $R_6$ and $R_8$ may be bonded to each other to form a ring, any of a pair $R_3$ and $R_4$ and a pair $R_5$ and $R_6$ may be bonded to each other to form a ring, and general formula (II) is as follows:

General formula (II)

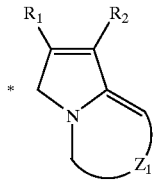

wherein $R_1$ represents a hydrogen atom or a substituent, $R_2$ represents a substituent, $Z_1$ represents a group of non-metal atoms necessary for forming a 6-membered nitrogen-containing heterocycle, and * represents a bonding position.

A third aspect of the present invention is an ink jet recording method wherein recording is performed using an ink-jet ink that includes a coloring composition including an oil-soluble dye represented by following general formula (I):

General formula (I)

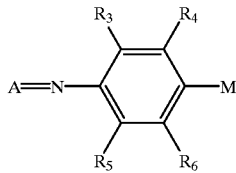

wherein A represents a group represented by general formula (II), $R_3$–$R_6$ each independently represents a hydrogen atom or a substituent, M represents —OY or —N($R_7$)($R_8$), Y represents a hydrogen atom or a cation necessary for neutralizing charge of an oxygen ion, $R_7$ and $R_8$ each independently represents one of an alkyl group, aryl group, heterocyclic group, acyl group, alkylsulfonyl group, and arylsulfonyl group, $R_7$ and $R_8$ may be bonded to each other to form a ring, any of a pair $R_4$ and $R_7$ and a pair $R_6$ and $R_8$ may be bonded to each other to form a ring, any of a pair $R_3$ and $R_4$ and a pair $R_5$ and $R_6$ may be bonded to each other to form a ring, and general formula (II) is as follows:

General formula (II)

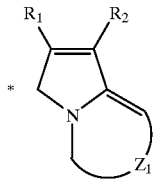

wherein $R_1$ represents a hydrogen atom or a substituent, $R_2$ represents a substituent, $Z_1$ represents a group of non-metal atoms necessary for forming a 6-membered nitrogen-containing heterocycle, and * represents a bonding position.

DESCRIPTION OF THE PREFERRED EMBODIMENTS

The following will describe the coloring composition, the ink-jet ink and the ink jet recording method of the present invention in detail.

Coloring Composition

The coloring composition of the present invention includes an oil-soluble dye represented by the general formula (I). Hereinafter, the oil-soluble dye represented by the general formula (I) will be described.

Oil-soluble Dye Represented by the General Formula (I)

In the general formula (I), A represents a group represented by the general formula (II).

In the general formula (II), $R_1$ represents a hydrogen atom or a substituent. Specifically, examples thereof include a hydrogen atom; halogen atoms (for example, fluorine, chlorine and bromine); alkyl groups (straight-chain, branched-chain or cyclic alkyl groups having preferably 1–48 carbon atoms and more preferably 1–30 carbon atoms, for example, methyl, ethyl, propyl, butyl, octyl, dodecyl, hexadecyl, octadecy, isopropyl, 2-ethylhexyl, t-butyl, 1-adamantyl, cyclopropyl, cyclopentyl, cyclohexyl, and 1-norbornyl); alkenyl groups (alkenyl groups having preferably 2–48 carbon atoms and more preferably 2–30 carbon atoms, for example, vinyl, allyl, and 3-butene-1-yl); aryl groups (aryl groups having preferably 6–48 carbon atoms and more preferably 6–30 carbon atoms, for example, phenyl, 1-naphthyl and 2-naphthyl); heterocyclic groups (5-, 6-, 7- or 8-member heterocyclic groups having preferably 1–32 carbon atoms and more preferably 1–18 carbon atoms, for example, 2-thienyl, 4-pyridyl, 2-furyl, 2-pyrimidinyl, 1-pyridyl, 2-benzothiazolyl, 1-imidazolyl, 1-pyrazolyl, benzotriazol-2-yl); a cyano group; silyl groups (silyl groups having preferably 3–36 carbon atoms and more preferably 3–24 carbon atoms, for example, trimethylsilyl, triethylsilyl, tributylsilyl, t-butyldimethylsilyl, and t-hexyldimethylsilyl); a hydroxyl group; a nitro group; alkoxy groups (alkoxy groups having preferably 1–48 carbon atoms and more preferably 1–30 carbon atoms, for example, methoxy, ethoxy, 1-butoxy, 2-butoxy, isopropoxy, t-butoxy, dodecyloxy, cyclopentyloxy, and cyclohexyloxy); aryloxy groups (aryloxy groups having preferably 6–48 carbon atoms and more preferably 6–30 carbon atoms, for example, phenoxy and 2-naphtoxy); heterocyclic oxy groups (heterocyclic oxy groups having preferably 1–48 carbon atoms and more preferably 1–30 carbon atoms, for example, 1-phenyltetrazol-5-oxy, 2-tetrahydropyranyloxy, 2-furyloxy); silyloxy groups (silyloxy groups having preferably 1–38 carbon atoms and more preferably 3–24 carbon atoms, for example, trimethylsilyloxy, t-butyldimethylsilyloxy, diphenylmethylsilyloxy); acyloxy groups (acyloxy having preferably 2–48 carbon atoms and more preferably 2–38 carbon atoms, for example, acetoxy, pivaloyloxy, benzoyloxy, and dodecanoyloxy); alkoxycarbonyloxy groups (alkoxycarbonyloxy groups having preferably 2–48 carbon atoms and more preferably 2–38 carbon atoms, for example, ethoxycarbonyloxy, t-butoxycarbonyloxy, and cyclohexyloxycarbonyloxy); aryloxycarbonyloxy groups (aryloxycarbonyloxy groups having preferably 7–48 carbon atoms and more preferably 7–38 carbon atoms, for example, phenoxycarbonyloxy); carbamoyloxy groups (carbamoyl groups having preferably 1–48 carbon atoms and more preferably 1–30 carbon atoms, for example, N,N-dimethylcarbamoyloxy and N-butylcarbamoyloxy); sulfamoyloxy groups (sulfamoyloxy groups having preferably 1–48 carbon atoms and more preferably 1–30 carbon atoms, for example, N,N-diethylsulfamoyloxy and N-propylsulfamoyloxy); alkylsulfonyloxy groups (alkylsulfonyloxy groups having preferably 1–48 carbon atoms and more preferably 1–30 carbon atoms, for example, methylsulfonyloxy, hexadecylsulfonyl and cyclohexylsulfonyloxy); arylsulfonyloxy groups (arylsulfonyloxy groups having preferably 6–48 carbon atoms and more preferably 6–30 carbon atoms, for example, phenylsulfonyloxy); a carboxyl group; acyl groups (acyl groups having preferably 1–48 carbon atoms and more preferably 1–30 carbon atom, for example, formyl, acetyl, pivaloyl, benzoyl, tetradecanoyl and cyclohexycarbonyl); alkoxycarbonyl groups (alkoxycarbonyl groups having preferably 2–48 carbon atoms and more preferably 2–38 carbon atoms, for example, methoxycarbonyl, ethoxycarbonyl, octadecyloxycarbonyl, and cyclohexyloxycarbonyl); aryloxycarbonyl groups (aryloxycarbonyl groups having preferably 7–48 carbon atoms and more preferably 7–30 carbon atoms, for example, phenoylcarbonyl); carbamoyl groups (carbamoyl groups having preferably 1–48 carbon atoms and more preferably 1–38 carbon atoms, for example, carbamoyl, N,N-dibutylcarbamoyl, N-ethyl-N-octylcarbamoyl, N-propylcarbamoyl, and N,N-dicyclohexylcarbamoyl); amino groups (amino groups having preferably 48 or less carbon atoms and more preferably 30 or less carbon atoms, for example, amino, methylamino, N,N-dioctylamino, tetradecylamino, octadecylamino, and cyclohexylamino); anilino groups (anilino groups having preferably 6–48 carbon atoms and more preferably 6–30 carbon atoms, for example, anilino, and N-methylanilino); heterocyclic amino groups (heterocyclic amino groups having preferably 1–48 carbon atoms and more preferably 1–30 carbon atoms, for example, 4-pyridylamino); carbonamide groups (carbonamide groups having preferably 2–48 carbon atoms and more preferably 2–38 carbon atom, for example, acetoamide, benzamide, and tetradecaneamide); carbamoylamino groups (carbamoylamino groups having preferably 1–48 carbon atoms and more preferably 1–30 carbon atoms, for example, ureido, N,N-dimethylureido, and N-phenylureido); imide groups (imide groups having preferably 48 or less carbon atoms and more preferably 30 or less carbon atoms, for example, N-succinimide, N-phthalimide, and hexadecenylsuccinimide); alkoxycarbonylamino groups (alkoxycarbonylamino groups having preferably 2–48 carbon atoms and more preferably 2–30 carbon atoms, for example, methoxycarbonylamino, ethoxycarbonylamino, t-butoxycarbonylamino, octadecyloxycarbonylamino, and cyclohexyloxycarbonylamino); aryloxycarbonylamino groups (aryloxycarbonylamino groups having preferably 7–48 carbon atoms and more preferably 7–30 carbon atoms, for example phenoxycarbonylamino); sulfonamide groups (sulfonamide having preferably 1–48 carbon atoms and more preferably 1–38 carbon atoms, for example, methanesulfonamide, butanesulfonamide, benzenesulfonamide, hexadecanesulfonamide, and cyclohexylsulfonylamino); sulfamoylamino groups (sulfamoylamino groups having preferably 1–48 carbon atoms and more preferably 1–30 carbon atoms, for example, N,N-dipropylsulfamoylamino, and N-ethyl-N-dodecylsulfamoylamino); azo groups (azo groups having preferably 1–48 carbon atoms and more preferably 1–38 carbon atoms, for example, phenylazo); alkylthio groups (alkylthio groups having preferably 1–48 carbon atoms and more preferably 1–38 carbon atoms, for example, ethylthio, octylthio, and cyclohexylthio); arylthio groups (arylthio groups having preferably 6–48 carbon atoms and more preferably 6–38 carbon atoms, for example phenylthio); heterocyclic thio groups (heterocyclic thio groups having preferably 1–48 carbon atoms and more preferably 1–30 carbon atoms, for example, 2-benzothiazolylthio, 2-pyridylthio, and 1-phenyltetrazolylthio); alkylsulfinyl groups (alkylsulfinyl groups having preferably 1–48 carbon atoms and more preferably 1–30 carbon atoms, for example, dodecanesulfinyl); aryl sulfinyl groups (arylsulfinyl groups having preferably 6–48 carbon atoms and more preferably 6–30 carbon atoms, for example, phenylsulfinyl); alkylsulfonyl groups (alkylsulfonyl groups having preferably 1–48 carbon atoms and more preferably 1–38 carbon atoms, for example, methylsulfonyl, octylsulfonyl, and cyclohexylsulfonyl); arylsulfonyl groups (arylsulfonyl groups having preferably 6–48 carbon atoms and more preferably 6–38 carbon atoms, for example, phenylsulfonyl and 1-naphthylsulfonyl); sulfamoyl groups (sulfamoyl having preferably 48 or less carbon atoms and more preferably 30 or less carbon atoms, for example, sulfamoyl, N,N-dipropylsulfamoyl, and N-ethyl-N-dodecylsulfamoyl); a sulfo group; phosphonyl groups (phosphonyl groups having preferably 1–48 carbon atoms and more preferably 1–30 carbon atoms, for example, phenoxyphosphonyl, octyloxyphosphonyl, and phenylphosphonyl); and phosphonoylaminos (for example, diethoxyphosphonoyl amino, and dioctyloxyphosphonoylamino).

If these substituents can undergo substitution, the same may have one or more further the above-mentioned substituents. In case of substitution by two or more substituents, those substituents may be the same or different.

In the general formula (II), $R_2$ represents a substituent, and the substituent $R_2$ represents the same substituents as described for the substituent $R_1$. If the substituent $R_2$ can undergo further substitution, $R_2$ may have at least one of the same substituents as described for $R_1$. In a case of substitution with two or more substituents, those substitutents may be the same or different.

In the general formula (II), $Z_1$ represents a group of non-metal atoms necessary for forming a 6-membered nitrogen-containing heterocycle.

In the general formula (II), * represents a bonding position.

The groups represented by the general formula (II) are preferably any one of groups represented by the following general formulae (III) and (IV), and the following general formulae (V)–(XX).

General formula (III)

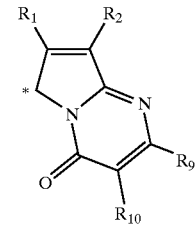

General formula (IV)

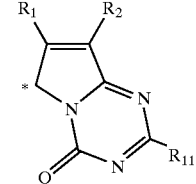

General formula (V)

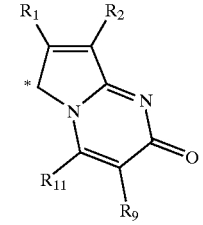

General formula (VI)
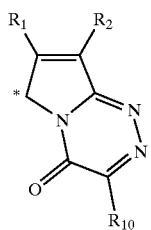
General formula (VII)
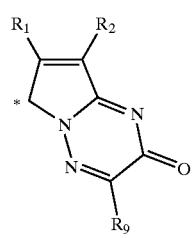
General formula (VIII)
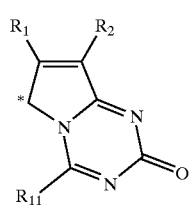
General formula (IX)
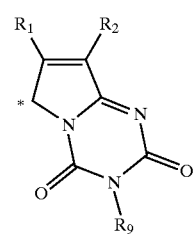
General formula (X)
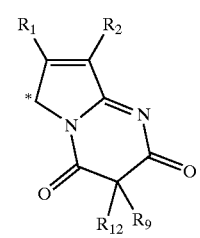
General formula (XI)
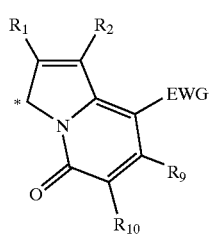
General formula (XII)
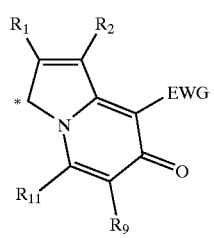
General formula (XIII)
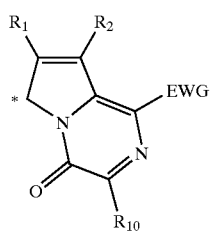
General formula (XIV)
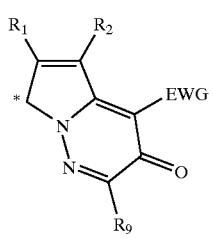
General formula (XV)
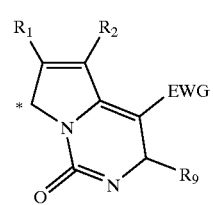
General formula (XVI)
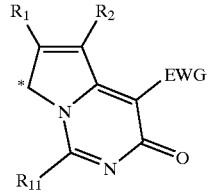
General formula (XVII)
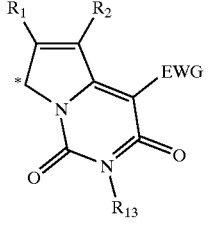
General formula (XVIII)
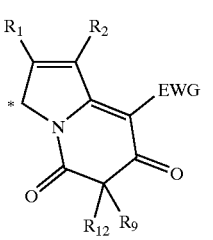
General formula (XIX)
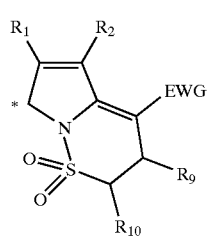

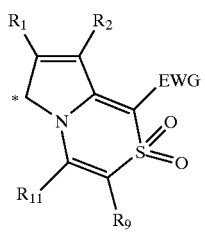

General formula (XX)

In the general formulae (III)–(XX), $R_1$ and $R_2$ are the same as in the general formula (II).

In the general formulae (III)–(XX), $R_9$–$R_{13}$ each independently represents a hydrogen atom or a substituent. The substituents $R_9$–$R_{13}$ represent the same substituents as described for the substituent $R_1$. If the substituents $R_9$–$R_{13}$ can undergo further substitution, they may have at least one of the same substituents as described for $R_1$. In a case of substitution with two or more substituents, those substituents may be the same or different.

In the general formulae (III)–(XX), EWG represents an electron-withdrawing group having a Hammett's substituent constant σp value of 0.35 or more.

Hammett's substituent constant will be described hereinafter. The Hammett rule was an empirical rule proposed by L. P. Hammett in 1935 to discuss quantitatively effects of substituents on reaction or equilibrium of benzene derivatives. The validity of this rule is widely acknowledged at present.

The substituent constant obtained by Hammett's rule is classified into σp and σm values. These values can be found in many general references. The details thereof are described, for example, in "Lange Handbook of Chemistry" (12th version, edited by J. A. Dean in 1979 (McGraw Hill)), and "Chemical Field" (extra number, No. 122, pp. 96–103, 1979 (Nankou-dou)).

In the present invention, only the Hammett's substituent constant σp value is described. This does not mean that substituents used in the present invention are limited to substituents having a value that is already known in such literature as above. Of course, in the present invention, it is possible to use substituents having a Hammett's substituent constant σp value that has not yet been published in the literature but would be within the range of 0.35 or more if the value were to measured on the basis of the Hammett rule.

Examples of the electron-withdrawing group having a σp value of 0.35 or more include cyano (σp value: 0.66); nitro (0.78); carboxyl (0.45); perfluoroalkyl groups such as trifluoromethyl (0.54); acyl groups such as acetyl (0.50), benzoyl (0.43), and formyl (0.42); sulfonyl groups such as trifluoromethanesulfonyl (0.92), methanesulfonyl (0.72) and benzenesulfonyl (0.70); sulfinyl groups such as methanesulfinyl (0.49); carbamoyl groups such as carbamoyl (0.36) and methylcarbamoyl (0.36); alkoxycarbonyl groups such as methoxylcarbonyl (0.45); heteroring residues such as pyrazolyl (0.37) and 1-tetrazolyl (0.50); alkylsulfonyloxy groups such as methanesulfonyloxy (0.36); and phosphoryl groups such as methoxyphosphoryl (0.60) and sulfamoyl (0.57).

Specific examples of the groups (III-1 to 30, and IV-1 to 30) represented in the general formulae (III) and (IV) will be shown hereinafter. The present invention is not limited by these groups.

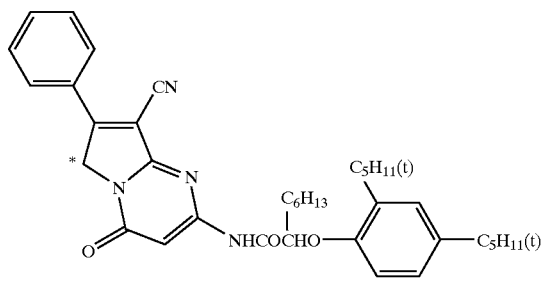

III-1

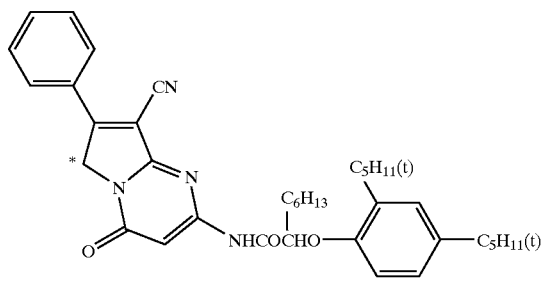

III-2

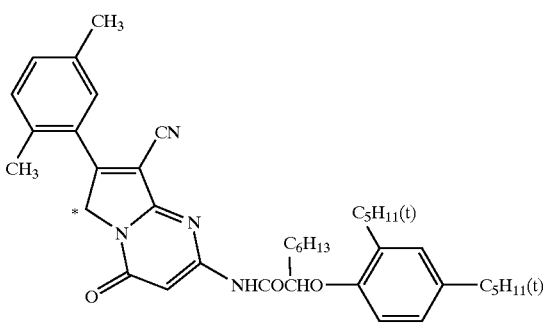

III-3

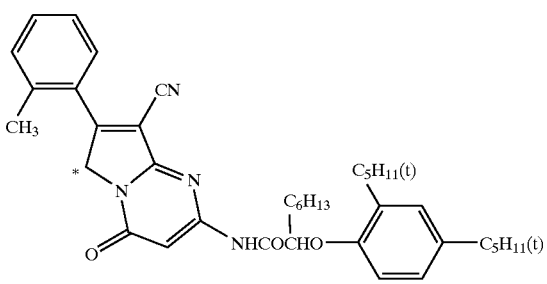

III-4

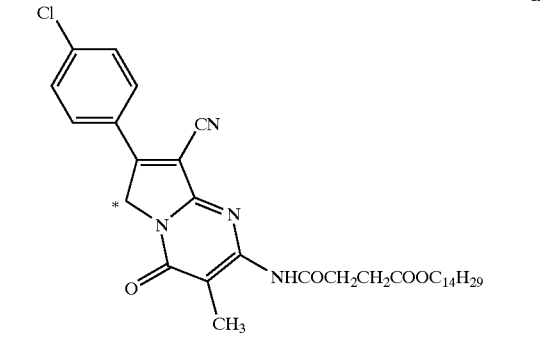

III-5

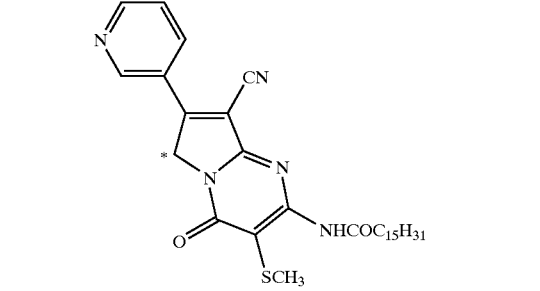

III-6
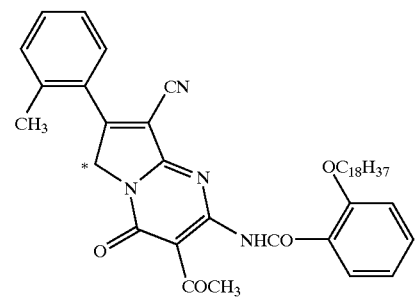
III-7
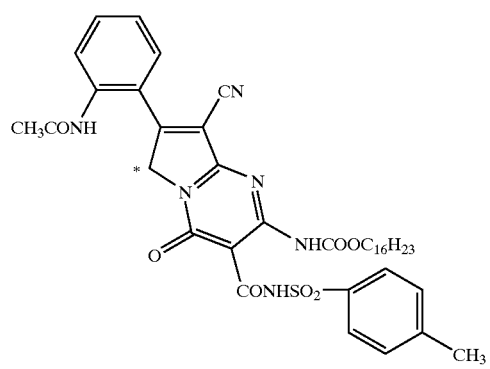
III-8
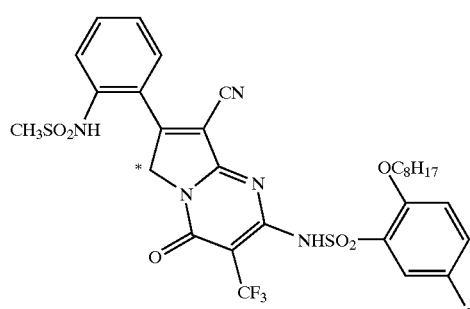
III-9
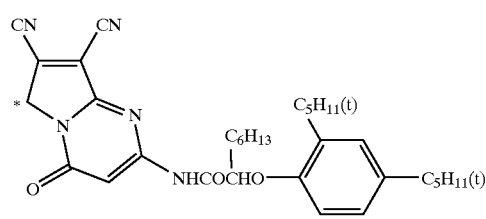
III-10
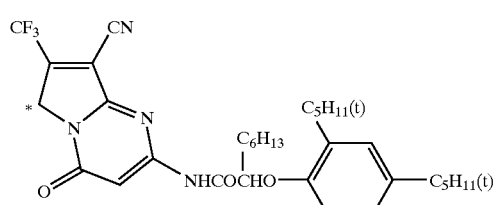
III-11
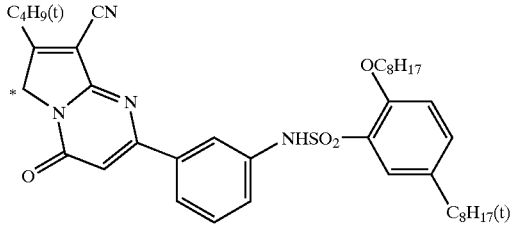
III-12
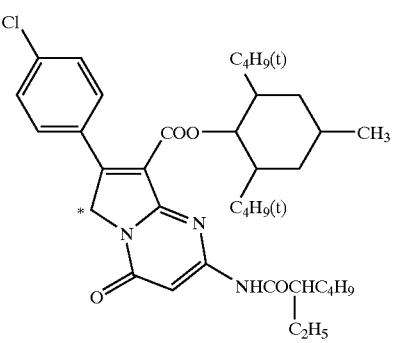
III-13
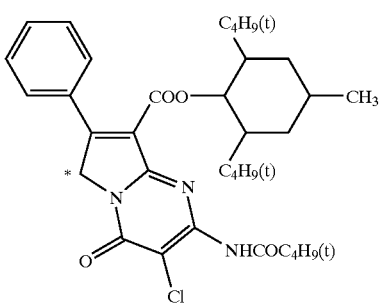
III-14
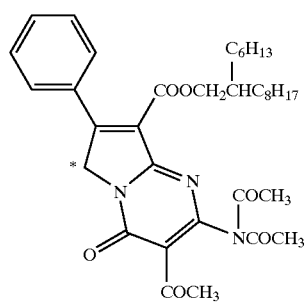
III-15
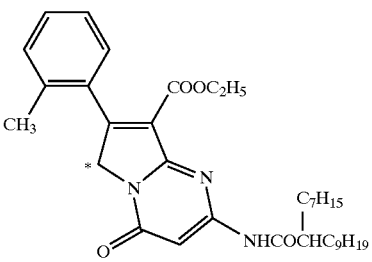

III-16
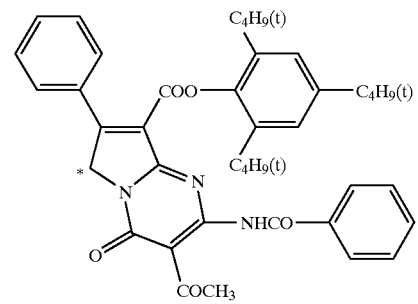
III-17
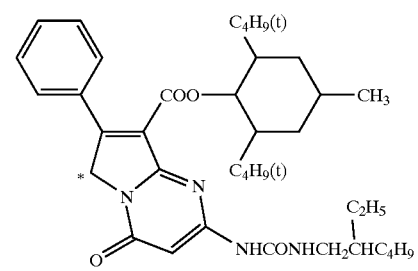
III-18
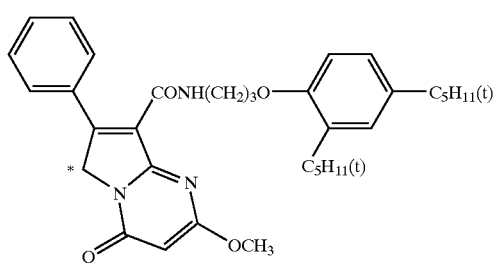
III-19
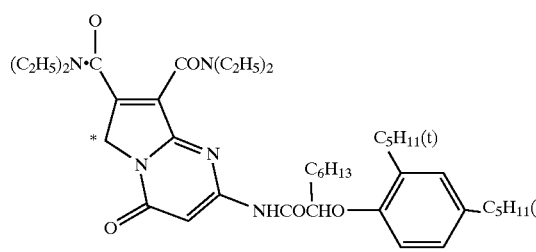
III-20
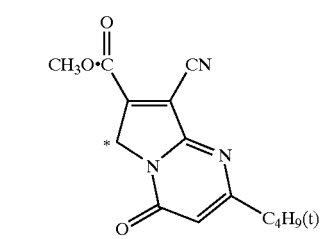
III-21
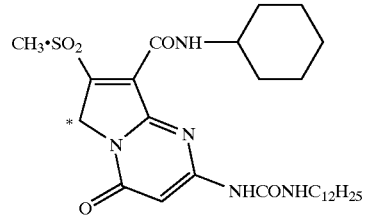
III-22
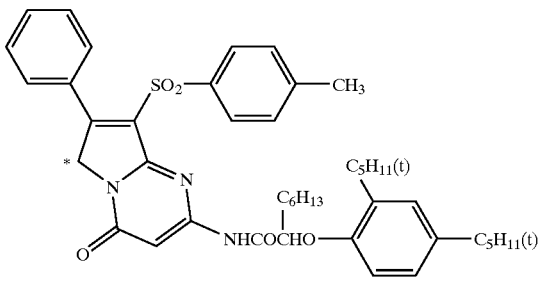
III-23
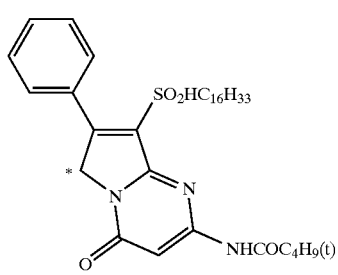
III-24
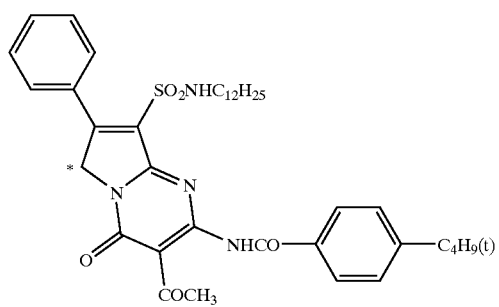
III-25
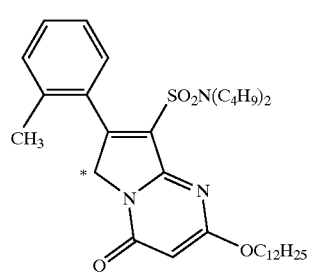
III-26
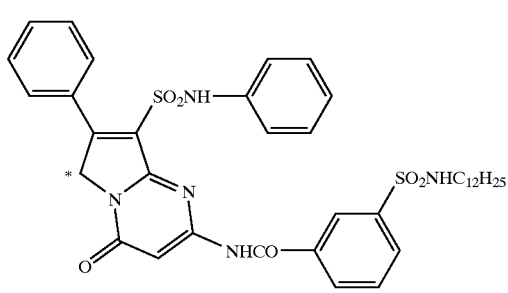

III-27
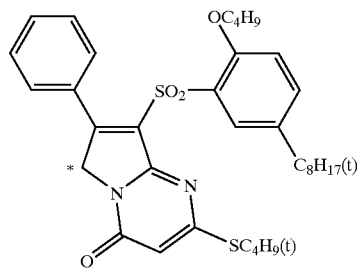
III-28
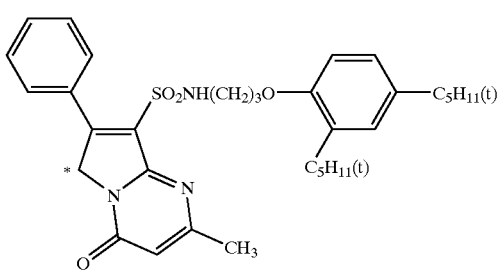
III-29
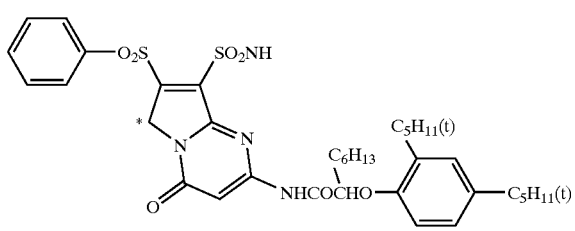
III-30
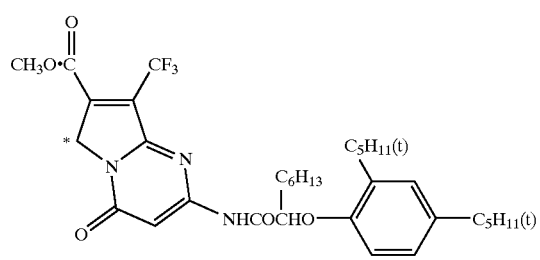
IV-1
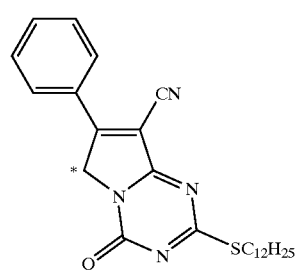
IV-2
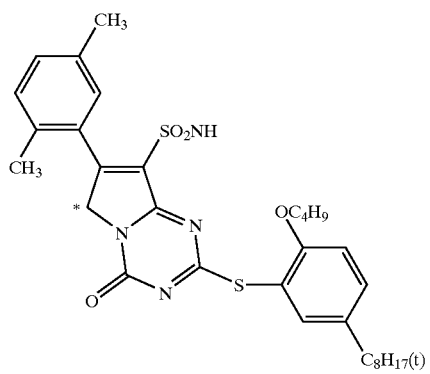
IV-3
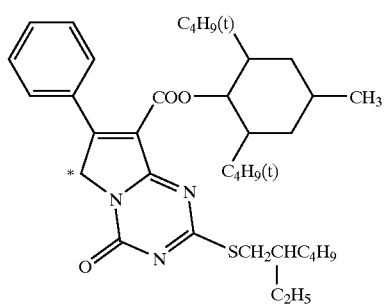
IV-4
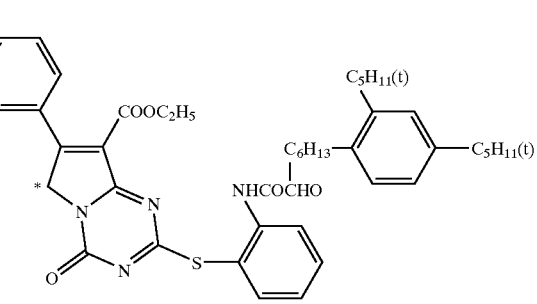
IV-5
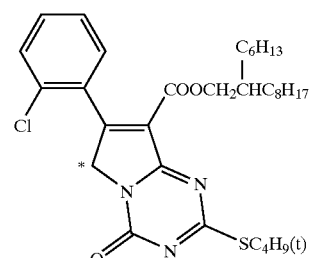
IV-6
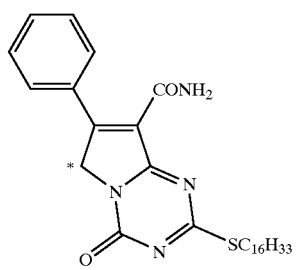

-continued
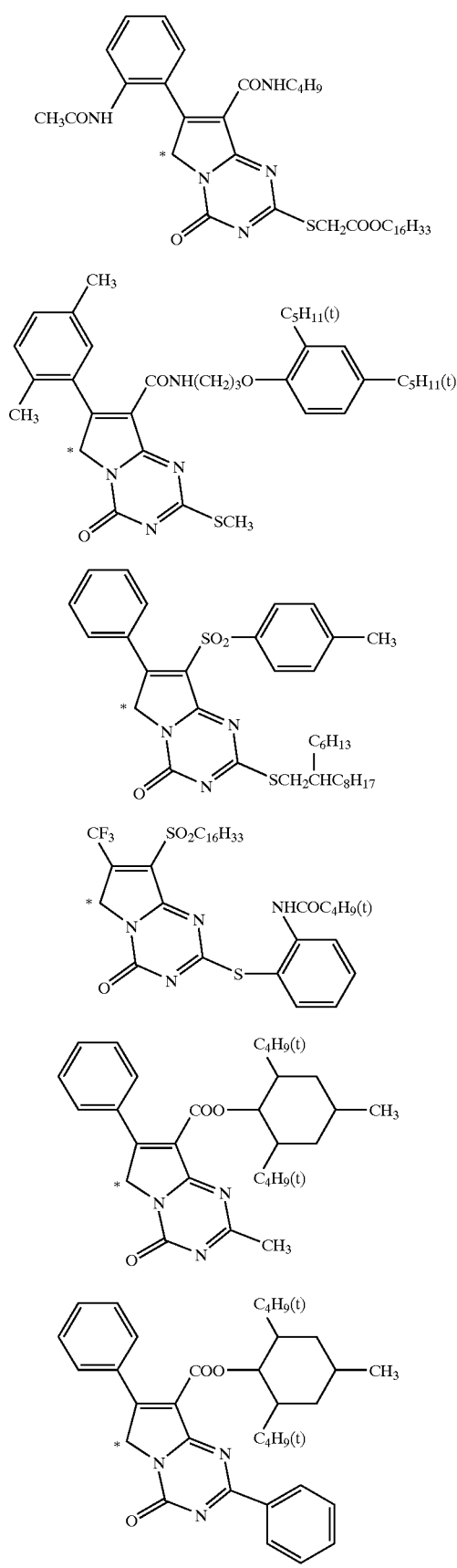
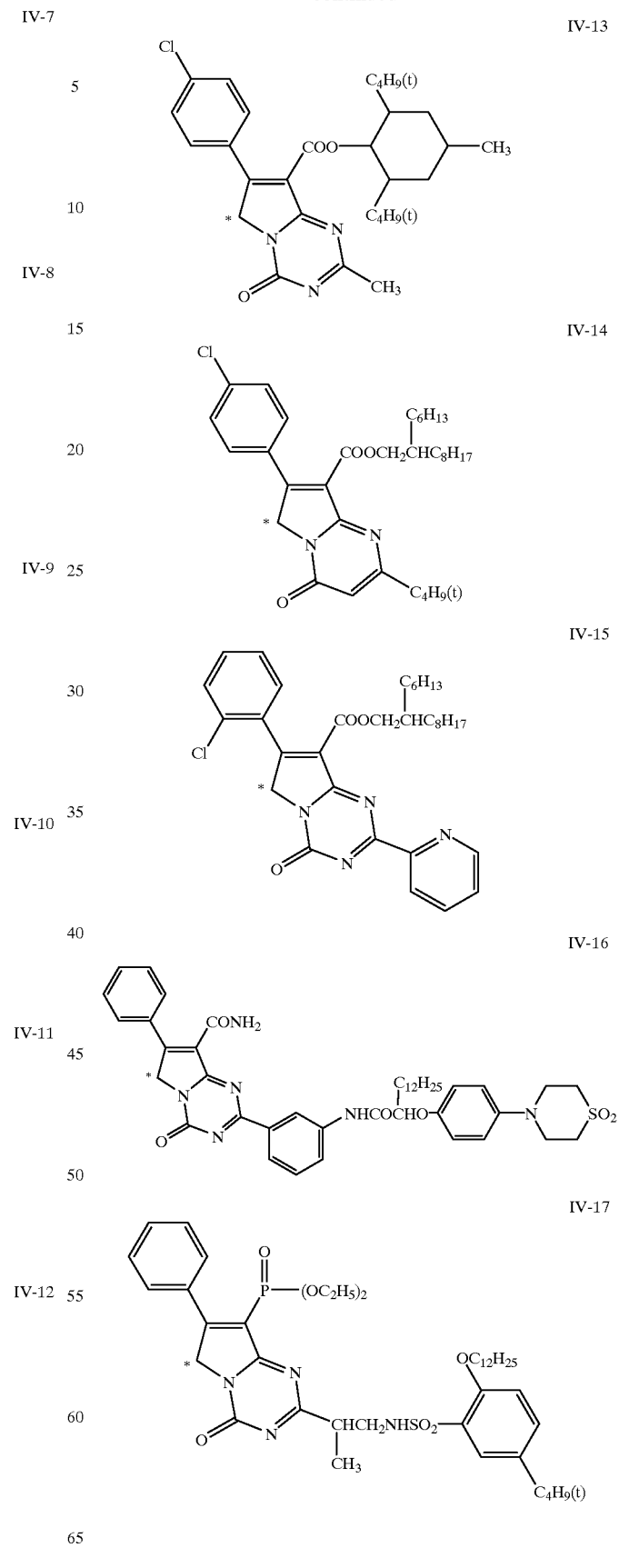

-continued
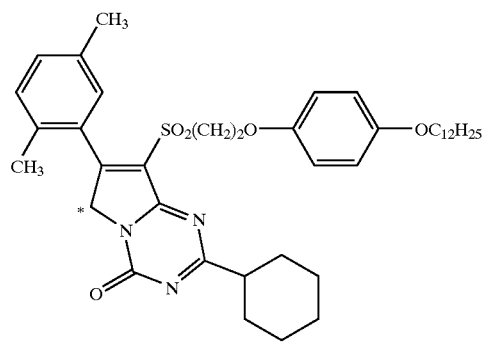
IV-18
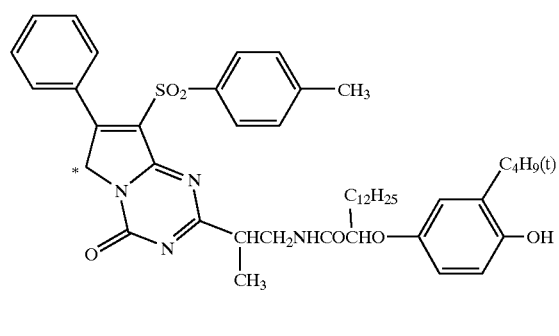
IV-19
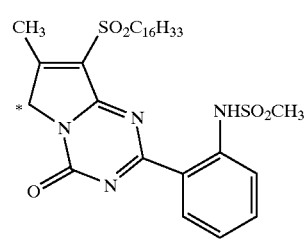
IV-20
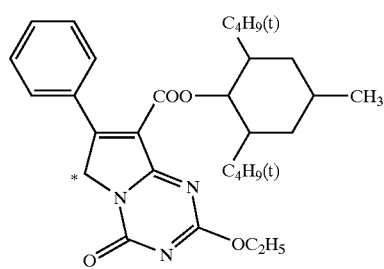
IV-21
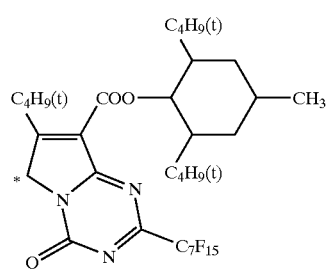
IV-22
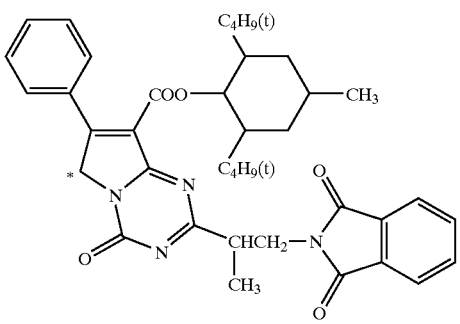
IV-23
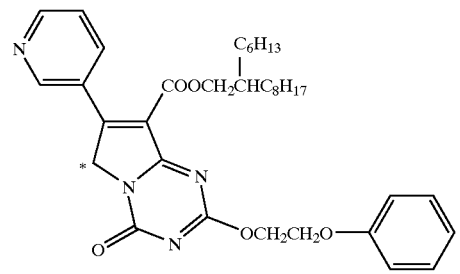
IV-24
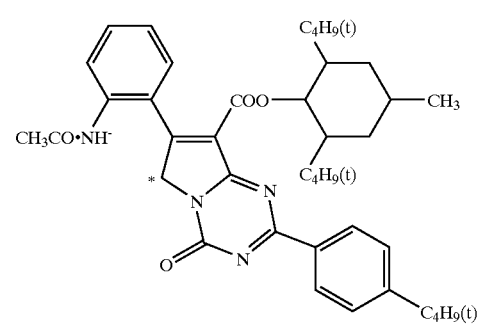
IV-25
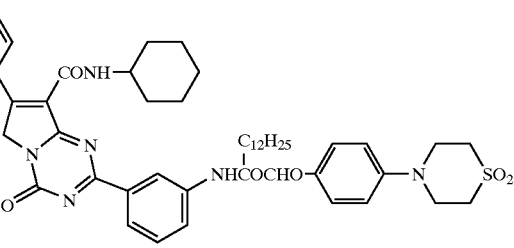
IV-26
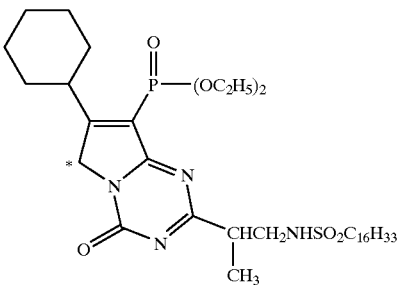
IV-27

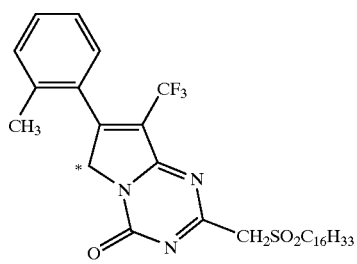

IV-28

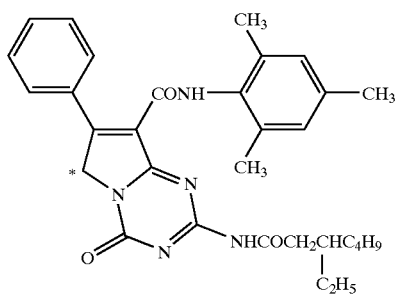

IV-29

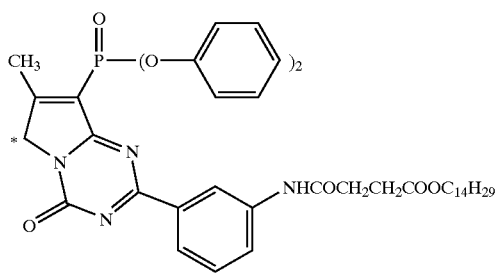

IV-30

Specific examples of the general formulae (V)–(XX) are compounds described as a coupler nucleus in JP-A No. 5-232648.

In the general formula (I), $R_3$–$R_6$ each independently represents a hydrogen atom or a substituent. The substituents $R_3$–$R_6$ represent the same substituents as described for the substituent $R_1$.

If the substituents $R_3$–$R_6$ undergo further substitution, they may have at least one of the same substituents as described for $R_1$. In a case of substitution with two or more substituents, the substitutents may be the same or different.

In the general formula (I), M represents —OY or —N($R_7$)($R_8$).

Y represents a hydrogen atom or a cation necessary for neutralizing the charge of the oxygen ion. Examples of the cation include metal cations (for example, ions of lithium, sodium, potassium, magnesium, calcium, aluminum, iron, zinc, nickel and copper), and organic cations (for example, quaternary ammonium, a guanidinium cation, and a trialkylammonium cation). These cations may be formed into a salt with a dye (cation:dye=1:1), or may be formed into a salt with plural dyes.

$R_7$ and $R_8$ represent alkyl, aryl, heterocyclic, acyl, or sulfonyl groups. The alkyl, aryl, heterocyclic, acyl, and sulfonyl groups as $R_7$ and $R_8$ are the same alkyl, aryl, heterocyclic, acyl, and sulfonyl groups as described for $R_1$.

$R_7$ and $R_8$ may be bonded to each other to form a ring. $R_4$ and $R_7$, and/or $R_6$ and $R_8$ may be bonded to each other to form a ring or rings. $R_3$ and $R_4$, and/or $R_5$ and $R_6$ may be bonded to each other to form a ring or rings.

A in the general formula (I) is preferably a group represented by any one of the general formulas (III)–(X), and more preferably a group represented by any one of the general formulae (III), (IV) and (VI). A group represented by the general formula (III) or (IV) is particularly preferable.

In the general formulae (III) and (IV), most preferable are groups wherein: $R_1$ is an alkyl, aryl, heterocyclic, cyano, acyl, alkoxycarbonyl, or carbamoyl group; $R_2$ is an alkyl, aryl, heterocyclic, cyano, acyl, alkoxycarbonyl, aryloxycarbonyl, carbamoyl, alkylsulfonyl, arylsulfonyl, sulfamoyl or phosphonyl group; $R_9$ and $R_{11}$ each independently represents a hydrogen atom or an alkyl, aryl, heterocyclic, alkoxy, amino, carbonamido, carbamoylamino, imide, alkoxycarbonylamino, sulfonamide, alkylthio, arylthio, heterocyclic thio, alkylsulfonyl, arylsulfonyl, or phosphonoylamino group; and $R_{10}$ represents a hydrogen or halogen atom, or an alkyl, aryl, heterocyclic, acyl, alkoxycarbonyl, alkylthio, arylthio, heterocyclic thio, alkylsulfonyl or arylsulfonyl group.

When M in the general formula (I) is —OY, Y is preferably a cation necessary for neutralizing the charge. As the cation, cations of lithium, sodium, potassium, magnesium, zinc, quaternary ammonium, a guanidinium cation, and a trialkylammonium are preferable.

When M is —OY, $R_3$–$R_6$ each independently is preferably a hydrogen or halogen atom, or an alkyl, aryl, carbonamido, sulfonamide, alkoxy, aryloxy, alkylthio, arylthio, acyl, alkoxycarbonyl, aryloxycarbonyl, carbamoyl, cyano, hydroxyl, carboxyl, sulfo, nitro, sulfamoyl, alkylsulfonyl, arylsulfonyl, or acyloxy group, and is more preferably a hydrogen or halogen atom, or an alkyl, carbonamido, sulfonamide, alkoxy, alkylthio, arylthio, alkoxycarbonyl, carbamoyl, cyano, hydroxyl, carboxyl, sulfo, nitro, sulfamoyl, or sulfonyl group. It is particularly preferable that either of $R_3$ or $R_5$ is a hydrogen atom.

When M in the general formula (I) is —N($R_7$)($R_8$), $R_7$ and $R_8$ each independently is preferably an alkyl, aryl or heterocyclic group, and more preferably is an alkyl group.

When M is —N($R_7$)($R_8$), preferable groups as $R_3$–$R_6$ are the same groups as in the case that M is —OY.

In the oil-soluble dye represented by the general formula (I), the groups $R_1$ to $R_{13}$ may have a dye residue represented by the general formula (I) and may make a multimer of not less than a dimer.

The groups represented by $R_1$ to $R_{13}$ may have a polymer chain to form a homopolymer or a copolymer. A typical example of the homopolymer or the copolymer is a homopolymer or a copolymer made from an addition polymer ethylenic type unsaturated compound having a dye residue represented by the general formula (I). In this case, one or more kinds of repetition unit having a dye residue represented by the general formula (I) may be contained in the polymer, and a copolymerization component may be one of ethylenic monomers such as acrylic esters, methacrylic esters and maleic esters, or a copolymer containing two or more of such monomers.

Furthermore, in the oil-soluble dye represented by the general formula (I), the groups $R_1$ to $R_{13}$ may have a substituent that makes formation of a metal complex possible, so as to form the metal complex. Examples of a metal in the metal complex include calcium, magnesium, aluminum, iron, nickel, copper, and zinc.

Typical compound examples (D-1 to 101) of the dye represented by the general formula (I) will be exemplified hereinafter. The dye used in the present invention is not limited to these examples.

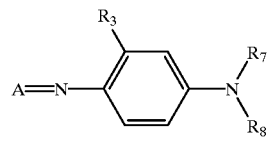

| Dye No. | A | R₃ | R₇ | R₈ |
| --- | --- | --- | --- | --- |
| D-1 | III-1 | —CH₃ | —C₂H₅ | —CH₂CH₂OH |
| D-2 | III-2 | —CH₃ | —C₂H₅ | —CH₂CH₂OH |
| D-3 | III-3 | —CH₃ | —C₂H₅ | —CH₂CH₂OH |
| D-4 | III-12 | —CH₃ | —C₂H₅ | —CH₂CH₂OH |
| D-5 | III-22 | —CH₃ | —C₂H₅ | —CH₂CH₂OH |
| D-6 | III-23 | —CH₃ | —C₂H₅ | —CH₂CH₂OH |
| D-7 | IV-1 | —CH₃ | —C₂H₅ | —CH₂CH₂OH |
| D-8 | IV-2 | —CH₃ | —C₂H₅ | —CH₂CH₂OH |
| D-9 | IV-3 | —CH₃ | —C₂H₅ | —CH₂CH₂OH |
| D-10 | IV-6 | —CH₃ | —C₂H₅ | —CH₂CH₂OH |
| D-11 | IV-8 | —CH₃ | —C₂H₅ | —CH₂CH₂OH |
| D-12 | IV-9 | —CH₃ | —C₂H₅ | —CH₂CH₂OH |
| D-13 | IV-16 | —CH₃ | —C₂H₅ | —CH₂CH₂OH |
| D-14 | IV-23 | —CH₃ | —C₂H₅ | —CH₂CH₂OH |
| D-15 | IV-27 | —CH₃ | —C₂H₅ | —CH₂CH₂OH |
| D-16 | III-1 | —C₃H₇(i) | —C₂H₅ | —CH₂CH₂NHSO₂CH₃ |
| D-17 | IV-3 | —C₃H₇(i) | —C₂H₅ | —CH₂CH₂NHSO₂CH₃ |
| D-18 | III-2 | —Cl | —C₂H₅ | —CH₂CH₂NHSO₂CH₃ |
| D-19 | III-2 | —CF₃ | —C₂H₅ | —CH₂CH₂NHSO₂CH₃ |
| D-20 | III-2 | —F | —C₂H₅ | —CH₂CH₂NHSO₂CH₃ |
| D-21 | III-12 | —OCH₃ | —C₂H₅ | —CH₂CH₂NHSO₂CH₃ |
| D-22 | III-12 | —NHCOC₄H₉(t) | —C₂H₅ | —CH₂CH₂NHSO₂CH₃ |
| D-23 | III-22 | —NHCOCH₃ | —C₂H₅ | —CH₂CH₂NHSO₂CH₃ |
| D-24 | IV-1 | —C₃H₇(i) | —C₂H₅ | —CH₂CH₂NHSO₂CH₃ |
| D-25 | IV-3 | —CF₃ | —C₂H₅ | —CH₂CH₂NHSO₂CH₃ |
| D-26 | IV-3 | —OCH₃ | —C₂H₅ | —CH₂CH₂NHSO₂CH₃ |
| D-27 | IV-3 | —CH₃ | —C₄H₉ | —C₄H₉ |
| D-28 | IV-3 | —CH₃ | —C₂H₅ | —CH₂CH₂SO₂CH₃ |
| D-29 | IV-3 | —CH₃ | —(CH₂CH₂O)₄H | —(CH₂CH₂O)₄H |
| D-30 | IV-3 | —CH₃ | —CH₂CH₂CH₂OH | —CH₂CH₂CH₂OH |
| D-31 | IV-3 | —CH₃ | —CH₂CO₂C₂H₅ | —CH₂CO₂C₂H₅ |
| D-32 | IV-3 | —CH₃ | —C₂H₅ | —CH₂CH₂OCH₃ |
| D-33 | III-2 | —CO₂CH₃ | —C₂H₅ | —CH₂CH₂NHSO₂CH₃ |
| D-34 | III-2 | —H | —C₁₂H₂₅ | —C₂H₅ |
| D-35 | III-2 | —CH₃ | —C₈H₁₇ | —C₈H₁₇ |
| D-36 | IV-3 | —CH₃ | —CH₂CH₂CN | —CH₂CH₂CN |
| D-37 | III-1 | —CH₃ | —C₂H₅ | —CH₂CH₂NHSO₂CH₃ |
| D-38 | III-2 | —CH₃ | —C₂H₅ | —CH₂CH₂NHSO₂CH₃ |
| D-39 | III-3 | —CH₃ | —C₂H₅ | —CH₂CH₂NHSO₂CH₃ |
| D-40 | III-4 | —CH₃ | —C₂H₅ | —CH₂CH₂NHSO₂CH₃ |
| D-41 | III-7 | —CH₃ | —C₂H₅ | —CH₂CH₂NHSO₂CH₃ |
| D-42 | III-9 | —CH₃ | —C₂H₅ | —CH₂CH₂NHSO₂CH₃ |
| D-43 | III-12 | —CH₃ | —C₂H₅ | —CH₂CH₂NHSO₂CH₃ |
| D-44 | III-14 | —CH₃ | —C₂H₅ | —CH₂CH₂NHSO₂CH₃ |
| D-45 | III-15 | —CH₃ | —C₂H₅ | —CH₂CH₂NHSO₂CH₃ |
| D-46 | III-18 | —CH₃ | —C₂H₅ | —CH₂CH₂NHSO₂CH₃ |
| D-47 | III-19 | —CH₃ | —C₂H₅ | —CH₂CH₂NHSO₂CH₃ |
| D-48 | III-22 | —CH₃ | —C₂H₅ | —CH₂CH₂NHSO₂CH₃ |
| D-49 | III-23 | —CH₃ | —C₂H₅ | —CH₂CH₂NHSO₂CH₃ |
| D-50 | III-25 | —CH₃ | —C₂H₅ | —CH₂CH₂NHSO₂CH₃ |
| D-51 | IV-1 | —CH₃ | —C₂H₅ | —CH₂CH₂NHSO₂CH₃ |
| D-52 | IV-2 | —CH₃ | —C₂H₅ | —CH₂CH₂NHSO₂CH₃ |
| D-53 | IV-3 | —CH₃ | —C₂H₅ | —CH₂CH₂NHSO₂CH₃ |
| D-54 | IV-6 | —CH₃ | —C₂H₅ | —CH₂CH₂NHSO₂CH₃ |
| D-55 | IV-8 | —CH₃ | —C₂H₅ | —CH₂CH₂NHSO₂CH₃ |
| D-56 | IV-9 | —CH₃ | —C₂H₅ | —CH₂CH₂NHSO₂CH₃ |
| D-57 | IV-11 | —CH₃ | —C₂H₅ | —CH₂CH₂NHSO₂CH₃ |
| D-58 | IV-12 | —CH₃ | —C₂H₅ | —CH₂CH₂NHSO₂CH₃ |
| D-59 | IV-14 | —CH₃ | —C₂H₅ | —CH₂CH₂NHSO₂CH₃ |
| D-60 | IV-16 | —CH₃ | —C₂H₅ | —CH₂CH₂NHSO₂CH₃ |
| D-61 | IV-17 | —CH₃ | —C₂H₅ | —CH₂CH₂NHSO₂CH₃ |
| D-62 | IV-19 | —CH₃ | —C₂H₅ | —CH₂CH₂NHSO₂CH₃ |
| D-63 | IV-21 | —CH₃ | —C₂H₅ | —CH₂CH₂NHSO₂CH₃ |
| D-64 | IV-27 | —CH₃ | —C₂H₅ | —CH₂CH₂NHSO₂CH₃ |

D-65
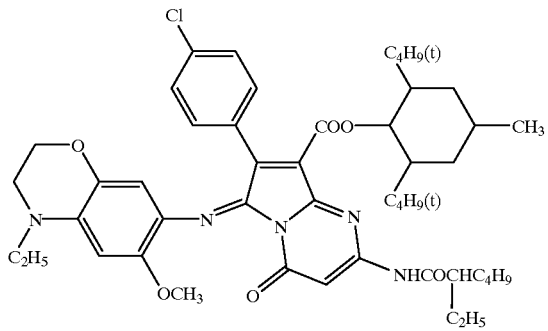
D-66
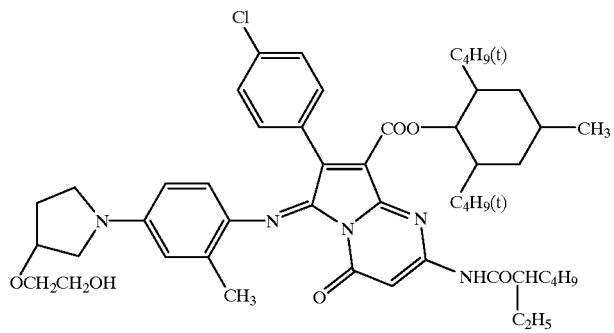
D-67
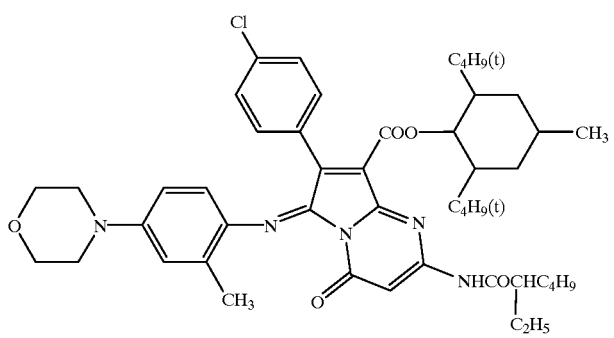
D-68
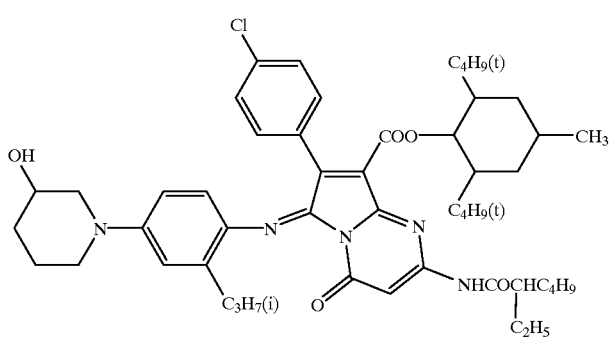

-continued
D-69
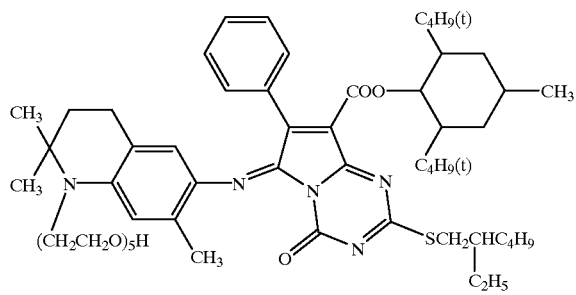
D-70
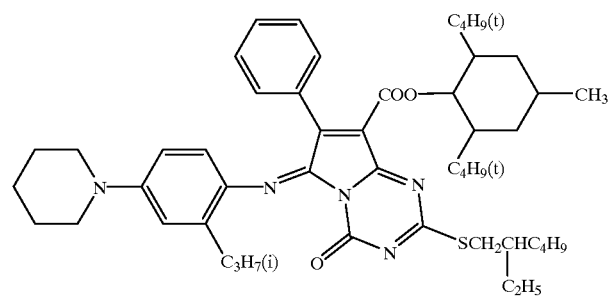
D-71
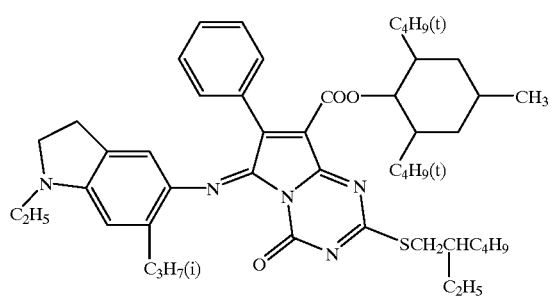
D-72
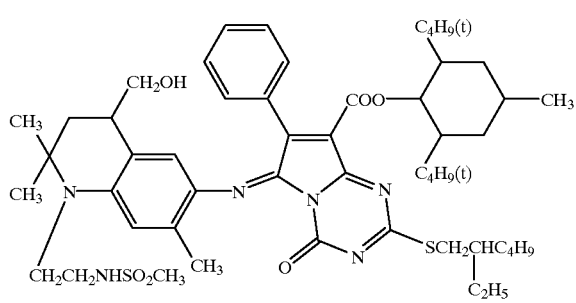
D-73
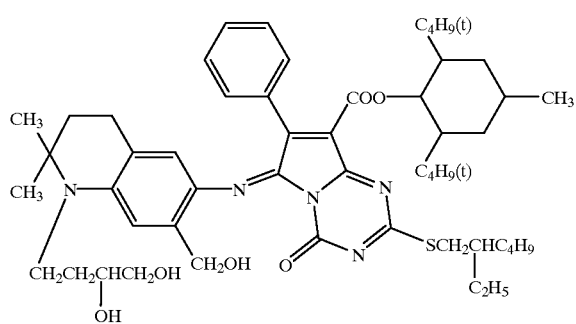

-continued
D-74
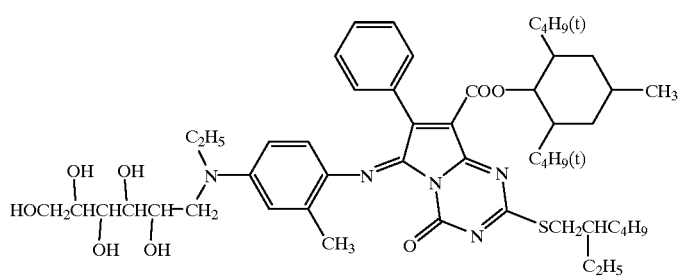
D-75
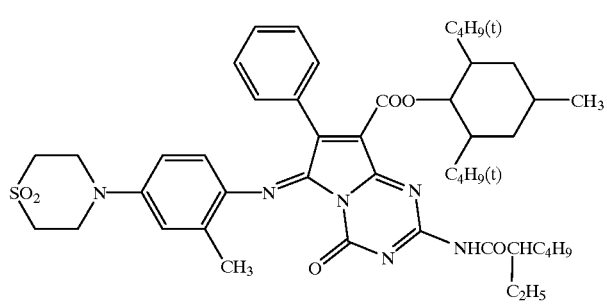
D-76
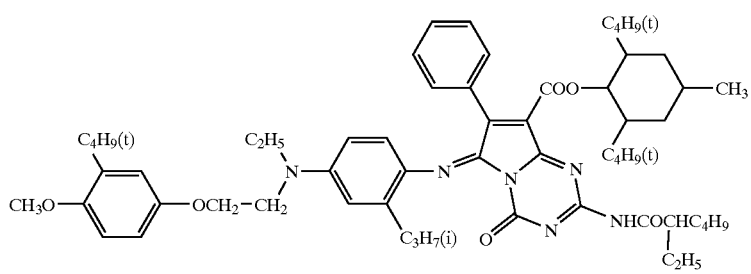
D-77
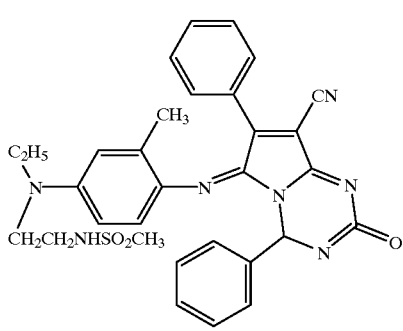
D-78
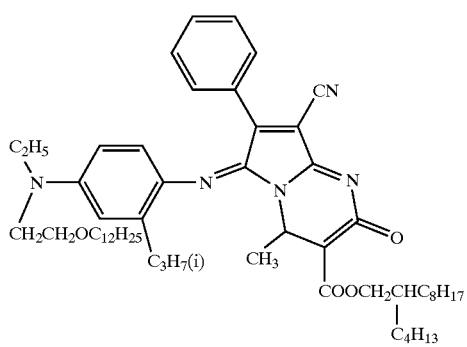

-continued
D-79
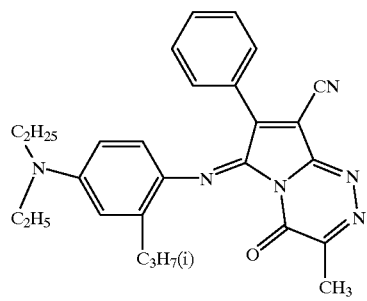
D-80
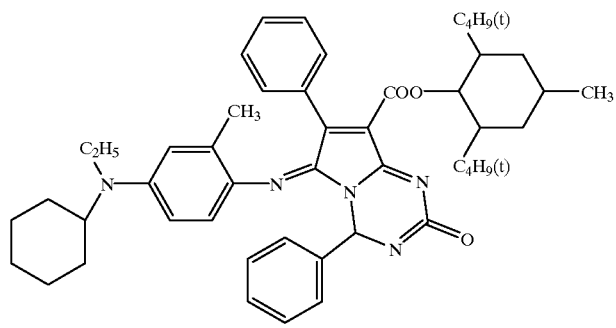
D-81
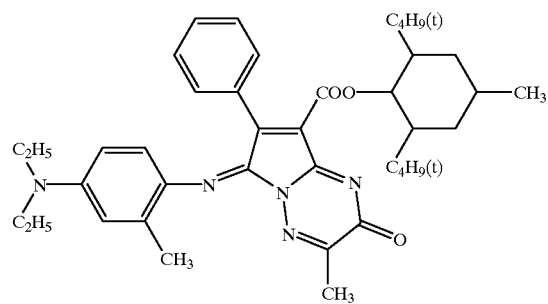
D-82
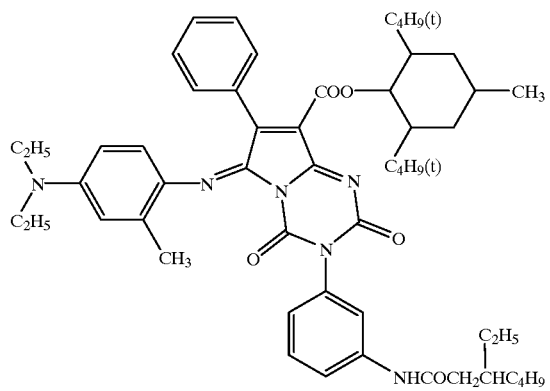

-continued
D-83
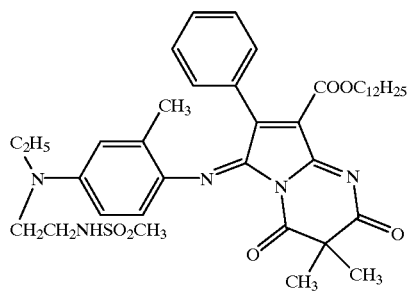
D-84
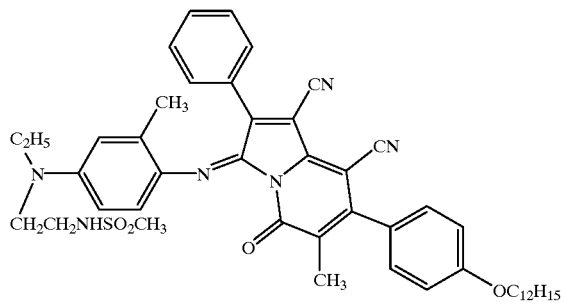
D-85
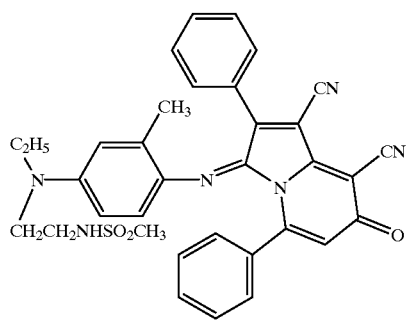
D-86
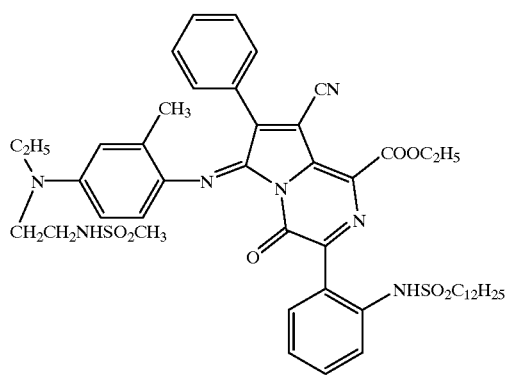

-continued
D-87
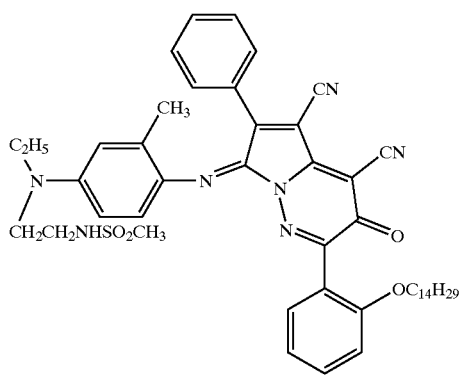
D-88
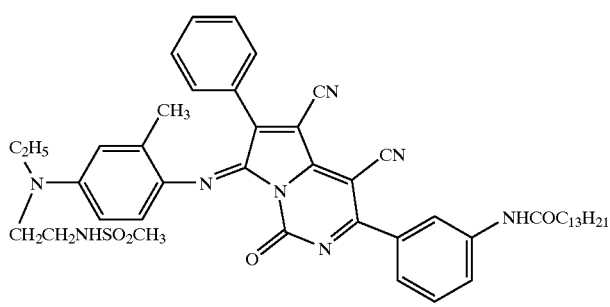
D-89
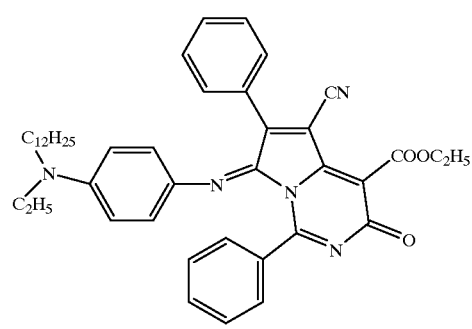
D-90
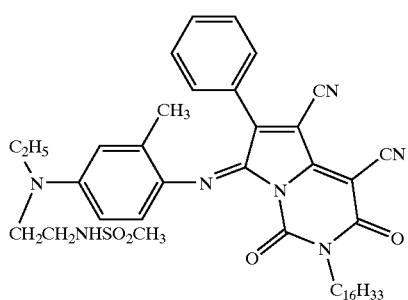
D-91
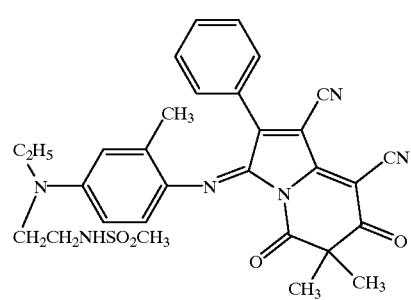

-continued
D-92
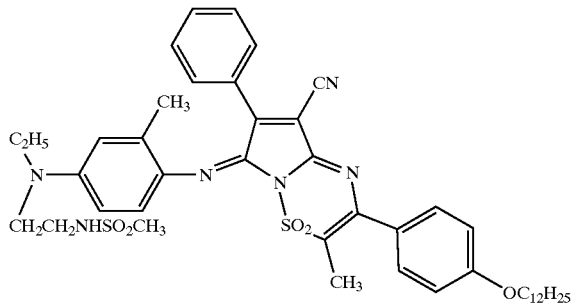
D-93
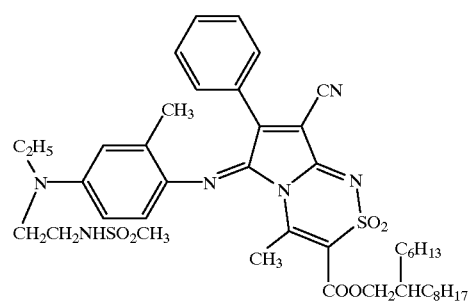
D-94
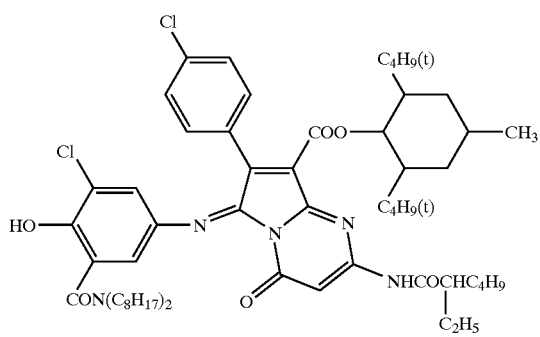
D-95
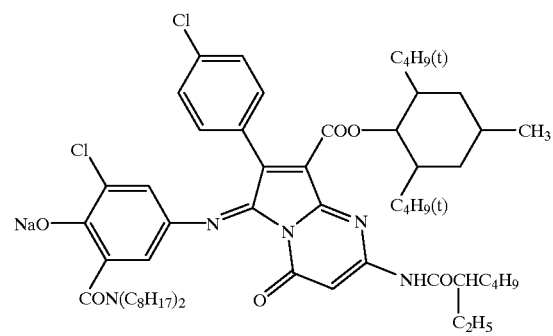

-continued
D-96
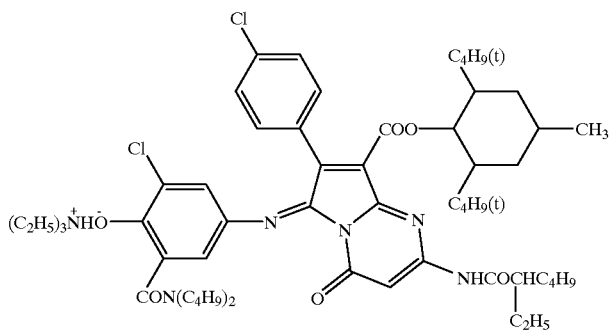
D-97
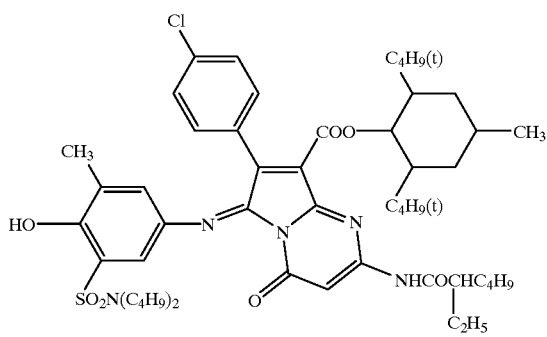
D-98
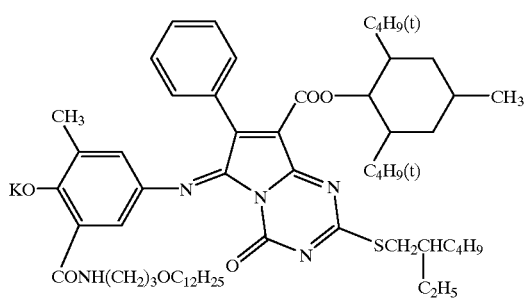
D-99
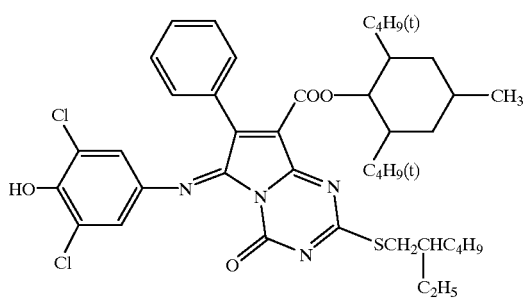
D-100
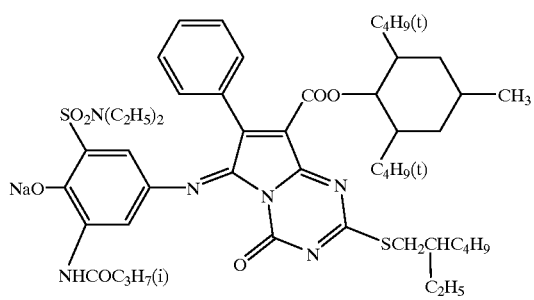

D-101

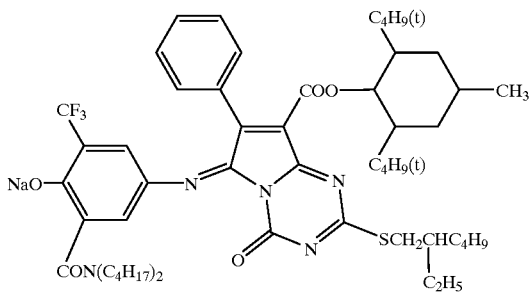

Hereinafter, specific synthesis examples of the dye represented by the general formula (I) will be described.

SYNTHESIS EXAMPLE 1
Synthesis of Exemplified Dye D-4

The exemplified dye D-4 can be synthesized according to the following scheme.

a) Synthesis of an Intermediate Product A-2

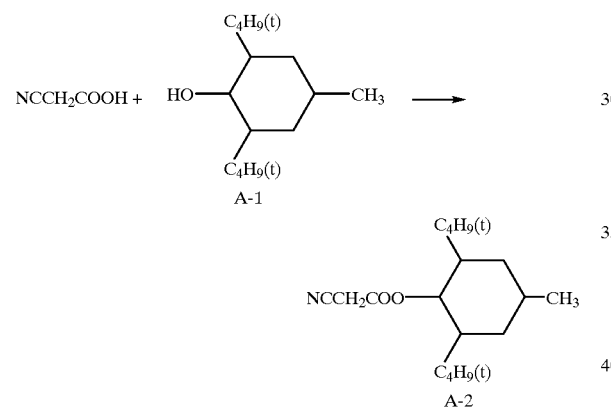

To 1300 ml of toluene were added 457 g (2.00 mol) of 2,6-di-t-butyl-4-methylcyclohexanol (an intermediate product A-1), described in JP-A No. 8-12609, and 187 g (2.20 mol) of ethyl cyanoacetate, and then the mixture was stirred at room temperature. To this mixture was added 174 ml of pyridine, and a resultant solution was stirred for 10 minutes. Thereafter, 622 ml of acetic anhydride was dropwise added thereto over 1.5 hours, and the reaction mixture was stirred for 1.5 hours and was then left to stand over night. To the reaction mixture was added 500 ml of water over 30 minutes, and subsequently 200 g of sodium bicarbonate was added thereto, little by little, over 1 hour. 1000 ml of ethyl acetate was added to the reaction mixture, which was then washed 2 times with 1500 ml of water containing 150 g of sodium bicarbonate. An organic phase thereof was concentrated under reduced pressure, and 2000 ml of methanol was added to a resultant residue, such that the residue was dissolved. A seed crystal was added thereto, and the mixture was stirred at room temperature for 1.5 hours. Thereafter, 400 ml of water was added thereto, and a resultant solution was stirred for 2 hours. Precipitated crystal was filtrated, washed with a mixed solvent of methanol and water (5/1), and dried to give 476 g of the intermediate product A-2 (yield: 82%).

b) Synthesis of an Intermediate Product A-4

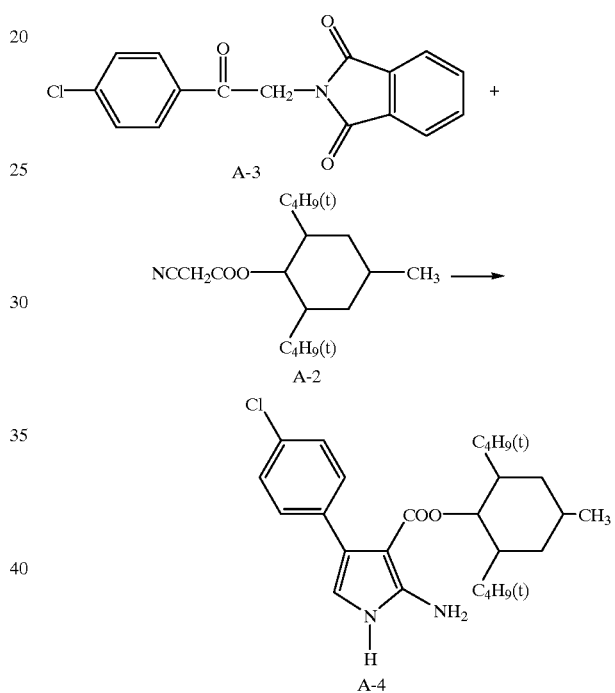

To 150 ml of ethanol were added 48.5 g (0.162 mol) of an intermediate product A-3 obtained from commercially available 2,4'-dichloroacetophenone and potassium phthalimide and 48.5 g (0.162 mol) of the intermediate product A-2, and a resultant mixture was stirred at room temperature under a nitrogen flow. 13.0 g (0.325 mol) of sodium hydroxide was dissolved in 40 ml of water and the mixture was added thereto. Thereafter, the mixture was heated over a steam bath for 4 hours. To this reaction mixture was added 200 ml of water, and the resultant mixture was cooled while being stirred. Precipitated crystal was collected by filtration. This crystal was dissolved in 300 ml of ethyl acetate, and washed with 250 ml of salt water. An organic phase was dried over anhydrous magnesium sulfate. Next, the organic phase was concentrated under reduced pressure. To a residue was added 400 ml of hexane to disperse the crystal. The crystal was collected by filtration and dried to give 57.0 g of the an intermediate product A-4 (yield: 79%).

c) Synthesis of an Intermediate Product A-6

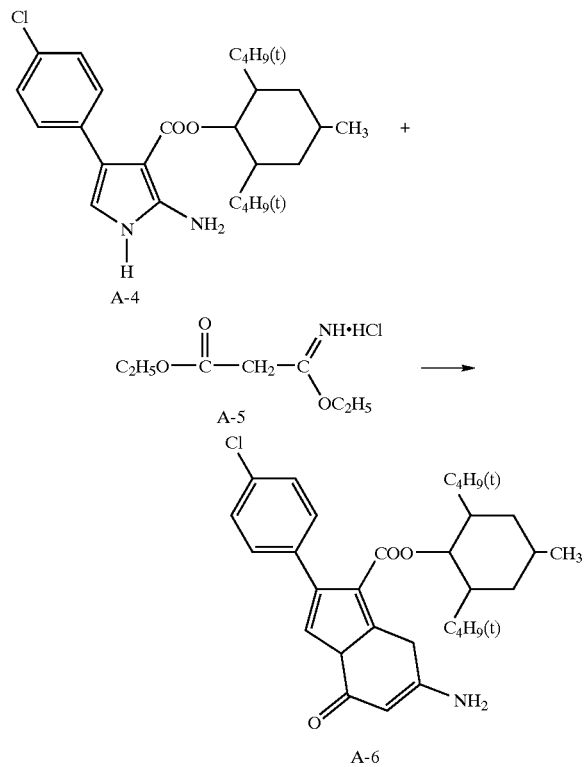

To 60 ml of chloroform were added 11.5 g (63 mmol) of an intermediate product A-5 obtained by reacting cyanoacetic acid with ethanol and hydrochloric acid gas, and a resultant mixture was stirred at room temperature. Thereto was added 7.0 ml (69 mmol) of triethylamine, and the solution was stirred for 20 minutes. This solution was concentrated under reduced pressure. To the resultant residue was added 40 ml of ethyl acetate, and a product that was not dissolved (triethylamine hydrochlorate) was filtrated off. To the filtrate were added 20 g (45 mmol) of the intermediate product A-4 and 100 ml of ethanol, and the mixture was stirred at room temperature for 5 hours. The reaction mixture was concentrated under reduced pressure. To a resultant residue was added 200 ml of acetonitrile to disperse crystal. The crystal was collected by filtration and dried to give 22.6 g of an intermediate product A-6 (yield: 98% on the basis of the intermediate product A-4).

d) Synthesis of an Intermediate Product A-7

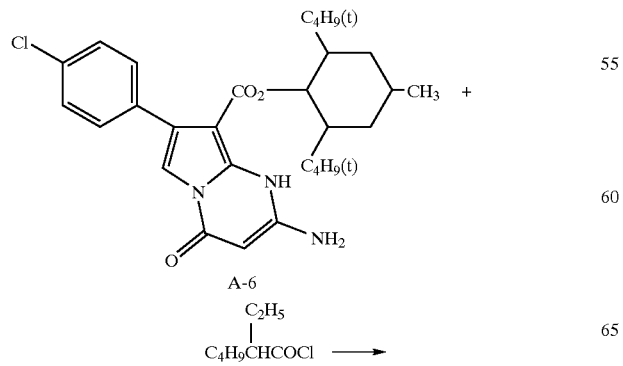

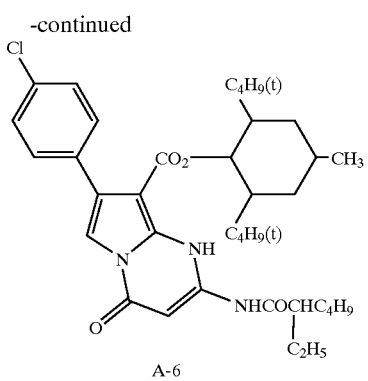

To 60 ml of N,N-dimethylacetoamide were added 20.5 g (50 mmol) of the intermediate product A-6, 10.5 ml (75 mmol) of triethylamine and 1.83 g (15 mmol) of 4-dimethylaminopyridine, and the mixture was stirred at 60° C. Thereto was added 9.76 g (60 mmol) of 2-ethylhexanoyl chloride, and the mixture was stirred at 60° C. for 3 hours. After cooling, the reaction mixture was poured into 150 ml of ethyl acetate, and washed with 150 ml of water containing 5 ml of concentrated hydrochloric acid, and then with 120 ml of salt water. An organic phase was dried over anhydrous magnesium sulfate, and then concentrated under reduced pressure. To a resultant residue was added 150 ml of hexane, and the residue was heated and dissolved. The solution was stirred at room temperature to precipitate crystal. The crystal was collected by filtration and dried to give 19.5 g of the intermediate product A-7 (yield: 61%).

$^1$H NMR (CDCl$_3$)

δ (ppm) 10.15 (s, 1H), 7.36 (d, 2H), 7.30 (d, 2H), 5.96 (s, 1H), 5.60 (s, 1H), 2.39 (m, 1H), and 1.8–0.4 (m, 43H)

e) Synthesis of the Exemplified Dye D-4

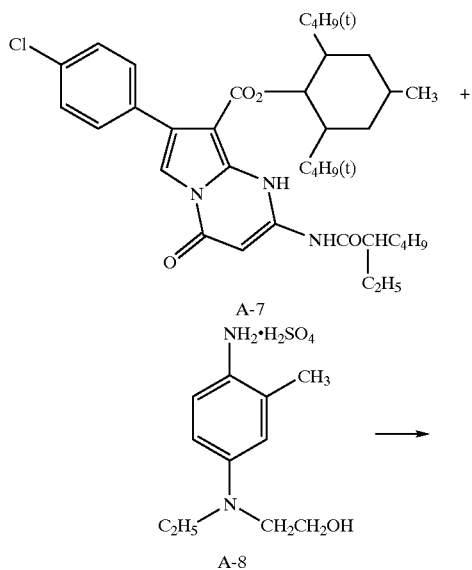

-continued

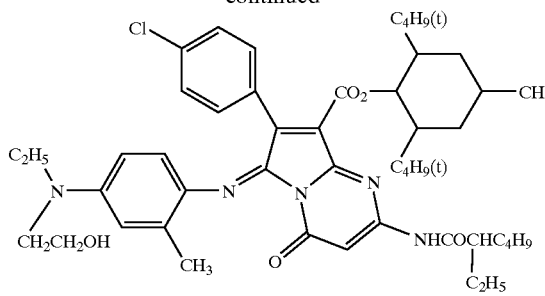

Illustrated dye D-4

To 6.38 g (0.01 mol) of the intermediate product A-7, 3.51 g (0.012 mol) of an intermediate product A-8, and 5.30 g (0.05 mol) of sodium carbonate were added: 50 ml of ethanol, 200 ml of ethyl acetate and 250 ml of water, and then the mixture was stirred at room temperature. A solution wherein 1.6 g of ammonium persulfate was dissolved in 20 ml of water was dropwise added to the above-mentioned solution. After addition, an mixture was stirred at room temperature for 2 hours. After the reaction, the organic phase was extracted with ethyl acetate. The ethyl acetate solution was washed with water, and was then dried over anhydrous magnesium sulfate. Ethyl acetate was distilled off under reduced pressure. The remaining product was separated and purified by silica gel column chromatography (eluent: n-hexane/ethyl acetate=1/1). Acetonitrile was added thereto, so as to produce crystal. This crystal was filtrated and dried to give 4.43 g of the exemplified dye D-4 (yield: 62.9%).

For the solution of the dye D-4 in ethyl acetate, λ max was 642.6 nm.

Synthesis Example 2

Synthesis of the Exemplified Dye D-53

The exemplified dye D-53 can be synthesized according to the following scheme.

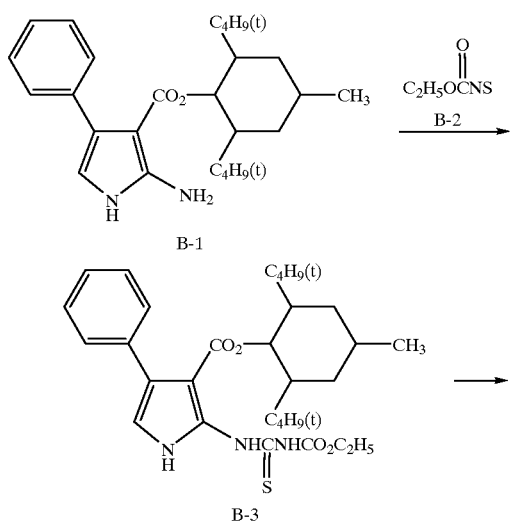

-continued

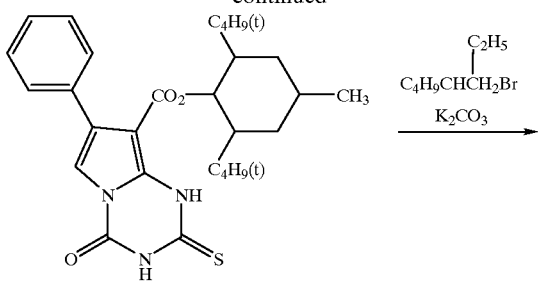

B-4

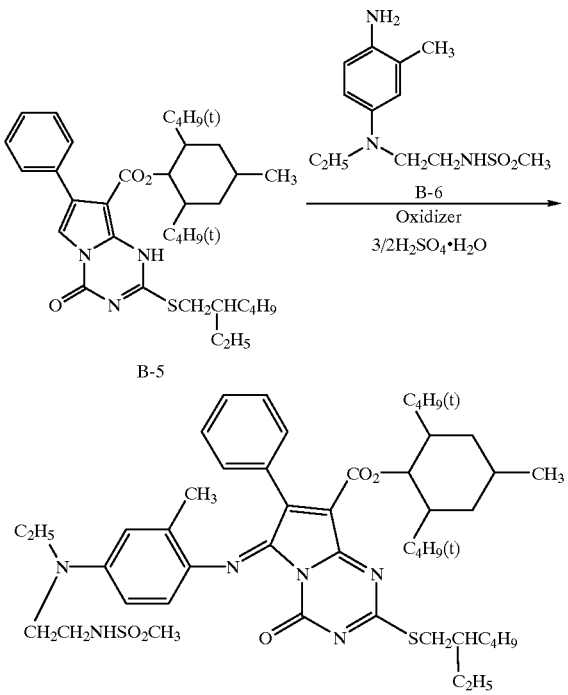

Illustrated dye D-53 a) Synthesis of an Intermediate Product B-3

To 15.6 g (0.0381 mol) of an aminopyrrol compound (an intermediate product B-1) was added 50 ml of dimethylacetoamide, and a resultant solution was stirred at 10° C. To this solution was dropwise added 5.0 g (0.0381 mol) of ethoxycarbonylthioisocyanate (B-2). After addition, the solution was stirred at room temperature for 2 hours to finish reaction. Water and ethyl acetate were added to the reaction solution, so as to perform extraction. This ethyl acetate solution was washed with water, and then ethyl acetate was distilled off under reduced pressure. A remaining product was separated and purified by silica gel column chromatography (eluent: n-hexane/chloroform=1/2). An eluted product was concentrated and dried to give 13.5 g of the intermediate product B-3 (yield: 66.9%).

b) Synthesis of an Intermediate Product B-4

To 13.5 g (0.025 mol) of the thiourea compound (B-3) obtained by the above-mentioned process were added 3.75 ml of triethylamine and 65 ml of tetrahydrofuran, and the mixture was heated to 60° C. and stirred for 3 hours. This solution was cooled to room temperature, and concentrated hydrochloric acid was added thereto to neutralize the solution. Water and ethyl acetate were added thereto, so as to perform extraction. This ethyl acetate solution was washed with water, and dried over anhydrous magnesium sulfate. Ethyl acetate was distilled off under reduced pressure. To the remaining product was added 50 ml of toluene to precipitate crystal. This crystal was filtrated and dried to give 12.0 g of the intermediate product B-4 (yield: 96.8%).

c) Synthesis of an Intermediate Product B-5

To 12.0 g (0.024 mol) of a thione compound obtained by the above-mentioned process were added 10.0 g of potassium carbonate and 50 ml of dimethylacetoamide, and the mixture was heated to 60° C. and stirred. To this solution was dropwise added 4.87 g (0.0252 mol) of 2-ethylhexyl bromide. After addition, the solution was heated at 55–60° C. for 6 hours. The reaction solution was filtrated and then inorganic materials were removed. Thereafter, water and ethyl acetate were added to the filtrate to perform extraction. This ethyl acetate solution was made acid with dilute hydrochloric acid, washed with water and dried over anhydrous magnesium sulfate. This ethyl acetate solution was concentrated under reduced pressure. A remaining product was recrystallized and purified with a mixed solvent of n-hexane/ethyl acetate, to give 12.1 g of the intermediate product B-5 (yield: 82.9%).

d) Synthesis of the Exemplified Dye D-53

To 6.08 g (0.01 mol) of the intermediate product B-5 and 5.24 g (0.012 mol) of the intermediate product B-6 which were obtained by the above-mentioned processes, and 20 g of sodium hydrogencarbonate were added 200 ml of water, 100 ml of ethyl acetate and 20 ml of ethanol, and then the mixture was stirred at room temperature. Crystalline ammonium persulfate was added little by little to this solution. This addition was performed several times until the intermediate product B-5 disappeared. After the reaction, the water phase was removed, and acetic acid was added to an ethyl acetate phase to neutralize the phase. This ethyl acetate solution was washed with water, dried over anhydrous magnesium sulfate, concentrated and dried under reduced pressure. A remaining product was separated and purified by silica gel column chromatography (eluent: ethyl acetate/n-hexane=1/1) to give 6.13 g of the exemplified dye D-53 (yield: 70.1%).

For the solution of the dye D-53 in ethyl acetate, λmax was 660.8 nm.

The coloring composition of the present invention is preferably a coloring composition wherein the dye represented by the general formula (I) is dispersed in a water-based medium.

In the present specification, a "water-based medium" means a liquid containing at least water, and more specifically means water, or a mixture of water and a water-miscible organic solvent which, if necessary, may contain additives such as a surfactant, an anti-drying agent (lubricant), a stabilizer, and an antiseptic.

One embodiment of a coloring composition wherein a dye represented by the general formula (I), which may be referred to as an oil-soluble dye hereinafter, is dispersed in a water-based medium is a coloring composition that includes coloring particulates containing the oil-soluble dye and an oil-soluble polymer.

In this embodiment, the oil-soluble dye is dispersed in a water-based medium in the state that the dye is dispersed as particles which contain the oil-soluble polymer and, if desired, may contain an organic solvent.

Another embodiment of a coloring composition wherein the above-mentioned dye is dispersed in a water-based medium is a coloring composition in which the oil-soluble dye which is dissolved in a high boiling point organic solvent having a boiling point of 150° C. or higher and a dielectric constant at 25° C. of 3 to 12 is dispersed in a water-based medium.

In this embodiment, the oil-soluble dye, together with the high boiling point organic solvent, is dispersed in the water-based medium.

Raw materials used in the respective embodiments will be described hereinafter.

Oil-soluble Polymer

The type of the oil-soluble polymer is not particularly limited, and can be appropriately selected from oil-soluble polymers known in the prior art, depending on purposes. Examples thereof include vinyl polymers and condensed polymers (polyurethane, polyester, polyamide, polyurea, and polycarbonate).

The oil-soluble polymer may be water-insoluble, water-dispersible (self-emulsifiable) or water-soluble, among which the water-dispersible polymer is preferable for easy production and dispersion stability of coloring particulates.

The water-dispersible polymer may be an ionic polymer, a nonionic dispersible group-containing polymer, and a mixed polymer thereof.

The ionic polymer includes polymers having cationic groups such as tertiary amino group and quaternary ammonium group, as well as polymers having anionic groups in carboxylic acid, sulfonic acid etc.

The nonionic dispersible group-containing polymer includes polymers containing nonionic dispersible groups such as polyethylene oxy group.

Among these, the anionic group-containing ionic polymers, nonionic dispersible group-containing polymers and mixed polymers thereof are preferable for dispersion stability of coloring particulates.

Examples of monomers forming the above-mentioned vinyl polymer include acrylic esters, methacrylic esters and vinyl esters. (Examples of the ester groups are ester groups having alkyl or aryl group which may have a substituent. Examples of the alkyl or aryl groups include methyl, ethyl, n-butyl, sec-butyl, tert-butyl, hexyl, 2-ethylhexy, tert-octyl, 2-chloroethyl, cyanoethyl, 2-acetoxyethyl, tetrahydrofurfuryl, 5-hydroxypentyl, cyclohexyl, adamantyl, norbonyl, benzyl, hydroxyethyl, 3-methoxybutyl, 2-(2-methoxyethoxy)ethyl, 1,2,2,2-tetrafluoroethyl, 1H,1H,2H,2H-perfluorodecyl, phenyl, 2,4,5-trimethylphenyl, and 4-chlorophenyl.)

Specific examples of the vinyl esters include vinyl esters of an aliphatic carbonic acid which may have a substituent, such as vinyl acetate, vinyl propionate, vinyl butyrate, vinyl isobutyrate, vinyl caproate, and vinyl chloroacetate; and vinyl esters of an aromatic carbonic acid which may have a substituent, such as vinyl benzoate, vinyl 4-methylbenzoate and vinyl salicylate.

The other monomers which form the above vinyl polymer include, for example, acrylamides, methacrylamides, olefins, the other monomers, and the like.

Specific examples of acrylamides include acrylamide, N-monosubstituted acrylamide, and N,N-disubstituted acrylamide. The substituent is an alkyl, aryl or silyl group that may have a substituent and is, for example, methyl, ethyl, n-propyl, isopropyl, n-butyl, tert-butyl, tert-octyl, cyclohexyl, adamantyl, norbonyl, benzyl, hydroxyethyl, ethoxyethyl, phenyl, 2,4,5-tetramethylphenyl, 4-chlorophenyl, or trimethylsilyl.

Specific examples of methacrylamides include methacrylamide, N-monosubstituted methacrylamide, and N,N-disubstituted methacryalmide. The substituent is an alkyl, aryl or silyl group that may have a substituent and is, for example, methyl, ethyl, n-propyl, isopropyl, n-butyl, tert-butyl, tert-octyl, cyclohexyl, adamantyl, norbonyl, benzyl, hydroxyethyl, ethoxyethyl, phenyl, 2,4,5-tetramethylphenyl, 4-chlorophenyl or trimethylsilyl.

Examples of olefins include ethylene, propylene, 1-pentene, vinyl chloride, vinylidene, isoprene, chloroprene, and butadiene. Specific examples of styrenes include styrene, methylstyrene, isopropylstyrene, methoxystyrene, acetoxystyrene, and chlorostyrene. Specific examples of vinyl ethers include methyl vinyl ether, butyl vinyl ether, hexyl vinyl ether, and methoxyethyl vinyl ether.

Examples of other monomers include crotonic esters, itaconic esters, maleic esters, phthalic esters, methyl vinyl ketone, phenyl vinyl ketone, methoxyethyl ketone, N-vinyloxazolidone, N-vinylpyrrolidone, vinylidene chloride, methylene malonic nitril, vinylidene, diphenyl-2-acryloyloxyethyl phosphate, diphenyl-2-methacryloyloxyethyl phosphate, dibutyl-2-acryloyloxyethyl phosphate, and dioctyl-2-methacryloyloxyethyl phosphate.

The ionic group-containing monomer includes anionic group-containing monomers and cationic group-containing monomers.

The anionic group-containing monomers include e.g. a carboxylic acid monomer, a sulfonic acid monomer, a phosphoric acid monomer, etc.

The carboxylic acid monomer includes e.g. acrylic acid, methacrylic acid, itaconic acid, maleic acid, fumaric acid, citraconic acid, crotonic acid, monoalkyl itaconates (e.g., monomethyl itaconate, monoethyl itaconate, monobutyl itaconate etc.), and monoalkyl maleates (e.g., monomethyl maleate, monoethyl maleate, monobutyl maleate etc.).

The sulfonic acid monomer includes styrene sulfonic acid, vinylsulfonic acid, acryloyloxyalkane sulfonic acid (e.g., acryloyloxymethane sulfonic acid, acryloyloxyethyl sulfonic acid, acryloyloxypropane sulfonic acid etc.), methacryloyloxyalkane sulfonic acid (e.g., methacryloyloxymethane sulfonic acid, methacryloyloxyethane sulfonic acid, methacryloyloxypropane sulfonic acid etc.), acrylamide alkyl sulfonic acid (e.g., 2-acrylamide-2-methylethane sulfonic acid, 2-acrylamide-2-methylpropane sulfonic acid, 2-acrylamide-2-methylbutane sulfonic acid etc.), and methacrylamide alkyl sulfonic acid (e.g., 2-methacrylamide-2-methylethane sulfonic acid, 2-methacrylamide-2-methylpropane sulfonic acid, 2-methacrylamide-2-methylbutane sulfonic acid etc.).

The phosphoric acid monomer includes e.g. vinyl phosphonic acid and methacryloyloxyethyl phosphonic acid.

Among these monomers, acrylic acid, methacrylic acid, styrene sulfonic acid, vinyl sulfonic acid, acrylamide alkyl sulfonic acid, and methacrylamide alkyl sulfonic acid are preferable, among which acrylic acid, methacrylic acid, styrene sulfonic acid, 2-acrylamide-2-methylpropane sulfonic acid and 2-acrylamide-2-methylbutane sulfonic acid are more preferable.

The cationic group-containing monomers described above include e.g. monomers having tertiary amino groups such as dialkylaminoethyl methacrylate and dialkylaminoethyl acrylate.

The nonionic dispersible group-containing monomers include e.g. esters of polyethylene glycol monoalkyl ether and carboxylic acid monomer, esters of polyethylene glycol monoalkyl ether and sulfonic acid monomer, esters of polyethylene glycol monoalkyl ether and phosphoric acid monomer, vinyl group-containing urethane formed from polyethylene glycol monoalkyl ether and isocyanate group-containing monomer, and macro-monomers having polyvinyl alcohol structures.

The number of ethylene oxy repeating moieties in the polyethylene glycol monoalkyl ether is preferably 8 to 50, more preferably 10 to 30. The number of carbon atoms in the alkyl group in the polyethylene glycol monoalkyl ether is preferably 1 to 20, more preferably 1 to 12.

Now, the condensation polymers described above (polyurethane, polyester, polyamide, polyurea and polycarbonate) are described in detail.

The polyurethane is synthesized generally by polyaddition reaction of a diol compound with a diisocyanate compound as the starting materials.

The diol compound includes e.g. non-dissociable diols and ionic diols.

The non-dissociable diols include e.g. ethylene glycol, 1,2-propanediol, 1,3-propanediol, 1,2-butanediol, 1,3-butanediol, 2,3-butanediol, 2,2-dimethyl-1,3-propanediol, 1,2-pentanediol, 1,4-pentanediol, 1,5-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 2,2-diethyl-1,3-propanediol, 2,4-dimethyl-2,4-pentanediol, 1,7-heptanediol, 2-methyl-2-propyl-1,3-propanediol, 2,5-dimethyl-2,5-hexanediol, 2-ethyl-1,3-hexanediol, 1,2-octanediol, 1,8-octanediol, 2,2,4-trimethyl-1,3-pentanediol, 1,4-cyclohexane dimethanol, hydroquinone, diethylene glycol, triethylene glycol, dipropylene glycol, tripropylene glycol, polyethylene glycol (average molecular weight=200, 300, 400, 600, 1000, 1500, 4000), polypropylene glycol (average molecular weight=200, 400, 1000), polyester polyol, 4,4'-dihydroxy-diphenyl-2,2-propane, and 4,4'-dihydroxydiphenyl sulfone.

The anionic group-containing diols described above include e.g. 2,2-bis(hydroxymethyl) propionic acid, 2,2-bis(hydroxymethyl) butanoic acid, 2,5,6-trimethoxy-3,4-dihydroxyhexanoic acid, 2,3-dihydroxy-4,5-dimethoxypentanoic acid and 3,5-bis(2-hydroxy ethyloxycarbonyl) benzene sulfonic acid as well as salts thereof.

The diisocyanates described above include e.g. methylene diisocyanate, ethylene diisocyanate, isophorone diisocyanate, hexamethylene diisocyanate, 1,4-cyclohexane diisocyanate, 2,4-toluene diisocyanate, 2,6-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenyl methane diisocyanate, 3,3'-dimethyl biphenylene diisocyanate, 4,4'-biphenylene diisocyanate, dicyclohexyl methane diisocyanate, and methylenebis(4-cyclohexyl isocyanate).

The polyester described above is synthesized generally by dehydration condensation between a dicarboxylic acid compound and a diol compound.

Examples of the dicarboxylic acids include oxalic acid, malonic acid, succinic acid, glutaric acid, dimethyl malonic acid, adipic acid, pimelic acid, α,α-dimethyl succinic acid, acetone dicarboxylic acid, sebacic acid, 1,9-nonane dicarboxylic acid, fumaric acid, maleic acid, itaconic acid, citraconic acid, phthalic acid, isophthalic acid, terephthalic acid, 2-butyl terephthalic acid, tetrachloroterephthalic acid, acetylene dicarboxylic acid, poly(ethylene terephthalate) dicarboxylic acid, 1,2-cyclohexane dicarboxylic acid, 1,4-cyclohexane dicarboxylic acid, ω-poly(ethylene oxide) dicarboxylic acid, and p-xylylene dicarboxylic acid.

For polycondensation reaction with the diol compound, these compounds may be used in the form of alkyl dicarboxylate (e.g., dimethyl dicarboxylate), dicarboxylic acid chloride, or acid anhydride such as maleic anhydride, succinic anhydride and phthalic anhydride.

Preferable examples of the sulfonic acid group-containing dicarboxylic acid and diol compounds include sulfophthalic acids (3-sulfophthalic acid, 4-sulfophthalic acid, 4-sulfoisophthalic acid, 5-sulfoisophthalic acid, 2-sulfoterephthalic acid), sulfosuccinic acid, sulfonaphthalene dicarboxylic acids (4-sulfo-1,8-naphthalene dicarboxylic acid, 7-sulfo-1,5-naphthalene dicarboxylic acid etc.) and 3,5-bis(2-hydroxy ethyloxycarbonyl) benzene sulfonic acid as well as salts thereof.

As the diol compound, the same diol compounds as those described above for the starting materials of the polyurethane can be mentioned.

Typical methods of synthesizing the polyester described above include a method of condensation reaction of the diol compound with the dicarboxylic acid or a derivative thereof, a method of condensation of hydroxycarboxylic acids (e.g., 12-hydroxystearic acid), a method of ring-opening polymerization of a cyclic ether with a lactone (detailed in Lecture 6 on Polymerization Reaction, Ring-Opening Polymerization (I) (in Japanese), authored by Takeo Saegusa (Kagaku Dojin, 1971).

The above-mentioned polyamide can be obtained by polycondensation of a diamine compound with a dicarboxylic acid compound, by polycondensation of aminocarboxylic acid compounds, or by ring-opening polymerization of monomers such as lactams.

The diamine compound includes e.g. ethylenediamine, 1,3-propanediamine, 1,2-propanediamine, hexamethylenediamine, octamethylenediamine, o-phenylenediamine, m-phenylenediamine, p-phenylenediamine, piperazine, 2,5-dimethyl piperazine, 4,4'-diaminodiphenyl ether, 3,3'-diaminodiphenyl sulfone, xylylenediamine, etc.

As the dicarboxylic acid compound described above, the same dicarboxylic acid compounds as those described above for the starting materials of the polyester can be mentioned.

The aminocarboxylic acid compound described above includes e.g. glycine, alanine, phenylalanine, ω-aminohexanoic acid, ω-aminodecanoic acid, ω-aminodecanoic acid and anthranilic acid.

The monomer used in the ring-opening polymerization described above includes e.g. ε-caprolactam, azetidinone and pyrrolidone.

The polyurea can be obtained generally by polyaddition reaction of a diamine compound with a diisocyanate compound or by ammonia-eliminating reaction of the diamine compound with urea.

As the diamine compound, the same diamine compounds as those described above for the starting materials of the polyamide can be mentioned.

As the diisocyanate compound, the same diisocyanate compounds as those described above for the starting materials of the polyurethane can be mentioned.

The polycarbonate can be obtained generally by reacting a diol compound with phosgene or a carbonate derivative (e.g., aromatic esters such as diphenyl carbonate etc.).

As the diol compound, the same diol compounds as those described above for the starting materials of the polyurethane can be mentioned.

As compounds described above to form an oil-soluble polymer, one kind of compound may be used or two or more kinds of compounds may be used in combination in an arbitrary ratio depending on various objects (e.g. regulation of glass transition temperature (Tg) of the polymer, solubility thereof, compatibility thereof with dyes, and stability of the dispersion).

The oil-soluble polymers described above are preferably the polymers containing ionic group, more preferably the polymers containing carboxyl group and/or sulfonic acid group as the ionic group, particularly preferably the polymers containing carboxyl group.

An ionic group can be introduced by a reaction in which an acid anhydride (for example, maleic anhydride) acts on a reactive group such as a hydroxy group or an amino group after polymerization for producing the respective polymers.

The amount of the ionic group is preferably from 0.1 to 3.0 mmol/g.

If the amount is small, a self-emulsifying property of the polymer is small. If the amount is large, the water solubility of the polymer rises and the polymer tends to be unsuitable for dispersion of the dye.

Further, the ionic group may be alkali metals (e.g., Na, K etc.) or ammonium ion salts as the anionic group described above, or salts of organic acids (e.g., acetic acid, propionic acid, methane sulfonic acid) and inorganic acids (hydrochloric acid, sulfuric acid etc.) as the cationic group described above.

The oil-soluble polymers described above are particularly preferably the vinyl polymer, polyurethane, polyester etc. for impartment of compatibility with the oil-soluble dyes, impartment of excellent dispersion stability, and easy introduction of ionic groups.

Specific examples (PA-1) to (PA-41) of the vinyl polymer are listed below. Ratios in following parentheses indicate ratios by mass. The present invention is not limited to these specific examples.

(PA-1) methyl methacrylate/ethyl acrylate copolymer (50:50)
(PA-2) n-butyl acrylate/styrene copolymer (50:50)
(PA-3) poly n-butyl methacrylate
(PA-4) polyisopropyl methacrylate
(PA-5) poly(4-tert-butylphenyl acrylate)
(PA-6) (n-butyl methacrylate/N-vinyl-2-pyrrolidone copolymer(90:10)
(PA-7) methyl methacrylate/vinyl chloride copolymer (70:30)
(PA-8) isobutyl methacrylate/n-butyl acrylate copolymer (55:45)
(PA-9) vinyl acetate/acrylamide copolymer(85:15)
(PA-10) n-butyl acrylate/methyl methacrylate/n-butyl methacrylate copolymer(35:35:30)
(PA-11) ethyl methacrylate/n-butyl acrylate copolymer (70:30)
(PA-12) tert-butylmethacrylamide/methyl methacrylate/acrylic acid copolymer (60:30:10)
(PA-13) n-butyl acrylate/acrylic acid copolymer (80:20)
(PA-14) sec-butyl acrylate/acrylic acid copolymer (85:15)
(PA-15) isopropyl acrylate/acrylic acid copolymer(90:10)
(PA-16) n-butyl acrylate/2-hydroxyethyl methacrylate/acrylic acid (85:5:10)
(PA-17) isobutyl methacrylate/tetrahydrofurfuryl acrylate/acrylic acid copolymer(60:30:10)
(PA-18) n-butyl methacrylate/1H,1H,2H,2H-perfluorodecyl acrylate/acrylic acid (75:20:5)
(PA-19) methyl methacrylate/n-butyl acrylate/acrylic acid (50:45:5)
(PA-20) 3-methoxybutyl methacrylate/styrene/acrylic acid copolymer (35:50:15)
(PA-21) ethyl acrylate/phenyl methacrylate/acrylic acid copolymer (72:15:13)
(PA-22) isobutyl methacrylate/methacrylic ester of polyethylene glycol monomethyl ether (repetition number of ethyleneoxy chains: 23)/acrylic acid (70:20:10)
(PA-23) ethyl methacrylate/acrylic acid copolymer (95:5)
(PA-24) isobutyl acrylate/p-methoxystyrene/acrylic acid copolymer (75:15:10)
(PA-25) isobutyl acrylate/N-vinylpyrrolidone/acrylic acid copolymer (60:30:10)

(PA-26) 2,2,2-tetrafluoroethyl methacrylate/methyl methacrylate/methacrylic acid (25:60:15)

(PA-27) ethyl methacrylate/2-ethyoxyethyl methacrylate/methacrylic acid copolymer (70:15:15)

(PA-28) tert-octylacrylamide/n-propyl methacrylate/methacrylic acid copolymer(20:65:15)

(PA-29) n-butyl methacrylate/diphenyl-2-methacryloyloxyethyl phosphate/methacrylic acid copolymer (80:5:15)

(PA-30) n-butyl methacrylate/phenyl acrylamide/methacrylic acid copolymer (70:15:15)

(PA-31) n-butyl methacrylate/N-vinylpyrrolidone/methacrylic acid copolymer (70:15:15)

(PA-32) n-butyl methacrylate/styrenesulfonic acid copolymer (90:10)

(PA-33) isobutyl methacrylate/styrenesulfonic acid copolymer (90:10)

(PA-34) n-butyl methacrylate/2-acrylamide/2-methylethane sulfonic acid copolymer (90:10)

(PA-35) isobutyl acrylate/n-butyl methacrylate/2-acrylamide-2-methylethanesulfonic acid copolymer (70:20:10)

(PA-36) ethyl acrylate/tert-butyl methacrylate/2-acrylamide-2-methylpropanesulfonic acid copolymer (60:30:10)

(PA-37) tert-butyl acrylate/tetrahydrofurfuryl acrylate/2-methylpropanesulfonic acid copolymer (50:40:10)

(PA-38) tert-butyl acrylate/methacrylic ester of polyethylene glycol monomethyl ether (repetition number of ethyleneoxy chains: 23)/2-acrylamide-2-methylpropanesulfonic acid copolymer (60:30:10)

(PA-39) isobutyl acrylate/N-vinylpyrrolidone/2-acrylamide-2-methylpropanesulfonic acid copolymer (60:30:10)

(PA-40) n-butyl methacrylate/sodium 2-acrylamide-2-methylpropanesulfonate copolymer (98:2)

(PA-41) n-butyl methacrylate/tert-butyl methacrylate/2-acrylamide-2-methylbutanesulfonic acid copolymer (50:35:15)

Specific examples (PC-1)–(PC-21) of the above-mentioned condensed polymer are listed up in the form of ingredient monomers thereof. However, examples (PC-17) –(PC-21) are listed up in a polymer form. The present invention is not limited to these examples.

Acidic groups in the respective polymers are indicated in a non-dissociated form. Products by condensation reaction of polyester, polyamide or the like are represented by names of dicarboxylic acid, diol, diamine, hydroxycarboxylic acid, aminocarboxylic acid or the like. Ratios in following parentheses and n, x and y in examples (PC-17) to (PC-21) indicate ratios by mole percentage of respective components.

(PC-1) toluene diisocyanate/ethylene glycol/1,4-butanediol (50/15/35)

(PC-2) toluene diisocyanate/hexamethylene diisocyanate/ethylene glycol/polyethylene glycol (Mw=600)/1,4-butanediol (40/10/20/10/20)

(PC-3) 4,4'-diphenylmethane diisocyanate/hexamethylene diisocyanate/tetraethylene glycol/ethylene glycol/2,2-bis(hydroxymethyl)propionic acid (40/10/20/20/10)

(PC-4) 1,5-naphthalene diisocyanate/butanediol/4,4'-dihydroxy-diphenyl-2,2'-propane/polypropylene glycol (Mw=400)/2,2-bis(hydroxymethyl)propionic acid (50/20/5/10/15)

(PC-5) isophorone diisocyanate/diethylene glycol/neopentyl glycol/2,2-bis(hydroxymethyl)propionic acid (50/20/20/10)

(PC-6) diphenylmethane diisocyanate/hexamethylene diisocyanate/tetraethylene glycol/butanediol/3,5-bis(2-hydroxy ethyloxycarbonyl) benzene sulfonic acid (40/10/10/33/7)

(PC-7) terephthalic acid/isophthalic acid/cyclohexanedimethanol/1,4-butanediol/ethylene glycol (25/25/25/15/10)

(PC-8) terephthalic acid/isophthalic acid/4,4'-dihydroxy-diphenyl-2,2-propane/tetraethylene glycol/ethylene glycol (30/20/20/15/15)

(PC-9) terephthalic acid/isophthalic acid/1,4-benzenedimethanol/diethylene glycol/neopentyl glycol (25/25/25/15/10)

(PC-10) terephthalic acid/isophthalic acid/5-sulfoisophthalic acid/ethylene glycol/neopentyl glycol (24/24/2/25/25)

(PC-11) 11-aminodecanoic acid (100)

(PC-12) a reaction product of poly(12-aminodecanoic acid) and maleic anhydride (PC-13) hexamethylenediamine/adipic acid (50/50)

(PC-14) N,N-dimethylethylenediamine/adipic acid/cyclohexanedicarboxylic acid (50/20/30)

(PC-15) toluene diisocyanate/4,4'-diphenylmethane diioscyanate/hexamethylenediamine (30/20/50)

(PC-16) hexamethylenediamine/nonamethylenediamine/urea (25/25/50)

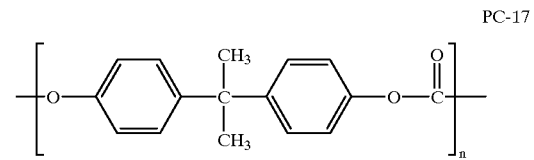

PC-17

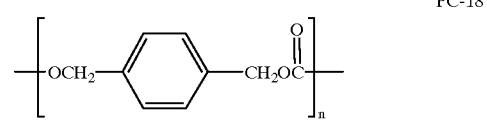

PC-18

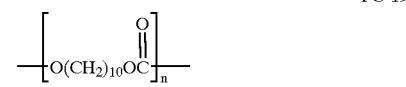

PC-19

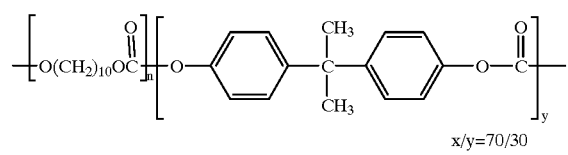

PC-20 x/y=70/30

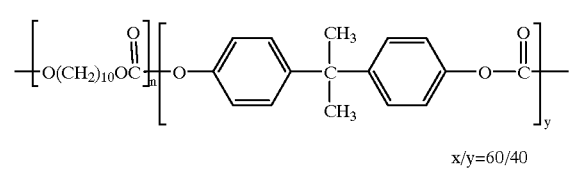

PC-21 x/y=60/40

The molecular weight (Mw) of the oil-soluble polymer is usually from 1000 to 200000, and preferably from 2000 to 50000.

If the molecular weight is below 1000, it becomes difficult to obtain a stable coloring composition. If the molecular weight is over 200000, solubility of the oil-soluble polymer in the organic solvent deteriorates and viscosity of this solution increases so that it becomes difficult for the organic solvent to disperse.

The following will describe the process for producing a coloring composition containing coloring particulates.

The coloring composition of the present invention can be produced by dispersing the oil-soluble dye and the oil-soluble polymer, in the form of coloring particulates, into a water-based solvent (a liquid containing at least water).

Examples of this production process include a process of preparing a latex of the oil-soluble polymer beforehand, and then impregnating the latex with the oil-soluble dye, or a co-emulsification dispersion process.

Of theses processes, the co-emulsification dispersion process is preferred. As the co-emulsification dispersion process, preferred is a process of performing either of addition of water to an organic solvent containing the oil-soluble polymer and the oil-soluble dye, or addition of such an organic solvent to water, and then emulsifying the organic solvent to make the same into particles.

The latex means a dispersion of particulates of the water-insoluble but oil-soluble polymer in a water-based medium. The dispersion may be in any form of the oil-soluble polymer emulsified, emulsion-polymerized or dispersed as micelles in the water-based medium, or dispersed in the form of molecule with a molecular chain having a partially hydrophilic structure in the oil-soluble polymer.

Now, the method of preparing the oil-soluble polymer latex and then impregnating it with the oil-soluble dye is described.

A first example of this method comprises the first step of preparing of a latex of the oil-soluble polymer, the second step of preparing a dye solution having the oil-soluble dye dissolved in an organic solvent, and the third step of mixing the dye solution with the latex of the oil-soluble polymer to prepare a coloring composition.

A second example of this method comprises the step of preparing a latex of the oil-soluble polymer, the second step of preparing a dye solution having the oil-soluble dye dissolved in an organic solvent and mixing this dye solution with a liquid containing at least water to prepare a dispersion of the dye particulates, and the third step of mixing the latex of the oil-soluble polymer and the dispersion of the dye particulates, to prepare a coloring composition.

As a third example of this method, a method described in JP-A No. 55-139471 is mentioned.

Now, the method of co-emulsification and dispersion is described.

A first example of this method comprises the first step of preparing a solution having the oil-soluble dye and the oil-soluble polymer dissolved in an organic solvent and the second step of mixing said organic solvent containing the oil-soluble polymer and dye with a liquid containing at least water to prepare a coloring composition.

A second example of this method comprises the first step of preparing a dye solution having the oil-soluble dye dissolved in an organic solvent, the second step of preparing an oil-soluble polymer solution having the oil-soluble polymer dissolved in an organic solvent, and the third step of mixing the dye solution and the oil-soluble polymer with a liquid containing at least water to prepare a coloring composition.

A third example of this method comprises the first step of preparing a dye solution having the oil-soluble dye dissolved in an organic solvent and then mixing this dye solution with a liquid containing at least water to prepare a dispersion of the dye particulates, the second step of preparing an oil-soluble polymer solution having the oil-soluble polymer dissolved in an organic solvent and then mixing the oil-soluble polymer solution with a liquid containing at least water to prepare a dispersion of the oil-soluble polymer particulates, and the third step of mixing the dispersion of the dye particulates with the dispersion of the oil-soluble polymer particulates to prepare a coloring composition.

A fourth example of this method comprises the first step of preparing a dye solution having the oil-soluble dye dissolved in an organic solvent and then mixing this dye solution with a liquid containing at least water to prepare a dispersion of the dye particulates, the second step of preparing an oil-soluble polymer solution having the oil-soluble polymer dissolved in an organic solvent, and the third step of mixing the dispersion of the dye particulates and the solution of the oil-soluble polymer to prepare a coloring composition.

A fifth example of this method comprises the step of mixing a liquid containing at least water with the oil-soluble dye and the oil-soluble polymer to directly prepare a coloring composition.

The content of the oil-soluble polymer in the coloring composition is preferably 10 to 1000 mass parts, more preferably 50 to 600 mass parts, relative to 100 mass parts of the oil-soluble dye.

If the content of the polymer is less than 10 mass parts, formation of a fine and stable dispersion tends to be difficult, while if the content is more than 1000 mass parts, there is the tendency that the ratio of the oil-soluble dye in the dispersion of the coloring particulates is decreased, thus reducing allowance in compounding design when the dispersion of the coloring particulates is used as an aqueous ink.

The organic solvent used in production of the coloring composition is not particularly limited, and can be selected as necessary depending on the solubility of the oil-soluble dye and the polymer, and mention is made of ketone type solvents such as acetone, methyl ethyl ketone and diethyl ketone, alcohol type solvents such as methanol, ethanol, 2-propanol, 1-propanol, 1-butanol and tert-butanol, chlorine type solvents such as chloroform and methylene chloride, aromatic solvents such as benzene and toluene, ester type solvents such as ethyl acetate, butyl acetate and isopropyl acetate, ether type solvents such as diethyl ether, tetrahydrofuran and dioxane, and glycol ether type solvents such as ethylene glycol monomethyl ether and ethylene glycol dimethyl ether.

These organic solvents may be used singly or in combination thereof. Depending on the solubility of the dye and the oil-soluble polymer, the solvent may be mixed with water prior to use.

The amount of the organic solvent used is not particularly limited insofar as the effect of the present invention is not impaired, but its amount is preferably 10 to 2000 mass parts, more preferably 100 to 1000 mass parts, relative to 100 mass parts of the oil-soluble polymer.

If the amount of the organic solvent used is less than 10 mass parts, a fine and stable dispersion of coloring particulates tends to be hardly formed because of higher viscosity of the organic phase, while if it is more than 2000 mass parts, the cumbersome step of desolvation and concentration for removal of the organic solvent is essential, thus reducing allowance in compounding.

If the solubility of the organic solvent in water is 10% or less or the vapor pressure of the organic solvent is larger than that of water, the organic solvent is preferably removed for stability of the dispersion of the coloring particulates.

The organic solvent can be removed at 10 to 100° C. under normal pressures to reduced pressure and preferably at 40 to 100° C. under normal pressures or at 10 to 50° C. under reduced pressure.

The coloring composition may contain additives selected as necessary depending on the object insofar as the effect of the present invention is not impaired.

The additives include e.g. a neutralizing agent, a dispersant and a dispersion stabilizer.

When the oil-soluble polymer has the ionic group not neutralized, the neutralizing agent can be used preferably for pH adjustment of the dispersion of the coloring particulates, for regulation of the self-emulsification ability and for impartment of dispersion stability. The neutralizing agent may be added to the polymer before, during or after preparation of its dispersion.

The neutralizing agent includes organic bases and inorganic alkalis for anionic groups or organic acids and inorganic acids for cationic groups.

Among the neutralizing agents for anionic groups, the organic bases include triethanolamine, diethanolamine, N-methyl diethanolamine and dimethyl ethanolamine, while the inorganic alkalis include alkali metal hydroxides (e.g., sodium hydroxide, lithium hydroxide, potassium hydroxide etc.), carbonates (e.g., sodium carbonate, sodium hydrogen carbonate etc.), and ammonia.

Examples of the neutralizing agent for the cationic group include organic acids (for example, oxalic acid, formic acid, acetic acid, methanesulfonic acid, p-toluenesulfonic acid and the like) and inorganic acids (for example, hydrochloric acid, phosphoric acid, and sulfuric acid).

From the viewpoint of improving the dispersion stability of the coloring composition, the neutralizing agent is added so as to adjust the dispersion to pH 4.5–10.0, more preferably pH 6–10.0.

The dispersant and the dispersion stabilizer described above may be added to any one of the oil-soluble polymer latex, the oil-soluble polymer solution, the dye solution and the liquid containing at least water, but these are added preferably to the oil-soluble polymer dispersion and/or the oil-soluble polymer solution, the dye solution or the liquid containing at least water before preparation of the dye particulates dispersion of the present invention.

The dispersion and the dispersion stabilizer include cationic, anionic and nonionic surfactants, water-soluble or water-dispersible low molecular compounds, oligomers etc.

The amount of the dispersion and the dispersion stabilizer added is 0 to 100% by mass, preferably 0 to 20% by mass, relative to the total amount of the oil-soluble dye and the oil-soluble polymer.

The coloring composition preferably contains a high boiling point organic solvent that will be specifically described later.

The content of the high boiling point organic solvent in the coloring composition is preferably 1 to 1000 mass parts, more preferably 10 to 400 mass parts, relative to 100 mass parts of the oil-soluble dye.

The high boiling point organic solvent may be used alone or in a combination of two or more.

The amount of the coloring particulates in the coloring composition is preferably from 1 to 45% and more preferably from 2 to 30% by mass. This amount can be appropriately adjusted by dilution, evaporation, ultrafiltration or the like.

The average particle size of the coloring particulates is preferably from 1 to 500 nm and more preferably from 3 to 300 nm. Particle size distribution is not limited, and may be broad or monodispersive. The particle size and the particle size distribution can be adjusted by centrifugal separation, filtration or the like.

High Boiling Point Organic Solvent

The boiling point of the high boiling point organic solvent must be 150° C. or higher, and is preferably 170° C. or higher, so as to maintain preservation stability of images and inks.

The dielectric constant of the high boiling point organic solvent must be from 3 to 12, and is preferably from 4 to 10, in order to improve solubility of the dye. The dielectric constant means a dielectric constant relative to a vacuum at 25° C.

The type of the high boiling point organic solvent is not limited, and can be selected depending on purposes of this solvent. Examples thereof include compounds described in U.S. Pat. No. 2,322,027. Preferred examples thereof include high boiling point organic solvents composed of phosphates, aliphatic acid esters, phthalic esters, benzoic esters, phenols and amides.

As the high boiling point organic solvents, compounds represented by the following formulae [S-1]–[S-9] are particularly preferable.

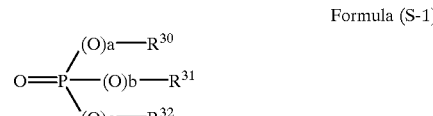

Formula (S-1)

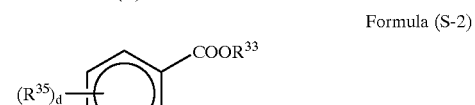

Formula (S-2)

Formula (S-3)

Formula (S-4)

Formula (S-5)

Formula (S-6)

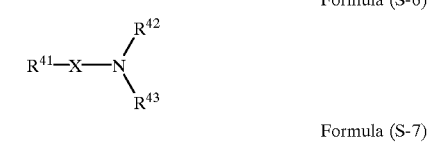

Formula (S-7)

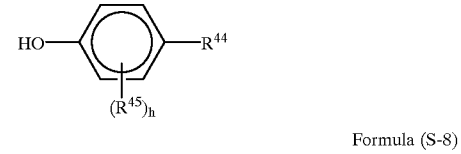

Formula (S-8)

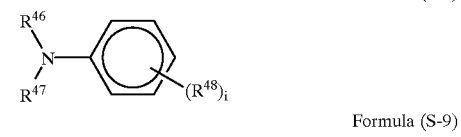

Formula (S-9)

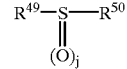

In the formula [S-1], $R^{30}$, $R^{31}$ and $R^{32}$ each independently represents an aliphatic group or an aryl group. Symbols a, b, and c each independently represents 0 or 1.

In the formula [S-2], $R^{33}$ and $R^{34}$ each independently represents an aliphatic group or an aryl group.

$R^{35}$ is a halogen atom (the halogen atom is F, Cl, Br or I, which is the same as in the following), an alkyl group, an alkoxy group, an aryloxy group, an alkoxycarbonyl group, or an aryloxycarbonyl group.

Symbol d is an integer of 0 to 3, and when d is 2 or more, $R^{35}$s may be the same or different.

In the formula [S-3], Ar represents an aryl group, and symbol e is an integer of 1 to 6. $R^{36}$ represents a hydrocarbon group or a hydrocarbon group having an ether bond therein, which is having e valences.

In the formula [S-4], $R^{37}$ represents an alipahtic group, and symbol f is an integer of 1 to 6. $R^{38}$ represents a hydrocarbon group or a hydrocarbon group having an ether bond therein, which is having f valences.

In the formula [S-5], symbol g is an integer of 2 to 6. $R^{39}$ represents a hydrocarbon group (except any aryl group) having g valences. $R^{40}$ represents an aliphatic group or an aryl group.

In the formula [S-6], $R^{41}$, $R^{42}$ and $R^{43}$ each independently represents a hydrogen atom, an aliphatic group or an aryl group. X represents —CO— or $SO_2$—. $R^{41}$ and $R^{42}$, or $R^{42}$ and $R^{43}$ may be bonded to each other to form a ring.

In the formula [S-7], $R^{44}$ represents an aliphatic group, alkoxycarbonyl group, an aryloxycarbonyl group, an alkylsulfonyl group, an arylsulfonyl group, an aryl group or a cyano group.

$R^{45}$ represents a halogen atom, an aliphatic group, an aryl group, an alkoxy group or an aryloxy group.

Symbol h is an integer of 0 to 3. In the case that h is 2 or more, $R^{45}$s may be the same or different.

In the formula [S-8], $R^{46}$ and $R^{47}$ each independently represents an aliphatic group or an aryl group. $R^{48}$ is a halogen atom, an aliphatic group, an aryl group, an alkoxy group or an aryloxy group. Symbol i is an integer of 0 to 4. In the case that i is 2 or more, $R^{48}$s may be the same or different.

In the formula [S-9], $R^{49}$ and $R^{50}$ each independently represents an aliphatic group or an aryl group. Symbol j is 1 or 2.

When $R^{30}$ to $R^{35}$, $R^{37}$, $R^{40}$ to $R^{50}$ are aliphatic groups or groups containing an aliphatic group in the formulae [S-1] to [S-9], the aliphatic groups may be any one of straight chain, branched chain and cyclic forms, may contain an unsaturated bond, and may have a substituent. Examples of the substituent include a halogen atom, an aryl group, an alkoxy group, an aryloxy group, an alkoxycarbonyl group, a hydroxyl group, an acyloxy group and an epoxy group.

When $R^{30}$ to $R^{35}$, $R^{37}$, $R_{40}$ to $R^{50}$ are cyclic alipahtic groups, i.e., cycloalkyl groups, or groups containing a cycloalkyl group in the formulae [S-1] to [S-9], the cycloalkyl group may contain an unsaturated bond in its 3 to 8-membered ring or may have a substituent or a crosslinking group. Examples of the substituent include a halogen atom, an aliphatic group, a hydroxyl group, an acyl group, an aryl group, an alkoxy group, an epoxy group, and an alkyl group. Examples of the crosslinking group include a methylene group, an ethylene group, and an isopropylidene group.

When $R^{30}$ to $R^{35}$, $R^{37}$, $R^{40}$ to $R^{50}$ are aryl groups or groups containing an aryl group in the formulae [S-1] to [S-9], the aryl group may be substituted with a halogen atom, an aliphatic group, an aryl group, an alkoxy group, an aryloxy group, an alkoxycarbonyl group or the like.

When $R^{36}$, $R^{38}$ or $R^{39}$ is a hydrocarbon group in the formulae [S-3], [S-4] and [S-5], the hydrocarbon group may contain a cyclic structure (for example, a benzene ring, a cyclopentane ring or a cyclohexane ring), an unsaturated bond or a substituent. Examples of the substituent include a halogen atom, a hydroxyl group, an acyloxy group, an aryl group, an alkoxy group, an aryloxy group, and an epoxy group.

The following will describe particularly preferable high boiling point organic solvents in the present invention.

In the formula [S-1], $R^{30}$, $R^{31}$ and $R^{32}$ each represents an aliphatic group having 1–24 (preferably 4–18) carbon atoms (for example, n-butyl, 2-ethylhexyl, 3,3,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, 4-methylcyclohexyl, or an aryl group having 6–24 (preferably 6–18) carbon atoms (for example, phenyl, cresyl, p-nonylphenyl, xylyl, cumenyl, p-methoxyphenyl and p-methoxycarbonylphenyl).

Symbols a, b and c each independently represents 0 or 1, and preferably a, b and c each represents 1.

In the formula [S-2], $R^{33}$ and $R_{34}$ each represents an aliphatic group having 1–24 (preferably 4–18) carbon atoms (for example, the same alkyl groups as described as $R^{30}$, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, and 1-methylcyclohexyl), or an aryl group having 6–24 (preferably 6–18) carbon atoms (for example, the same aryl groups as described as $R^{30}$, 4-t-butylphenyl, 4-t-octylphenyl, 1,3,5-trimethylphenyl, 2,4-di-t-butylphenyl, and 2,4-di-t-pentylphenyl).

$R^{35}$ represents a halogen atom (preferably Cl), an alkyl group having 1–18 carbon atoms (for example, methyl, isopropyl, t-butyl, and n-dodecyl), an alkoxy group having 1–18 carbon atoms (for example, methoxy, n-butoxy, n-octyloxy, methoxyethoxy, and benzyloxy), an aryloxy group having 6–18 carbon atoms (for example, phenoxy, p-tolyloxy, 4-methoxyphenoxy, 4-t-butylphenoxy), an alkoxycarbonyl group having 2–19 carbon atoms (for example, methoxycarbonyl, n-butoxycarbonyl and 2-ethylhexyloxycarbonyl), or an aryloxycarbonyl group having 6–25 carbon atoms.

Symbol d represents 0 or 1.

In the formula [S-3], Ar represents an aryl group having 6–24 (preferably 6–18) carbon atoms (for example, phenyl, 4-chlorophenyl, 4-methoxyphenyl, 1-naphthyl, 4-n-butoxyphenyl, and 1,3,5-trimethylphenyl), and e is an integer of 1–4 (preferably 1–3). $R^{36}$ represents a hydrocarbon having e valences and 2–24 (preferably 2–18) carbon atoms [for example, the same alkyl groups as described as $R^{33}$, a cycloalkyl group, an aryl group, —$(CH_2)_2$—, the following groups],

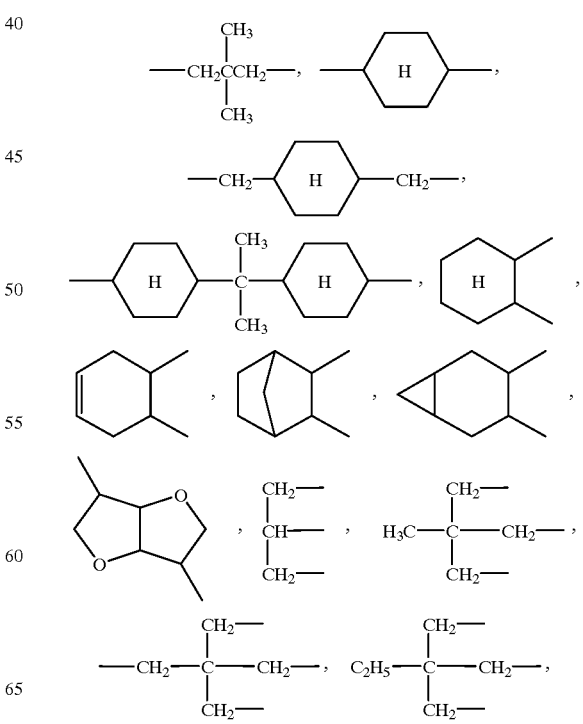

—(CH₂)₆—,

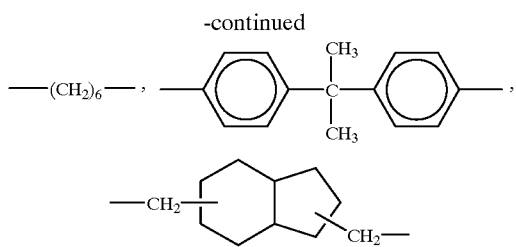

Alternatively, Ar represents a hydrocarbon group having e valences and 4–24 (preferably 4–18) carbon atoms, and having an ether bond therein [for example, —CH₂CH₂OCH₂CH₂—, —CH₂CH₂(OCH₂CH₂)₃—, —CH₂CH₂CH₂OCH₂CH₂CH₂—, and the following groups].

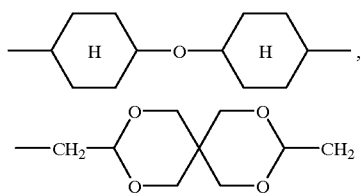

In the formula [S-4], $R^{37}$ represents an aliphatic group having 1–24 (preferably 3–17) carbon atoms (for example, n-propyl, 1-hydroxyethyl, 1-ethylpentyl, n-undecyl, pentadecyl, 8,9-epoxyheptadecyl, cyclopropyl, cyclohexyl, and 4-methylcyclohexyl), and f is an integer of 1–4 (preferably 1–3). $R^{38}$ represents a hydrocarbon group having f valences and 2–24 (preferably 2–18) carbon atoms, or a hydrocarbon group having f valences and 4–24 (preferably 4–18) carbon atoms and having an ether bond therein (for example, the same groups as described as $R^{36}$).

In the formula [S-5], g is 2–4 (preferably 2 or 3), and $R^{39}$ represents a hydrocarbon group having g valences [for example, —CH₂—, —(CH₂)₂—, —(CH₂)₄—, —(CH₂)₇— and the following groups].

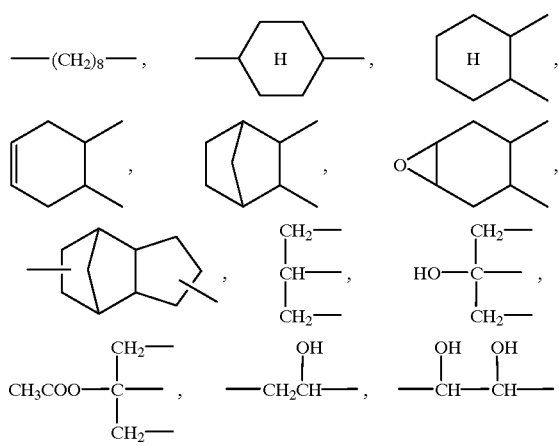

$R^{40}$ represents an aliphatic group having 1–24 (preferably 4–18) carbon atoms, or an aryl group having 6–24 (preferably 6–18) carbon atoms (for example, the same aliphatic groups and aryl groups as described as $R^{33}$).

In the formula [S-6], $R^{41}$ represents an aliphatic group having 1–20 carbon atoms [for example, n-propyl, 1-ethylpentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy)propyl, cyclohexyl, and 4-methylcyclohexyl], or an aryl group having 6–24 (preferably 6–18) carbon atoms (for example, the same aryl groups as described as the above-mentioned Ar).

$R^{42}$ and $R^{43}$ each represents an aliphatic group having 1–24 (preferably 3–18) carbon atoms (for example, isopropyl, n-butyl, n-hexyl, 2-ethylhexyl, n-dodecyl, cyclopentyl, and cyclopropyl), or an aryl group having 6–18 (preferably 6–15) carbon atoms (for example, phenyl, 1-naphthyl and p-tolyl).

$R^{42}$ and $R^{43}$ may be bonded to each other to form, together with N, a pyrrolidine ring, a piperidine ring, or a morpholine ring. $R^{41}$ and $R^{42}$ may be bonded to each other to form a pyrrolidone ring.

X represents —CO— or —SO₂—, and is preferably —CO—.

In the formula [S-7], $R^{44}$ represents an aliphatic group having 1–24 (preferably 3–18) carbon atoms (for example, methyl, isopropyl, t-butyl, t-pentyl, t-hexyl, t-octyl, 2-butyl, 2-hexyl, 2-octyl, 2-dodecy, 2-hexadecyl, t-pentadecyl, cyclopentyl and cyclohexyl), an alkoxycarbonyl group having 2–24 (preferably 5–17) carbon atoms (for example, n-butoxycarbonyl, 2-ethylhexyloxycarbonyl, and n-dodecyloxycarbonyl), an alkylsulfonyl group having 1–24 (preferably 3–18) carbon atoms (for example, n-butylsulfonyl and n-dodecylsulfonyl), an arylsulfonyl group having 6–30 (preferably 6–24) carbon atoms (for example, p-tolylsulfonyl, p-dodecylphenylsulfonyl and p-hexadecyloxyphenylsulfonyl), an aryl group having 6–32 (preferably 6–24) carbon atoms (for example, phenyl and p-tolyl), or a cyano group.

$R^{45}$ represents a halogen atom (preferably Cl), an alkyl group having 1–24 (preferably 3–18) carbon atoms (for example, the same alkyl groups as described as $R^{44}$), a cycloalkyl group having 5–17 carbon atoms (for example, cyclopentyl and cyclohexyl), an aryl group having 6–32 (preferably 6–24) carbon atoms (for example, phenyl and tolyl), an alkoxy group having 1–24 (preferably 1–18) carbon atoms (for example, methoxy, n-butoxy, 2-ethylhexyloxy, benzyloxy, n-dodecyloxy and n-hexadecyloxy), and an aryloxy group having 6–32 (preferably 6–24) carbon atoms (for example, phenoxy, p-t-butylphenoxy, p-t-octylphenoxy, m-pentadecylphenoxy and p-dodecyloxyphenoxy), and h is an integer of 1 or 2.

In the formula [S-8], $R^{46}$ and $R^{47}$ are the same as $R^{42}$ and $R^{43}$, and $R^{48}$ is the same as $R^{45}$.

In the formula [S-9], $R^{49}$ and $R^{50}$ are the same as $R^{30}$, $R^{31}$ and $R^{32}$, and j is 1 or 2 and is preferably 1.

The following will list up specific examples of the high boiling point organic solvent (S-1 to S-23 as compounds represented by the formula [S-1], S-24 to S-39 as compounds represented by the formula [S-2], S-40 to S-44 as compounds represented by the formula [S-3], S-45 to S-50 as compounds represented by the formula [S-4], S-51 to S-58 as compounds represented by the formula [S-5], S-59 to S-67 as compounds represented by the formula [S-6], S-68 to S-75 as compounds represented by the formula [S-7], S-76 to S-79 as compounds represented by the formula [S-8], and S-80 to S-81 as compounds represented by the formula [S-9]).

Compound represented by the formula [S-1]
S-1
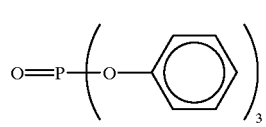
S-2
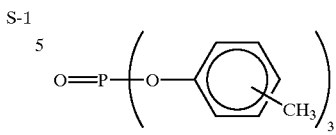
S-3
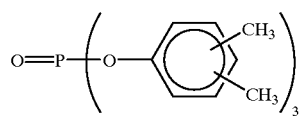
S-4
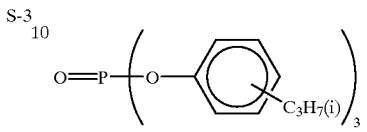
S-5
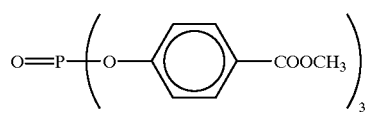
S-6
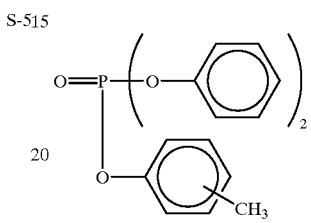
S-7
$O{=}P(OC_4H_9(n))_3$
S-8
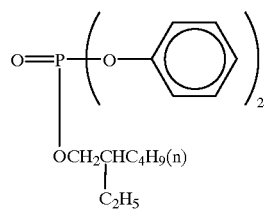
S-9
$O{=}P(OCH_2CHC_4H_9(n))_3$
   $\quad\quad\quad\quad\quad\;\, |$
   $\quad\quad\quad\quad\;\; C_2H_5$
S-10
$O{=}P(OC_6H_{13}(n))_3$
S-11
$O{=}P(OC_{12}H_{25}(n))_3$
S-12
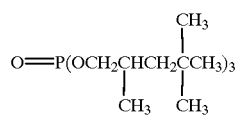
S-13
$O{=}P(O(CH_2)_8CH{=}CHC_8H_{17}(n))_3$
S-14
$O{=}P(OC_{16}H_{33}(n))_3$
S-15
$O{=}P(OCH_2CH_2OC_4H_9(n))_3$
S-16
$O{=}P(OCH_2CH_2Cl)_3$
S-17
$O{=}P(OCH_2CHCH_2Cl)_3$
   $\quad\quad\quad\quad\; |$
   $\quad\quad\quad\quad Cl$
S-18
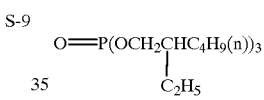
S-19
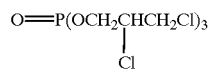
S-20
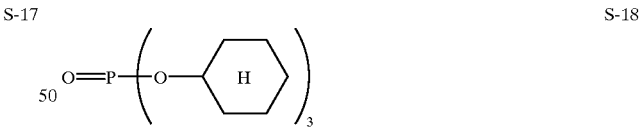
S-21
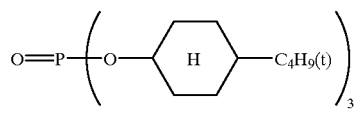
S-22
$((n)C_8H_{17}O)_3P{=}O$
S-23
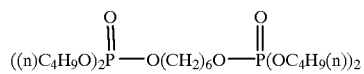

Compound represented by the formula [S-2]
S-24 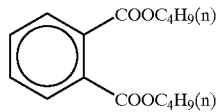
S-25 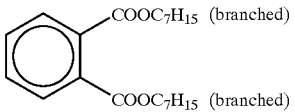
S-26 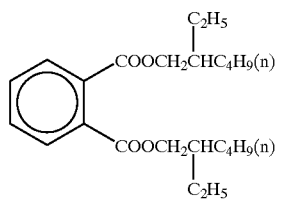
S-27 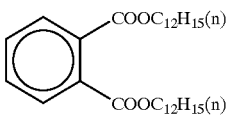
S-28 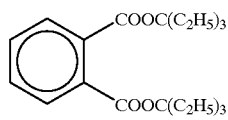
S-29 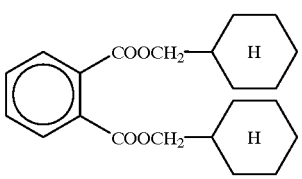
S-30 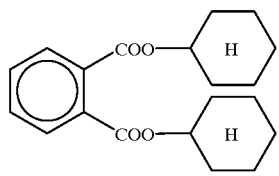
S-31 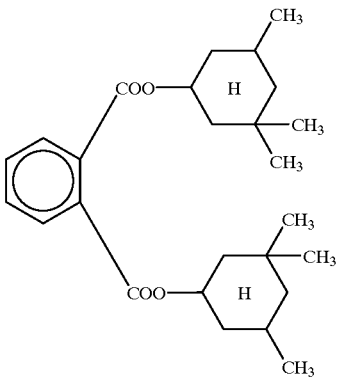
S-32 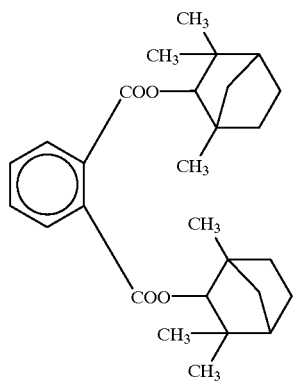
S-33 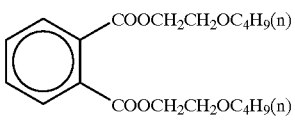
S-34 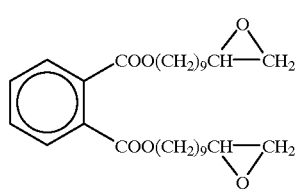
S-35 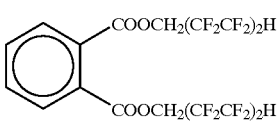

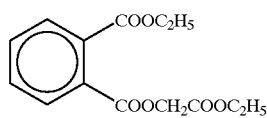
S-36
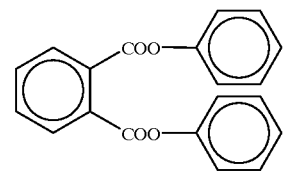
S-37
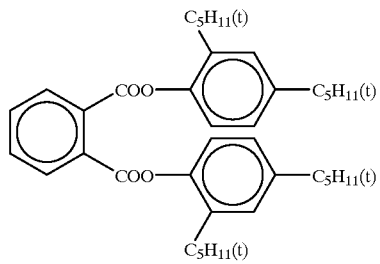
S-38
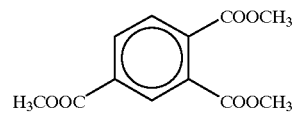
S-39
Compound represented by the formula [S-3]
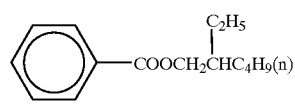
S-40
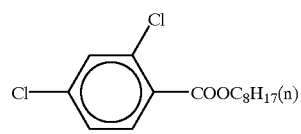
S-41
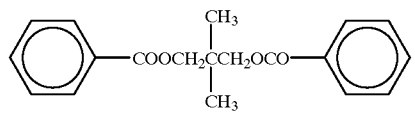
S-42
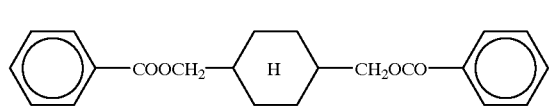
S-43
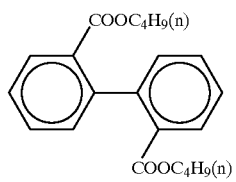
S-44
-continued
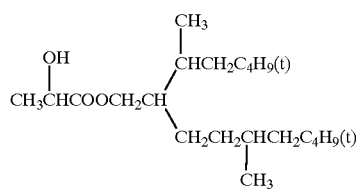
S-47
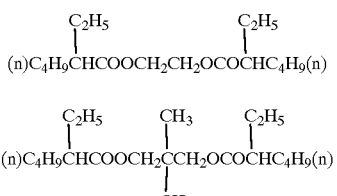
S-48
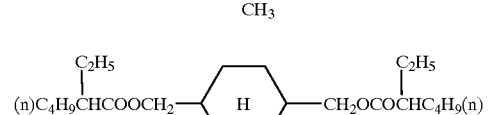
S-49
S-50
Compound represented by the formula [S-5]
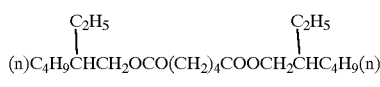
S-51
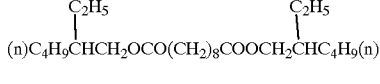
S-52
(n)C₄H₉OCO(CH₂)₈COOC₄H₉(n)
S-53
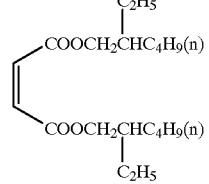
S-54
Compound represented by the formula [S-4]
(n)C₁₅H₃₁COOC₁₆H₃₃(n)
S-45
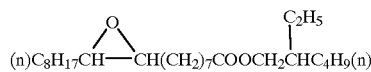
S-46

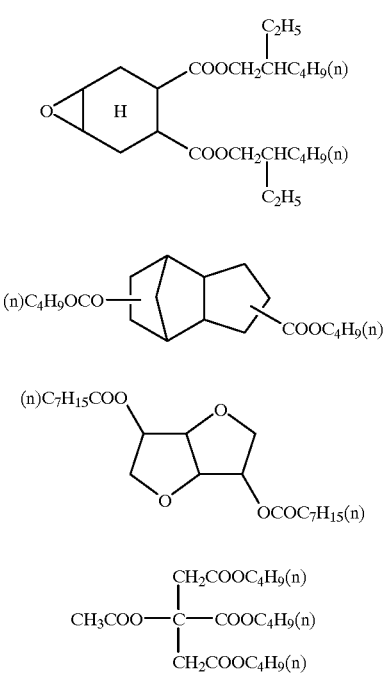
Compound represented by the formula [S-6]
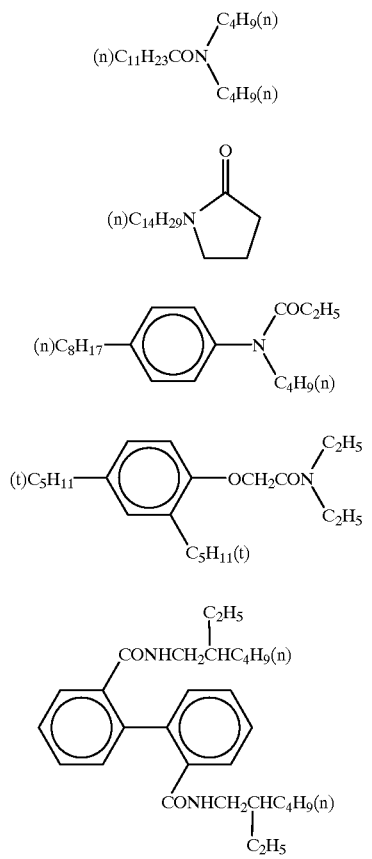
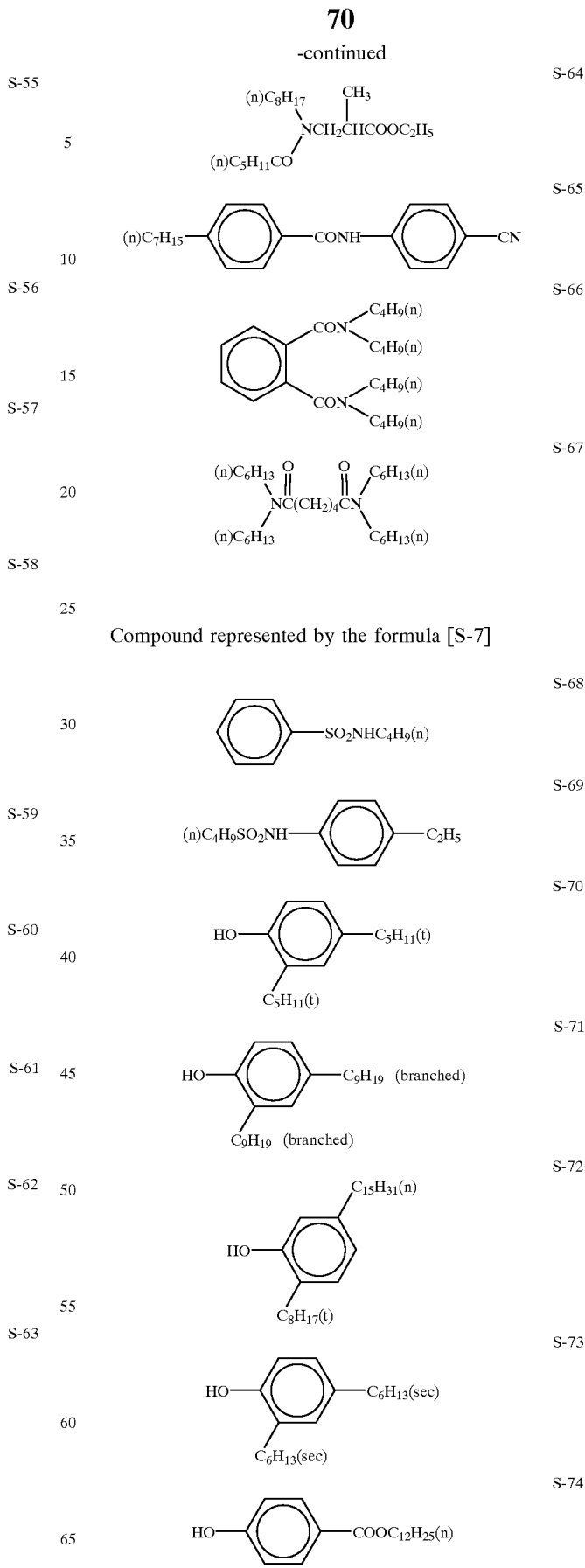
Compound represented by the formula [S-7]

-continued

S-75

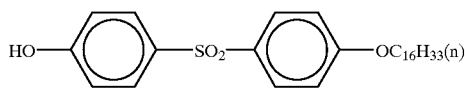

Compound represented by the formula [S-8]

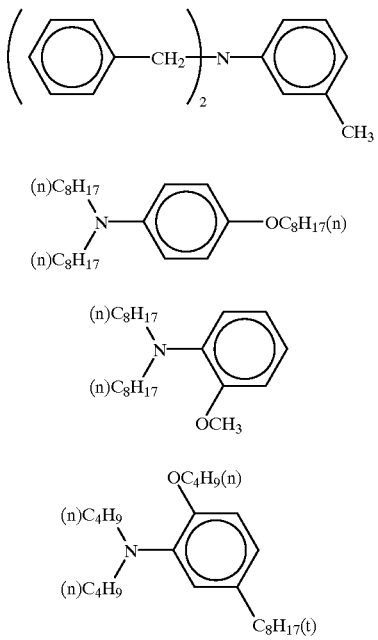

S-76

S-77

S-78

S-79

Compound represented by the formula [S-9]

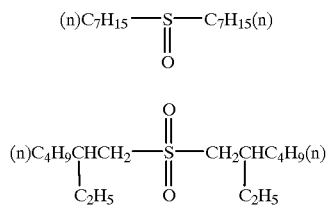

S-80

S-81

These high boiling point organic solvents may be used alone or in combination of two or more. Examples of the combination include a combination of tricresyl phosphate and dibutyl phthalate, a combination of trioctyl phosphate and di(2-ethylhexyl) cebacate.

Examples of the high boiling point organic solvents, other than the above-mentioned examples, and/or examples of methods of synthesizing these high boiling point organic solvents are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-Nos. 276,319A, 286,253A, 289,820A, 309,158A, 309,159A, 309,160A, 509, 311A and 510,576A, East Germany Patent Nos. 147,009, 157,147, 159,573 and 225,240A, GB-2,091,124A, JP-A No. Nos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946 and 4-346338, and so on.

In the present invention, it is possible to use the high boiling point organic solvent and a low boiling point organic solvent. The low boiling point organic solvent is an organic solvent having a boiling point of 150° C. or lower (usually, about 30° C. or higher) at normal pressure. Preferred examples thereof include esters (for example, ethyl acetate, butyl acetate, ethyl propionate, β-ethoxyethyl acetate, and methylcellosolve acetate), alcohols (for example, isopropyl alcohol, n-butyl alcohol, and sec-butyl alcohol), ketones (for example, methyl isobutyl ketone, methyl ethyl ketone, and cyclohexanone), amides (for example, dimethylformamide, and N-methylpyrrolidone), and ethers(for example, tetrahydrofuran and dioxane).

Emulsification and dispersion can be performed by dispersing an oil phase wherein the oil-soluble dye is dissolved in the high boiling point organic solvent, or a mixed solvent of the high boiling point organic solvent and the low boiling point organic solvent, into a water-based phase based on the water-based medium to form oily droplets (dispersed particles).

In general, the oily droplets (dispersed particles) are formed by adding the above-mentioned oil phase to the above-mentioned water-based phase. A so-called phase inversion emulsification, wherein the water-based phase is added to the oil phase, can be preferably used.

At the time of the emulsification and dispersion, if necessary, it is allowable to add additives such as a surfactant, a wetting agent, a dye stabilizer, an emulsion stabilizer, an antiseptic and an antifungal agent, described below, into at least one of the above-mentioned water-based phase and the above-mentioned oil phase.

Examples of the surfactant include anionic surfactants such as aliphatic acid salts, alkyl sulfate salts, alkylbenzenesulfonic acid salts, alkylnaphthalenesulfonic acid salts, dialkylsulfosuccinic acid salts, alkyl phosphate salts, naphthalenesulfonic acid formalin condensate, polyoxyethylenealkylsulfate salts and the like; nonionic surfactants such as polyoxyethylene alkyl ether, polyoxyethylenealkyl allyl ether, polyoxyethylene aliphatic acid esters, sorbitan aliphatic acid esters, polyoxyethylenesorbitan aliphatic acid esters, polyoxyethylenealkylamine, glycerin aliphatic acid esters, and oxyethyleneoxypropylene block copolymers; SURFYNOLS (made by Air Products & Chemicals), which is an acetylene type polyoxyethyleneoxide surfactant; amineoxide type amphoteric surfactants such as N,N-dimethyl-N-alkylamineoxide; and surfactants described in JP-A No.59-157,636 pp. 37–38 and Research Disclosure No. 308119 (1989).

In the present invention, a water-soluble polymer, together with one or more of these surfactants, can be added to attain stabilization immediately after emulsification.

Examples of the water-soluble polymer include polyvinyl alcohol, polyvinylpyrrolidone, polyethyleneoxide, polyacrylic acid, polyacrylamide, and copolymers thereof. Natural water-soluble polymers such as polysaccharide, casein and gelatin are also preferable.

When the oil-soluble dye is dispersed by the emulsification and dispersion to prepare the water-based ink, it is particularly important to control the size of particles thereof. In order to improve color purity and density when an image is formed by ink jet recording, it is essential to make the average particle size of the dispersed particles in the coloring composition small. Volume average particle size is preferably 100 nm or less, and more preferably from 1 to 50 nm.

It has been found that the presence of coarse particles plays a very important role in printing performance. That is, it has been found that by blocking of nozzles of a printing head with coarse particles or forming of stains without blocking of nozzles, no ink jetting of an ink jet printing ink or uneven ink jetting is caused, which has a serious effect on printing performance. To prevent this problem, it is preferred that the number of particles having a size of 5 µm or more is set to 10 or less and that the number of particles having a size of 1 µm or more is set to 1000 or less, in 1 µl of the ink-jet ink that is produced.

As a method for removing the coarse particles, known centrifugal separation, precise filtration or the like can be used. The separating method may be performed immediately after the emulsification and dispersion, or performed after adding respective additives, for example, the wetting agent and the surfactant, to the emulsified and dispersed product just before charging the ink into an ink cartridge.

As an effective means for making the average particle size of the dispersed particles in the dye dispersed solution small or removing the coarse particles, an emulsifying and dispersing machine in which mechanical stirring is performed is preferably used.

As the emulsifying and dispersing machine, there can be used known machines, such as a simple stirrer, or an impeller stirring type, in-line stirring type, mill type (for example, colloid mill), or ultrasound wave type machine. In the present invention, a high-pressure emulsification and dispersion machine is preferred. A high-pressure homogenizer is particularly preferred.

Detailed mechanism of the high-pressure homogenizer is described in U.S. Pat. No. 4,533,254, JP-A No. 6-47264 and the like. Examples of commercially available homogenizers include GAULIN HOMOGENIZER (made by A. P. V Gaulin Inc.), MICROFLUIDIZER (made by Microfluidex Inc.) and ALTIMIZER (made by Sugino Machine Co., Ltd.). A high-pressure homogenizer having a mechanism for preparing particles in a super-high-pressure jet flow, as described in U.S. Pat. No. 5,720,551, is particularly effective for the emulsification and dispersion of the present invention. An example of the emulsifying and dispersing machine using the super-high-pressure jet flow is DeBEE 2000 (Bee International Ltd.).

The pressure when the emulsifying and dispersing machine is used to carry out emulsification and dispersion is preferably 50 MPa or more (500 bar or more), more preferably 60 MPa or more (600 bar or more), and still more preferably 180 MPa or more (1800 bar or more).

In the present invention, it is particularly preferred that two or more emulsifying machines are used, utilizing, for example, a method of emulsifying raw materials with a stirring emulsifier and putting a resultant emulsion in a high-pressure homogenizer. It is also preferred to emulsify raw materials with such an emulsifier, and put the resultant emulsion into the high-pressure homogenizer after the addition of additives such as the wetting agent and the surfactant thereto, before the charging of the ink-jet ink to be produced into the cartridge.

In a case that both the high boiling point organic solvent and the low boiling point organic solvent are emulsified and dispersed, it is preferred to remove almost all of the low boiling point organic solvent, in view of stability of the emulsion, safety and health.

As a method for removing almost all of the low boiling point solvent, it is possible to adopt any one of various known methods such as evaporation, vacuum evaporation, and ultrafiltration, depending on the type of the low boiling point solvent. The low boiling point solvent is preferably removed as early as possible after the emulsification.

Although the coloring composition of the present invention can be used in various fields, it can be used preferably for writing aqueous ink, aqueous printing ink, information-recording ink etc., particularly preferably for the ink-jet ink according to the present invention described below.

Ink-Jet Ink

The ink-jet ink of the present invention contains the coloring composition of the present invention, and contains other components which are appropriately selected as needed.

Examples of the other components are known additives such as drying preventing agents, penetration accelerators, ultraviolet light absorbers, antioxidants, anti-fungal agents, pH adjusters, surface tension adjusting agents, anti-foaming agents, viscosity adjusting agents, dispersion aids, dispersion stabilizers, anti-rusting agents, chelating agents, and the like.

The drying preventing agent is suitably used for the purpose of preventing clogging due to the ink-jet ink drying at the ink jetting opening of the nozzle used in the ink jet recording method.

The drying preventing agent is preferably a water soluble organic solvent having a vapor pressure which is less than that of water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylol propane, and the like; lower alkyl ethers of polyhydric alcohols such as ethylene glycol monomethyl (or ethyl) ether, diethylene glycol monomethyl (or ethyl) ether, triethylene glycol monoethyl (or butyl) ether or the like; heterocyclics such as 2-pyrrolidone, N-methyl-2-pyrrolidone, 1,3-dimethyl-2-imidazolidinone, N-ethylmorpholine and the like; sulfur-containing compounds such as sulfolane, dimethylsulfoxide, 3-sulfolene and the like; polyfunctional compounds such as diacetone alcohol, diethanol amine, and the like; and urea derivatives.

Among these, polyhydric alcohols such as glycerin, diethylene glycol and the like are preferable. A single type of drying preventing agent may be used, or two or more types may be used in combination.

The amount of the drying preventing agent contained in the ink-jet ink is preferably 10 to 50% by mass.

The penetration accelerator is preferably used for the purpose of better penetration of the ink-jet ink into paper. Examples of the penetration accelerator include alcohols such as ethanol, isopropanol, butanol, di(tri)ethylene glycol monobutyl ether, 1,2-hexanediol and the like; sodium lauryl sulfate, sodium oleate, nonionic surfactants, and the like.

The penetration accelerator is contained in a range which does not cause bleeding of the printed characters or print through. If the penetration accelerator is contained in the ink-jet ink in an amount of 5 to 30% by mass, sufficient effects will usually be exhibited.

The UV light absorber is used for the purpose of improving the storability of images.

Examples of the UV light absorber are the benzotriazole compounds disclosed in JP-A Nos. 58-185677, 61-190537, 2-782, 5-197075, 9-34057, and the like; the benzophenone compounds disclosed in JP-A Nos. 46-2784, 5-194483, U.S.

Pat. No. 3,214,463 and the like; the cinnamic acid compounds disclosed in JP-B Nos. 48-30492 and 56-21141, JP-A No. 10-88106 and the like; the triazine compounds disclosed in JP-A Nos. 4-298503, 8-53427, 8-239368, 10-182621, Japanese National Publication No. 8-501291, and the like; the compounds disclosed in Research Disclosure No. 24239; and compounds that absorb ultraviolet light and emit fluorescent light (so-called fluorescent whitening agents) such as stilbene compounds and benzooxazole compounds.

Antioxidants are used for the purpose of improving the storability of images.

For example, any of various types of organic color fading preventing agents and metal complex color fading preventing agents can be used as the antioxidant.

Examples of organic color fading preventing agents are hydroquinones, alkoxyphenols, dialkoxyphenols, phenols, anilines, amines, indanes, chromans, alkoxyanilines, heterocyclics, and the like.

Examples of metal complex color fading preventing agents include nickel complexes and zinc complexes. Specific examples include the compounds disclosed in Research Disclosure No. 17643 (VII, I through J), Research Disclosure No. 15162, Research Disclosure No. 18716 (page 650, left column), Research Disclosure No. 36544 (page 527), Research Disclosure No. 307105 (page 872), the compounds disclosed in the patents cited in Research Disclosure No. 15162, and the compounds included in the compound examples and general formulas of representative compounds disclosed on pages 127 through 137 of JP-A No. 62-215272.

Examples of the anti-fungal agent are sodium dehydroacetate, sodium benzoate, sodium pyridinethion-1-oxide, ethyl p-hydroxybenzoate, 1,2-benzoisothiazoline-3-on, and salts thereof. It is preferable to use the anti-fungal agent in the ink in an amount of 0.02 to 1.00% by mass.

Examples of the pH adjuster include hydroxides of alkali metals such as lithium hydroxide and potassium hydroxide; carbonates such as sodium carbonate and sodium hydrogencarbonate; inorganic bases such as potassium acetate, sodium silicate and disodium phosphate; and organic bases such as N-methyldiethanolamine and triethanolamine.

Examples of the surface tension adjusting agent include nonionic, cationic and anionic surfactants. For example, any surfactant that can be used in the above-mentioned emulsification and dispersion can be used. The surfactant used herein preferably has a solubility in water of 0.5% or more at 25° C.

As the dispersion aid and the dispersion stabilizer, the above-mentioned cationic, anionic and nonionic surfactants are preferred.

Examples of the antifoaming agent include fluorine-containing compounds, silicone type compounds, and chelate agents, a typical example of which is EDTA.

The pH of the ink-jet ink is preferably from 6 to 10 and more preferably from 7 to 10 from the viewpoint of improvement in preservation stability.

The surface tension of the ink-jet ink is preferably from 20 to 60 mN/m, and more preferably from 25 to 45 mN/m.

The viscosity of the ink-jet ink is preferably 30 mPa·s or less and more preferably 20 mPa·s or less.

The ink-jet ink of the present invention is favorably used in the following ink jet recording method of the present invention.

Ink Jet Recording Method

In the ink jet recording method, the ink-jet ink of the present invention is used to record an image on an image-receiving material. Ink nozzles and so on used at this time are not particularly limited, and can be appropriately selected depending on the purpose of recording.

Image-receiving Material

The type of the image-receiving material is not limited. This material is any known material on which images are formed. Examples thereof include plain paper; resin-coated paper; ink jet exclusive paper as described in, for example, JP-A Nos. 8-169172, 8-27693, 2-276670, 7-276789, 9-323475, 62-238783, 10-153989, 10-217473, 10-235995, 10-337947, 10-217597, 10-337947 and the like; films; paper that can also used for electrophotography; cloth; glass; metals; and ceramics.

In the present invention, recording paper and recording films comprising an image-receiving layer on a support are particularly preferred among the above-mentioned image-receiving materials.

Examples of the support include chemical pulp such as LBKP, NBKP and the like; mechanical pulp such as GP, PGW, RMP, TMP, CTMP, CMP, CGP, and the like; and used paper pulp such as DIP or the like. If needed, known pigments, binders, sizing agents, fixing agents, cationic agents, paper strength reinforcing agents and the like may be mixed in with the pulp. The support may be formed by using any type of machine such as a fourdrinier machine, a cylinder machine, or the like.

The support may be a synthetic paper, a plastic film sheet or the like.

The thickness of the support is preferably about 10 to 250 $\mu$m, and the weight thereof is preferably 10 to 250 g/m$^2$.

The image-receiving layer, as well as the backcoat layer which is selected as needed, may be directly laminated onto the support. Alternatively, the image-receiving layer and the backcoat layer may be provided after subjected to size pressing or coating of an undercoat layer by using starch, polyvinyl alcohol or the like.

The support may be subjected to flattening processing by a calendar device such as a machine calendar, a TG calendar, a soft calendar or the like.

Among the substrates, paper whose both surfaces are laminated with polyolefin (e.g., polyethylene, polystyrene, polyethyleneterephthalate, polybutene, and copolymers thereof), and plastic film are preferable. It is more preferable to include in the polyolefin a white pigment (e.g., titanium oxide, zinc oxide) or a hue providing dye (e.g., cobalt blue, ultramarine blue, neodium oxide).

The image-receiving layer includes a pigment, water based binder, mordant, water-proofing agent, light-resistance improving agent, surfactant, and other additives.

As the pigment, a white pigment is preferable.

Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate, and the like; and organic pigments such as styrene pigments, acrylic pigments, urea resins, melamine resins and the like.

Among these, porous inorganic pigments are preferable, and synthetic amorphous silica whose pores have a large surface area is particularly preferable.

Either silicic anhydride obtained by a dry-type production method or a hydrated silicic acid obtained by a wet-type production method can be used as the synthetic amorphous silica. However, hydrated silicic acid is particularly preferable.

Examples of the water based binder include water soluble polymers such as polyvinyl alcohol, silanol modified polyvinyl alcohol, starch, cationic starch, casein, gelatin, carboxymethyl cellulose, hydroxyethyl cellulose, polyvinylpyrrolidone, polyalkylene oxide, polyalkylene oxide derivatives and the like; water dispersible polymers such as styrene—butadiene latex, acrylic emulsions, and the like; and the like.

One type of water based binder may be used, or two or more types may be used in combination.

Among these, polyvinyl alcohol and silanol modified polyvinyl alcohol are preferable from the standpoints of adhesion to the pigment and separation-resistance of the image-receiving layer.

The mordant is preferably immobilized, and thus, a polymer mordant is preferable.

Examples of polymer mordants are disclosed in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236, and U.S. Pat. Nos. 2,484,430, 2,548,564, 3,148,061, 3,309,690, 4,115,124, 4,124,386, 4,193,800, 4,273,853, 4,282,305, and 4,450,224. The polymer mordants disclosed on pages 212 to 215 of JP-A No. 1-161236 are suitably used. It is preferable to use these polymer mordants because images having excellent image quality are obtained and light-resistance of the images is improved.

The water-proofing agent is used for the purpose of making the images waterproof.

Cationic resins are preferable as the water-proofing agent.

Examples of the cationic resin include polyamide-polyamine epichlorohydrine, polyethyleneimine, polyaminesulfone, dimethyldiallyl ammonium chloride polymer, cationic polyacrylamide, and the like. Among these cationic resins, polyamidepolyamine epichlorohydrine is particularly preferable.

The contained amount of the cationic resin is preferably 1 to 15% by mass, and more preferably 3 to 10% by mass, with respect to the total solid content of the image-receiving layer.

Examples of the light-resistance improving agent are zinc sulfate, zinc oxide, hindered amine antioxidants, benzotriazole ultraviolet light absorbers such as benzophenone, and the like. Among these, zinc sulfate is particularly preferable.

The surfactant functions as a coating aid, a detachability improving agent, a slippage improving agent, and an antistatic agent.

Examples of the surfactants are disclosed in JP-A Nos. 62-173463 and 62-183457.

Organic fluoro compounds may be used instead of the surfactant.

It is preferable that the organic fluoro compounds are hydrophobic.

Examples of the organic fluoro compounds are fluorine based surfactants, oily fluorine-based compounds (e.g., fluorine oil), and solid fluorine based compound resins (e.g., tetrafluoroethylene resin), as well as the compounds disclosed in JP-B No. 57-9053 (columns 8 through 17), and JP-A Nos. 61-20994 and 62-135826.

Examples of other additives are pigments dispersion aids, thickeners, anti-foaming agents, dyes, fluorescent whitening agents, preservatives, pH adjusting agents, matte agents, film hardeners, and the like. The image-receiving layer may be comprised of one layer or may be comprised of two or more layers.

The thickness of the image-receiving layer is preferably from 10 to 50 μm and more preferably from 20 to 40 μm.

The backcoat layer includes a white pigment, a water based binder and other components.

Examples of the white pigments are white inorganic pigments such as light-weight calcium carbonate, heavy-weight calcium carbonate, kaolin, talc, calcium sulfate, barium sulfate, titanium dioxide, zinc oxide, zinc sulfa de, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloysite, magnesium carbonate, magnesium hydroxide, and the like; and organic pigments such as styrene based plastic pigments, acrylic based plastic pigments, polyethylene, microcapsules, urea resins, melamine resins and the like.

Examples of the water based binder include water soluble polymers such as styrene/maleate salt copolymer, styrene/acrylate salt copolymer, polyvinyl alcohol, silanol modified polyvinyl alcohol, starch, cationized starch, casein, gelatin, carboxymethyl cellulose, hydroxyethyl cellulose, polyvinylpyrrolidone, and the like; water dispersible polymers such as styrene butadiene latex, acrylic emulsion, and the like; and the like.

Examples of the other components are anti-foaming agents, foaming suppressing agents, dyes, fluorescent whitening agents, preservatives, waterproofing agents, and the like.

A polymer latex may be added to each of the layers of the recording paper and the recording film.

The polymer latex is used for the purpose of improving the film properties such as stability of dimensions, prevention of curling, prevention of adhesion, prevention of cracking of the film, and the like.

Examples of the polymer latex are those disclosed in JP-A Nos. 62-245258, 62-1316648 and 62-110066. When a polymer latex having a low glass transition temperature (of 40° C. or less) is added to a layer including the mordant, cracking and curling of the layer can be prevented. Further, by adding a polymer latex having a high glass transition temperature to the backcoat layer, curling can be prevented.

The ink-jet ink of the present invention can be applied to any ink jet recording method. For example, the ink-jet ink of the present invention can be suitably used in a charge control method in which ink is discharged by utilizing electrostatic attraction; a drop on demand method (pressure pulse method) utilizing the vibration pressure of a piezo element; an acoustic ink jet method in which electric signals are converted to acoustic beams, the beams are applied to the ink, and the emission pressure is utilized so as to discharge the ink; a thermal ink jet (bubble jet) method in which the ink is heated to form air bubbles and the generated pressure is utilized; and the like.

The above ink jet recording methods include a method in which plural drops of an ink, which has a low density and is called a photoink, are expelled in small volumes; a method in which image quality is improved by using plural inks having substantially the same hue and different densities; and a method utilizing a colorless, transparent ink.

EXAMPLES

Examples of the present invention will be described hereinafter. The present invention is not limited to these examples. "Part(s)", "%" and "% solid content" indicate respectively "part(s) by mass", "% by mass" and "% solid content by mass" hereinafter unless specified otherwise.

Example 1

Production Example 1
Preparation of a Coloring Composition (B-1)

To a mixed solution of 4 parts of isopropyl alcohol, 6 parts of tert-butanol, 1.2 parts of the oil-soluble polymer (the above illustrative PA-14) (acid content: 2.07 mmol/g), and 0.8 parts of the oil-soluble dye (the above illustrative D-4) was slowly added 2 mol/L sodium hydroxide in an amount such that acid of a terminal dissociating vinyl polymer could be neutralized. Thereafter, the solution was heated to 80° C. and then 30 parts of water were added thereto while the solution was stirred. This solution was concentrated at 40° C. under reduced pressure to prepare a coloring composition having 15% solid content.

Hereinafter, this coloring composition is referred to as "B-1", as shown in Table 1.

Production Example 2
Preparation of a Coloring Composition (B-2)

A mixed solution of 3 parts of ethyl acetate, 0.5 parts of cyclohexanone, 1.4 parts of the oil-soluble polymer (the above illustrative PA-19) (acid content: 0.69 mmol/g), and 0.6 parts of the oil-soluble dye (the above illustrative D-53) was prepared. Also, a mixed solution of 2 mol/L sodium hydroxide in an amount such that acid of a terminal dissociating vinyl polymer could be neutralized, 15 parts of water, and 0.2 parts of bis(2-ethylhexyl) sodium sulfosuccinate was prepared. These two mixed solutions were combined, mixed and emulsified in a homogenizer. Thereafter, the solution was concentrated at 40° C. under reduced pressure to prepare a coloring composition having 20% solid content.

Hereinafter, this coloring composition is referred to as "B-2", as shown in Table 1.

Production Examples 3–10

Coloring compositions prepared by substantially the same process as in Production Example 1 are referred to as "B-3"-"B-8", as shown in Table 1. Coloring compositions prepared by substantially the same process as in Production Example 2 are referred to as "B-9" and "B-10", as shown in Table 1.

Production Example 11
Preparation of a Coloring Composition (B-11)

To a mixed solution of 4 parts of isopropyl alcohol, 6 parts of t-butanol, 1.2 parts of the oil-soluble polymer (the above illustrative PA-19) (acid content: 0.69 mmol/g), 0.5 parts of the oil-soluble dye (the above illustrative D-53) and 0.30 parts of the exemplified high boiling point organic solvent (S-2) was slowly added 2 mol/L sodium hydroxide in an amount such that acid of a terminal dissociating vinyl polymer could be neutralized. Thereafter, the solution was heated to 80° C. and then 30 parts of water were added thereto while the solution was stirred. This solution was concentrated at 40° C. under reduced pressure to prepare a coloring composition having 24% solid content.

Hereinafter, this coloring composition is referred to as "B-11", as shown in Table 1.

Production Example 12
Preparation of a Coloring Composition (B-12)

To a mixed solution of 4 parts of isopropyl alcohol, 6 parts of t-butanol, 1.2 parts of the oil-soluble polymer (the above illustrative PC-10) (sulfonic acid content: 0.08 mmol/g), 0.4 parts of the oil-soluble dye (the above illustrative D-53) and 0.4 parts of the exemplified high boiling point organic solvent (S-24) was slowly added 2 mol/L sodium hydroxide in an amount such that acid of a terminal dissociating vinyl polymer could be neutralized. Thereafter, the solution was heated to 80° C. and then 30 parts of water were added thereto while the solution was stirred. This solution was concentrated at 40° C. under reduced pressure to prepare a coloring composition having 24% solid content.

Hereinafter, this coloring composition is referred to as "B-12", as shown in Table 1.

TABLE 1

| Coloring composition No. | Oil-soluble polymer (1) | Molecular weight Mw | Acid content mmol/g | Dye (2) | (1):(2) | Solid content % by mass | Particle size nm |
|---|---|---|---|---|---|---|---|
| B-1  | PA-14 | 12500 | 2.07 | D-4  | 6:4 | 15 | 63 |
| B-2  | PA-19 | 24000 | 0.69 | D-53 | 7:3 | 20 | 43 |
| B-3  | PA-22 | 23000 | 1.39 | D-2  | 7:3 | 20 | 77 |
| B-4  | PA-26 | 18000 | 1.74 | D-5  | 6:4 | 15 | 51 |
| B-5  | PA-19 | 24000 | 0.69 | D-16 | 6:4 | 15 | 48 |
| B-6  | PA-36 | 52000 | 0.48 | D-17 | 6:4 | 15 | 59 |
| B-7  | PC-10 | 16000 | 0.08 | D-26 | 6:4 | 15 | 71 |
| B-8  | PC-10 | 16000 | 0.08 | D-96 | 7:3 | 20 | 70 |
| B-9  | PA-26 | 18000 | 1.74 | D-4  | 7:3 | 20 | 66 |
| B-10 | PA-28 | 31000 | 1.74 | D-53 | 7:3 | 20 | 53 |
| B-11 | PA-19 | 24000 | 0.69 | D-53 | *1) | 24 | 58 |
| B-12 | PC-10 | 16000 | 0.08 | D-53 | *2) | 30 | 57 |
| B-13 | PA-19 | 24000 | 0.69 | H-2  | 6:4 | 15 | 60 |

*1) (1):(2):(S-2) = 12:5:3
*2) (1):(2):(S-2):(S-24) = 3:1:0.5:0.5

The particle sizes in Table 1 are shown by volume average particle sizes (particle diameters), which were measured with MICROTRACK UPA150, made by Nikkiso Co., Ltd.

Production of a Sample 1

8 parts of diethylene glycol, 8 parts of glycerin, 5 parts of triethylene glycol monobutyl ether, 0.5 parts of hexaethylene glycol monododecyl ether sulfate sodium salt, 0.5 parts of bis(2-ethylhexyl) sodium sulfosuccinate and 36 parts of ion exchanged water were mixed with 42 parts of the coloring composition (B-1) prepared in Production Example 1. The mixture was filtered with a filter having a mesh of 0.45 μm to produce a sample 1 of a water-based ink-jet ink.

Production of Samples 2 to 12

The same as for sample 1 was performed except that the coloring composition (B-1) was replaced by each of the coloring compositions prepared in Production Examples 2–12, so as to produce samples 2–12 of ink-jet ink.

Production of a Sample 13

In 5.45 g of the exemplified high boiling point organic solvent (S-4), 13.6 g of the oil-soluble polymer (the above illustrative PA-19) (acid content: 0.69 mmol/g) and 50 ml of ethyl acetate: were dissolved 4.54 g of the oil-soluble dye (the above illustrative D-53) and 5.68 g of dioctyl sodium sulfosuccinate. Partway through the dissolving, 2 mol/L sodium hydroxide was added thereto in an amount such that acid of the oil-soluble polymer could be neutralized. To this solution was added 500 ml of deionized water while the solution was being stirred with a magnetic stirrer, to produce an oil-in-water type coarse particle dispersed product.

Next, this coarse particle dispersed product was passed 5 times through a MICROFLUIDIZER (made by Microfluidex Inc.) under a pressure of 60 MPa (600 bar), to perform pulverization. The resultant emulsion was put in a rotary evaporator to remove the solvent until a smell of ethyl acetate disappeared. To the thus obtained fine emulsion comprising the oil-soluble dye were added: 140 g of diethylene glycol, 50 g of glycerin, 7 g of SURFYNOL 465 (made by Air Product & Chemicals), and 900 ml of deionized water, to produce a sample 13 of an ink-jet ink.

Production of a Comparative Sample 1

To 6 parts of the following comparative dye (H-1) were added 10 parts of diethylene glycol, 8 parts of glycerin, 10 parts of tetraethylene glycol monobutyl ether, 1 part of diethanol amine and 65 parts of ion exchanged water. The mixture was filtered with a filter having a mesh of 0.2 μm to produce a comparative sample 1 of an ink-jet ink.

H-1

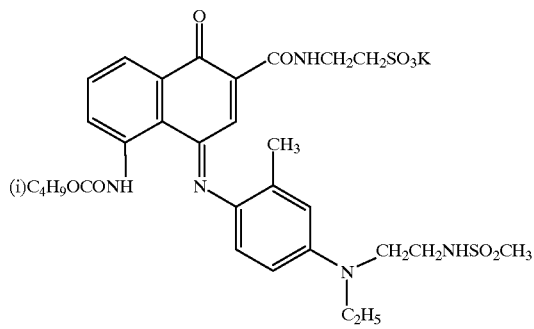

Production of a Comparative Sample 2

Using the following oil-soluble dye (H-2), a method similar to that of Production Example 1 was performed to produce a coloring composition (B-13).

Next, the same method as for producing the sample 1 was performed except that the coloring composition (B-1) was replaced by the coloring composition (B-13), to produce a comparative sample 2 of an ink-jet ink.

H-2

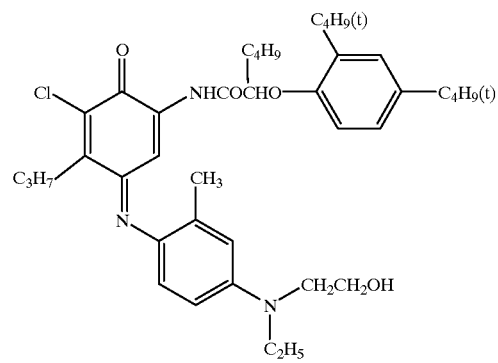

Image Recording and Evaluation

For the ink-jet ink of the above-mentioned Examples and Comparative Examples, the following evaluations were made. The results are shown in table 2.

In table 2, "Color tone", "Dependency on the kind of paper", "Water resistance", and "Light resistance" were items evaluated after an image was recorded on photo glossy paper (INK JET PAPER (PHOTO-GRADE), made by Fuji Photo Film Co., Ltd.), using each of the ink-jet ink and an ink jet printer (PM-700C, made by Seiko Epson Corp.).

a) Color Tone

The recorded image was evaluated as A (good) or B (bad) by visual observation.

b) Dependency on the Kind of Paper

The color tone of the image recorded on the photo glossy paper and that of an image recorded on plain paper for PPC were compared. Ink exhibiting a small difference between the two was evaluated as A (good), and ink exhibiting a large difference between the two was evaluated as B (bad).

c) Water Resistance

The photo glossy paper on which the image was recorded was dried at room temperature for 1 hour, and was then immersed in water for 30 seconds. The paper was naturally dried at room temperature, and bleeding was observed. Ink with no bleeding was ranked as A, and ink with slight bleeding was ranked as B. Ink with a lot of bleeding was ranked as C.

d) Light Resistance

Using a weather-meter (ATLAS C. 165), xenon light (85000 lx) was radiated on the photo glossy paper on which the image was recorded. A reflectance density meter (X-RITE 310TR) was used to measure image densities before and after the xenon radiation. From resultant values, a colorant survival rate was calculated. The light resistance of the ink was evaluated from the survival rate. The reflectance densities were measured at three points: 1, 1.5 and 2.0.

Ink having a colorant survival rate of 70% or more at each of the densities was ranked as A, and ink having a colorant survival rate of less than 70% at one or two of the densities was ranked as B. Ink having a colorant survival rate of less than 70% at each of the densities was ranked as C.

TABLE 2

| Sample No. | Coloring composition | Color tone | Dependency on the kind of paper | Water resistance | Light resistance | Notes |
| --- | --- | --- | --- | --- | --- | --- |
| Sample 1 | B-1 | A | A | A | A | Present invention |
| Sample 2 | B-2 | A | A | A | A | Present invention |
| Sample 3 | B-3 | A | A | A | A | Present invention |
| Sample 4 | B-4 | A | A | A | A | Present invention |
| Sample 5 | B-5 | A | A | A | A | Present invention |

TABLE 2-continued

| Sample No. | Coloring composition | Color tone | Dependency on the kind of paper | Water resistance | Light resistance | Notes |
|---|---|---|---|---|---|---|
| Sample 6 | B-6 | A | A | A | A | Present invention |
| Sample 7 | B-7 | A | A | A | A | Present invention |
| Sample 8 | B-8 | A | A | A | A | Present invention |
| Sample 9 | B-9 | A | A | A | A | Present invention |
| Sample 10 | B-10 | A | A | A | A | Present invention |
| Sample 11 | B-11 | A | A | A | A | Present invention |
| Sample 12 | B-12 | A | A | A | A | Present invention |
| Sample 13 | — | A | A | A | A | Present invention |
| Comparative sample 1 | — | A | B | B | B | Comparative Example |
| Comparative sample 2 | B-13 | B | B | B | B | Comparative Example |

As is evident from table 2, the ink-jet ink of the present invention has a particle size sufficiently small to serve as an ink-jet ink, excellent color developability, color tone, water resistance and light resistance, and no dependency on the kind of paper.

Example 2

Processes similar to that for producing the sample 2 in Example 1 were carried out to produce inks for the ink jet containing respectively the oil-soluble dye D-11, D-12, D-22, D-23, D-37, D-38, D-43, D-44, D-46, D-48, D-54, D-56, D-58, D-60, D-62, D-75, D-76 or D-100. The same were evaluated by the above-mentioned methods. As a result, results of the same form as those of Example 1 were obtained.

Example 3

Production of a Sample 101

In 3.41 g of the exemplified high boiling point organic solvent (S-2), 5.68 g of the exemplified high boiling point organic solvent (S-11) and 50 ml of ethyl acetate: were dissolved 4.54 g of the oil-soluble dye (the above illustrative D-53) and 5.68 g of dioctyl sodium sulfosuccinate at 70° C.

To this solution was added 500 ml of deionized water while the solution was being stirred with a magnetic stirrer, to produce an oil-in-water type coarse particle dispersed product.

Next, this coarse particle dispersed product was passed 5 times through a MICROFLUIDIZER (made by Microfluidex Inc.) under a pressure of 60 MPa (600 bar), to perform pulverization. The resultant emulsion was put in a rotary evaporator to remove the solvent until a smell of ethyl acetate disappeared.

To a thus obtained fine emulsion containing a hydrophobic dye were added 140 g of diethylene glycol, 50 g of glycerin, 7 g of SURFYNOL 465 (made by Air Product & Chemicals), and 900 ml of deionized water, to produce a sample 101 of an ink-jet ink.

Production of Samples 102 to 109

Samples 102 to 109 were produced in the same manner as for producing the sample 101 except that the oil-soluble dye (D-53) in the sample 101 was replaced by each of oil-soluble dyes shown in Table 3.

Production of a Comparative Sample 110

A comparative sample 110 was produced in the same manner as for producing the sample 101 except that the oil-soluble dye (D-53) in the sample 101 was replaced by the following compound (H-2).

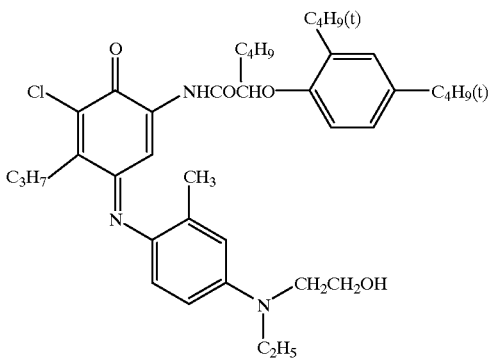

H-2

MICROTRACK UPA (made by Nikkiso Co., Ltd.) was used to measure volume average particle sizes of the thus obtained samples 101–110. Results are shown in Table 3.

Next, the ink samples 101–110, and a comparative sample (light cyan ink for EPSON PM-700C, made by Epson Co., Ltd.) were evaluated in the same manner in Example 1. Results are shown in Table 3.

TABLE 3

| Sample No. | Oil-soluble dye | Particle size (nm) | Dependency of the kind of paper | Water resistance | Light resistance | Notes |
|---|---|---|---|---|---|---|
| EPSON light cyan | — | — | A | B | B | Comparative Example |
| Sample 101 | D-53 | 48 | A | A | A | Present invention |
| Sample 102 | D-16 | 63 | A | A | A | Present invention |
| Sample 103 | D-17 | 71 | A | A | A | Present invention |
| Sample 104 | D-22 | 66 | A | A | A | Present invention |
| Sample 105 | D-4 | 72 | A | A | A | Present invention |
| Sample 106 | D-60 | 80 | A | A | A | Present invention |
| Sample 107 | D-61 | 101 | A | A | A | Present invention |
| Sample 108 | D-74 | 91 | A | A | A | Present invention |
| Sample 109 | D-75 | 52 | A | A | A | Present invention |
| Sample 110 | H-2 | 78 | B | B | B | Comparative Example |

As is evident from Table 3, the ink-jet ink of the present invention has excellent color developability, color tone, water resistance and light resistance, and little dependency on the kind of paper.

Example 4

The inks produced in Example 2 were charged into a cartridge of an ink jet printer BJ-F850 (made by Canon Co., Ltd.), and then images were printed on photo glossy paper GP-301 (made by Canon Co., Ltd.) with this printer. The same evaluations as in Example 2 were made to obtain results of the same form as those of Example 2.

What is claimed is:

1. An ink-jet ink comprising a coloring composition including an oil-soluble dye represented by following general formula (I):

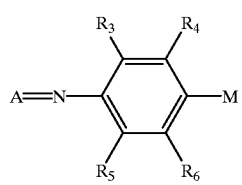

General formula (I)

wherein A represents a group represented by one of general formulae (IV) and (VI) to (XX), $R_3$–$R_6$ each independently represents a hydrogen atom or a first substituent selected from the group consisting of a halogen atom; an alkyl group; an alkenyl group; an aryl group; a heterocyclic group; a cyano group; a silyl group; a hydroxyl group; a nitro group; an alkoxy group; an aryloxy group; a heterocyclic oxy group; a silyloxy group; an acyloxy group; an alkoxycarbonyloxy group; an aryloxycarbonyloxy group; a carbamoyloxy group; a sulfamoyloxy group; an alkylsulfonyloxy group; an arylsulfonyloxy group; a carboxyl group; an acyl group; an alkoxycarbonyl group; an aryloxycarbonyl group; a carbamoyl group; an amino group; an anilino group; a heterocyclic amino group; a carbonamide group; a carbamoylamino group; an imide group; an alkoxycarbonylamino group; an aryloxycarbonylamino group; a sulfonamide group; a sulfamoylamino group; an azo group; an alkylthio group; an arylthio group; a heterocyclic thio group; an alkylsulfinyl group; an aryl sulfinyl group; an alkylsulfonyl group; an arylsulfonyl group; a sulfamoyl group; a sulfo group; a phosphonyl group; and a phosphonoylamino, and wherein the first substituent is unsubstituted or substituted with at least one substituent selected from the group consisting of the substituents from which the first substituent is chosen, M represents —OY or —N($R_7$)($R_8$), Y represents a hydrogen atom or a cation necessary for neutralizing charge of an oxygen ion, $R_7$ and $R_8$ each independently represents an alkyl group, aryl group, heterocyclic group, acyl group, alkylsulfonyl group, or arylsulfonyl group, $R_7$ and $R_8$ may be bonded to each other to form a ring, any of a pair $R_4$ and $R_7$ and a pair $R_6$ and $R_8$ may be bonded to each other to form a ring, and any of a pair $R_3$ and $R_4$ and a pair $R_5$ and $R_6$ may be bonded to each other to form a ring, and general formulae (IV) and (VI) to (XX) are as follows:

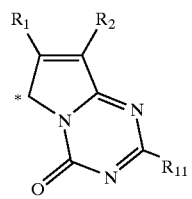

General formula (IV)

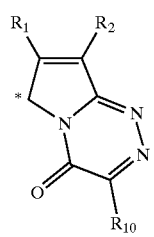

General formula (VI)

General formula (VII)
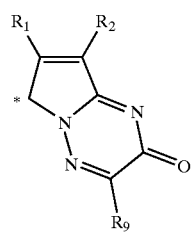
General formula (VIII)
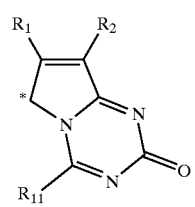
General formula (IX)
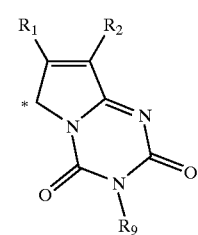
General formula (X)
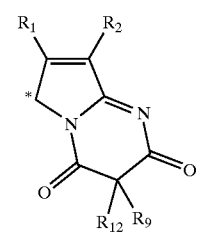
General formula (XI)
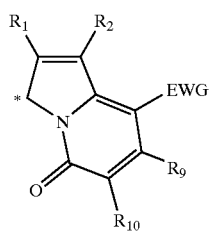
General formula (XII)
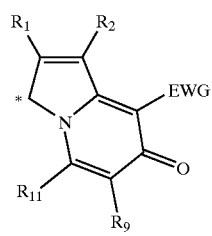
General formula (XIII)
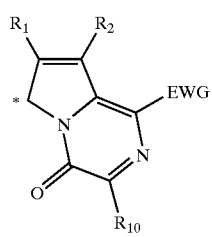
General formula (XIV)
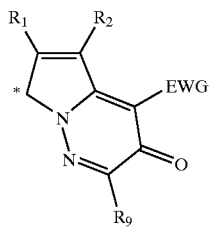
General formula (XV)
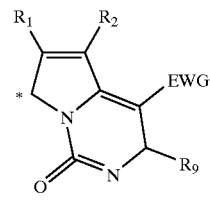
General formula (XVI)
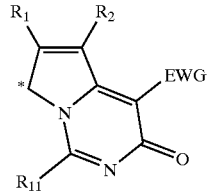
General formula (XVII)
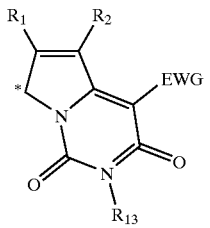
General formula (XVIII)
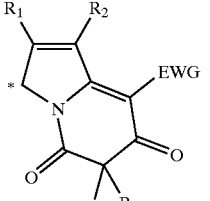
General formula (XIX)
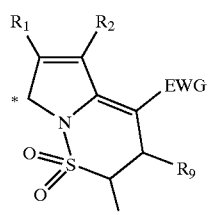
General formula (XX)
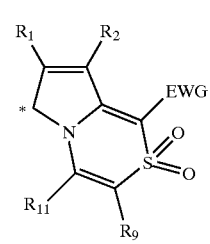

wherein $R_1$ and $R_9$–$R_{13}$ each independently represents a hydrogen atom or a second substituent selected from the group consisting of a halogen atom; an alkyl group; an alkenyl group; an aryl group; a heterocyclic group; a cyano group; a silyl group; a hydroxyl group; a nitro group; an alkoxy group; an aryloxy group; a heterocyclic oxy group; a silyloxy group; an acyloxy group; an alkoxycarbonyloxy group; an aryloxycarbonyloxy group; a carbamoyloxy group; a sulfamoyloxy group; an alkylsulfonyloxy group; an arylsulfonyloxy group; a carboxyl group; an acyl group; an alkoxycarbonyl group; an aryloxycarbonyl group; a carbamoyl group; an amino group; an anilino group; a heterocyclic amino group; a carbonamide group; a carbamoylamino group; an imide group; an alkoxycarbonylamino group; an aryloxycarbonylamino group; a sulfonamide group; a sulfamoylamino group; an azo group; an alkylthio group; an arylthio group; a heterocyclic thio group; an alkylsulfinyl group; an aryl sulfinyl group; an alkylsulfonyl group; an arylsulfonyl group; a sulfamoyl group; a sulfo group; a phosphonyl group; and a phosphonoylamino, and wherein the second substituent is unsubstituted or substituted with at least one substituent selected from the group consisting of the substituents from which the second substituent is chosen, EWG represents an electron-withdrawing group having a Hammett's substituent constant op value of 0.35 or more, and * represents a bonding position, and wherein $R_2$ represents a third substituent selected from the group consisting of a halogen atom; an alkyl group; an alkenyl group; an aryl group; a heterocyclic group; a cyano group; a silyl group; a hydroxyl group; a nitro group; an alkoxy group; an aryloxy group; a heterocyclic oxy group; a silyloxy group; an acyloxy group; an alkoxycarbonyloxy group; an aryloxycarbonyloxy group; a carbamoyloxy group; a sulfamoyloxy group; an alkylsulfonyloxy group; an arylsulfonyloxy group; a carboxyl group; an acyl group; an alkoxycarbonyl group; an aryloxycarbonyl group; a carbamoyl group; an amino group; an anilino group; a heterocyclic amino group; a carbonamide group; a carbamoylamino group; an imide group; an alkoxycarbonylamino group; an aryloxycarbonylamino group; a sulfonamide group; a sulfamoylamino group; an azo group; an alkylthio group; an arylthio group; a heterocyclic thio group; an alkylsulfinyl group; an aryl sulfinyl group; an alkylsulfonyl group; an arylsulfonyl group; a sulfamoyl group; a sulfo group; a phosphonyl group; and a phosphonoylamino, and wherein the third substituent is unsubstituted or substituted with at least one substituent selected from the group consisting of the substituents from which the third sustituent is chosen.

2. An ink-jet ink according to claim 1, wherein A in general formula (I) is a group represented by general formula (IV).

3. An ink-jet ink according to claim 1, wherein the oil-soluble dye represented by general formula (I) is dispersed in a water-based medium.

4. An ink-jet ink according to claim 3, wherein the oil-soluble dye represented by general formula (I) is dissolved in a high boiling point organic solvent having a boiling point of at least 150° C. and a dielectric constant of 3 to 12 before being dispersed in the water-based medium.

5. An ink-jet ink according to claim 3, wherein coloring particulates, which contain the oil-soluble dye represented by general formula (I) and an oil-soluble polymer, are dispersed in the water-based medium.

6. An ink-jet ink according to claim 5, wherein content of the oil-soluble polymer in the coloring composition is from 10 to 1000 mass parts, relative to 100 mass parts of the oil-soluble dye.

7. An ink-jet ink according to claim 5, further comprising a high boiling point organic solvent.

8. An ink-jet ink according to claim 7, wherein content of the high boiling point organic solvent in the coloring composition is from 1 to 1000 mass parts, relative to 100 mass parts of the oil-soluble dye.

9. An ink-jet ink according to claim 5, wherein, in the coloring particulates, the oil-soluble dye is dispersed in the oil-soluble polymer.

10. A coloring composition comprising an oil-soluble dye represented by following general formula (I):

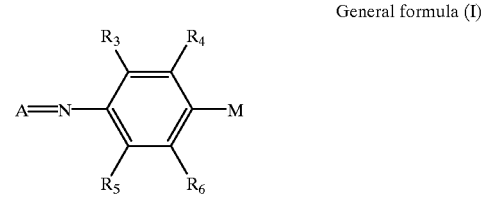

General formula (I)

wherein A represents a group represented by one of general formulae (IV) and (VI) to (XX), $R_3$–$R_6$ each independently represents a hydrogen atom or a first substituent selected from the group consisting of a halogen atom; an alkyl group; an alkenyl group; an aryl group; a heterocyclic group; a cyano group; a silyl group; a hydroxyl group; a nitro group; an alkoxy group; an aryloxy group; a heterocyclic oxy group; a silyloxy group; an acyloxy group; an alkoxycarbonyloxy group; an aryloxycarbonyloxy group; a carbamoyloxy group; a sulfamoyloxy group; an alkylsulfonyloxy group; an arylsulfonyloxy group; a carboxyl group; an acyl group; an alkoxycarbonyl group; an aryloxycarbonyl group; a carbamoyl group; an amino group; an anilino group; a heterocyclic amino group; a carbonamide group; a carbamoylamino group; an imide group; an alkoxycarbonylamino group; an aryloxycarbonylamino group; a sulfonamide group; a sulfamoylamino group; an azo group; an alkylthio group; an arylthio group; a heterocyclic thio group; an alkylsulfinyl group; an aryl sulfinyl group; an alkylsulfonyl group; an arylsulfonyl group; a sulfamoyl group; a sulfo group; a phosphonyl group; and a phosphonoylamino, and wherein the first substituent is unsubstituted or substituted with at least one substituent selected from the group consisting of the substituents from which the first substituent is chosen, M represents —OY or —N($R_7$)($R_8$), Y represents a hydrogen atom or a cation necessary for neutralizing charge of an oxygen ion, $R_7$ and $R_8$ each independently represents an alkyl group, aryl group, heterocyclic group, acyl group, alkylsulfonyl group, or arylsulfonyl group, $R_7$ and $R_8$ may be bonded to each other to form a ring, any of a pair $R_4$ and $R_7$ and a pair $R_6$ and $R_8$ may be bonded to each other to form a ring, and any of a pair $R_3$ and $R_4$ and a pair $R_5$ and $R_6$ may be bonded to each other to form a ring, and general formulae (IV) and (VI) to (XX) are as follows:

General formula (IV)
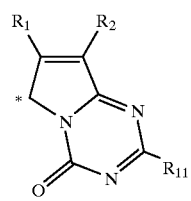
General formula (VI)
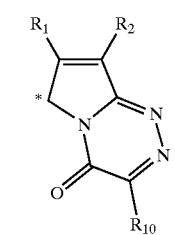
General formula (VII)
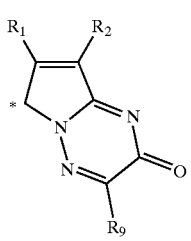
General formula (VIII)
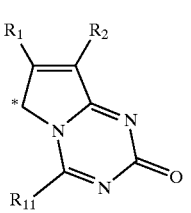
General formula (IX)
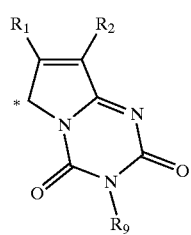
General formula (X)
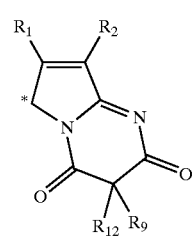
General formula (XI)
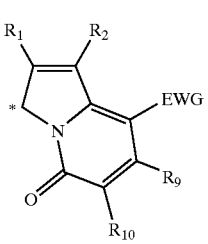
General formula (XII)
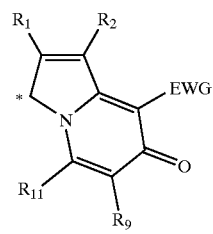
General formula (XIII)
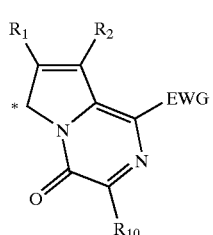
General formula (XIV)
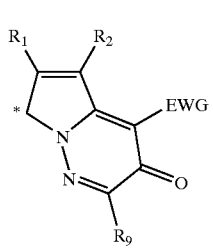
General formula (XV)
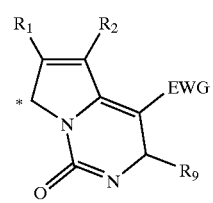
General formula (XVI)
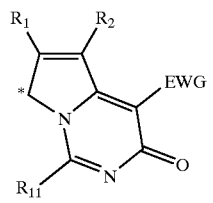
General formula (XVII)
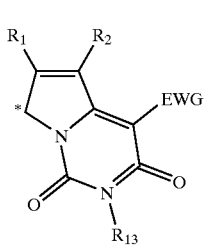
General formula (XVIII)
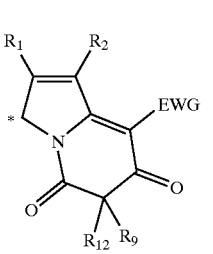

93

-continued

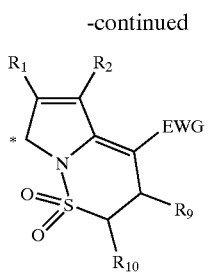

General formula (XIX)

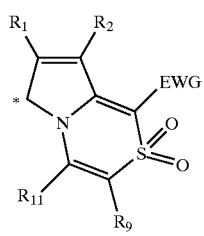

General formula (XX)

wherein $R_1$ and $R_9$–$R_{13}$ each independently represents a hydrogen atom or a second substituent selected from the group consisting of a halogen atom; an alkyl group; an alkenyl group; an aryl group; a heterocyclic group; a cyano group; a silyl group; a hydroxyl group; a nitro group; an alkoxy group; an aryloxy group; a heterocyclic oxy group; a silyloxy group; an acyloxy group;an alkylsulfonyloxy group; an aryloxycarbonyloxy group; a carbamoyloxy group; a sulfamoyloxy group; an alkylsulfonyloxy group; an arylsulfonyloxy group; a carboxyl group; an acyl group; an alkoxycarbonyl group; an aryloxycarbonyl group; a carbamoyl group; an amino group; an anilino group; a heterocyclic amino group; a carbonamide group; a carbamoylamino group; an imide group; an alkoxycarbonylamino group; an aryloxycarbonylamino group; a sulfonamide group; a sulfamoylamino group; an azo group; an alkylthio group; an arylthio group; a heterocyclic thio group; an alkylsulfinyl group; an aryl sulfinyl group; an alkylsulfonyl group; an arylsulfonyl group; a sulfamoyl group; a sulfo group; a phosphonyl group; and a phosphonoylamino, and wherein the second substituent is unsubstituted or substituted with at least one substituent selected from the group consisting of the substituents from which the second substituent is chosen, EWG represents an electron-withdrawing group having a Hammett's substituent constant op value of 0.35 or more, and * represents a bonding position, and wherein $R_2$ represents a third substituent selected from the group consisting of a halogen atom; an alkyl group; an alkenyl group; an aryl group; a heterocyclic group; a cyano group; a silyl group; a hydroxyl group; a nitro group; an alkoxy group; an aryloxy group; a heterocyclic oxy group; a silyloxy group; an acyloxy group; an alkoxycarbonyloxy group; an aryloxycarbonyloxy group; a carbamoyloxy group; a sulfamoyloxy group; an alkylsulfonyloxy group; an arylsulfonyloxy group; a carboxyl group; an acyl group; an alkoxycarbonyl group; an aryloxycarbonyl group; a carbamoyl group; an amino group; an anilino group; a heterocyclic amino group; a carbonamide group; a carbamoylamino group; an imide group; an alkoxycarbonylamino group; an aryloxycarbonylamino group; a sulfonamide group; a sulfamoylamino group; an azo group; an alkylthio group; an arylthio group; a heterocyclic thio group; an alkylsulfinyl group; an aryl sulfinyl group; an alkylsulfonyl group; an arylsulfonyl group; a sulfamoyl group; a sulfo group; a phosphonyl group; and a

94 phosphonoylamino, and wherein the third substituent is unsubstituted or substituted with at least one substituent selected from the group consisting of the substituents from which the third substituent is chosen.

11. A coloring composition according to claim 10, wherein said coloring composition is used for an ink composition.

12. An ink jet recording method wherein recording is performed using an ink-jet ink that includes a coloring composition including an oil-soluble dye represented by following general formula (I):

General formula (I)

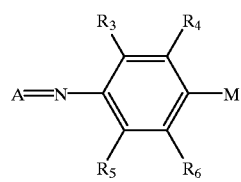

wherein A represents a group represented by one of general formulae (IV) and (VI) to (XX), $R_3$–$R_6$ each independently represents a hydrogen atom or a first substituent selected from the group consisting of a halogen atom; an alkyl group; an alkenyl group; an aryl group; a heterocyclic group; a cyano group; a silyl group; a hydroxyl group; a nitro group; an alkoxy group; an aryloxy group; a heterocyclic oxy group; a silyloxy group; an acyloxy group; an alkoxycarbonyloxy group; an aryloxycarbonyloxy group; a carbamoyloxy group; a sulfamoyloxy group; an alkylsulfonyloxy group; an arylsulfonyloxy group; a carboxyl group; an acyl group; an alkoxycarbonyl group; an aryloxycarbonyl group; a carbamoyl group; an amino group; an anilino group; a heterocyclic amino group; a carbonamide group; a carbamoylamino group; an imide group; an alkoxycarbonylamino group; an aryloxycarbonylamino group; a sulfonamide group; a sulfamoylamino group; an azo group; an alkylthio group; an arylthio group; a heterocyclic thio group; an alkylsulfinyl group; an aryl sulfinyl group; an alkylsulfonyl group; an arylsulfonyl group; a sulfamoyl group; a sulfo group; a phosphonyl group; and a phosphonoylamino, and wherein the first substituent is unsubstituted or substituted with at least one substituent selected from the group consisting of the substituents from which the first substituent is chosen, M represents —OY or —N($R_7$)($R_8$), Y represents a hydrogen atom or a cation necessary for neutralizing charge of an oxygen ion, $R_7$ and $R_8$ each independently represents an alkyl group, alkyl group, heterocyclic group, acyl group, alkylsulfonyl group, or arylsulfonyl group, $R_7$ and $R_7$ may be bonded to each other to form a ring, any of a pair $R_4$ and $R_7$ and a pair $R_6$ and $R_8$ may be bonded to each other to form a ring, any of a pair $R_3$ and $R_4$ and a pair $R_5$ and $R_6$ may be bonded to each other to form a ring and general formulae (IV) and (VI) to (XX) are as follows:

General formula (IV)

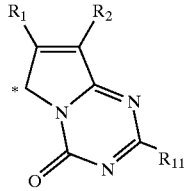

General formula (VI)
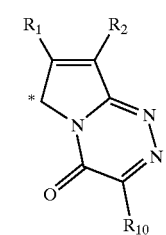
General formula (VII)
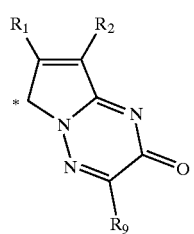
General formula (VIII)
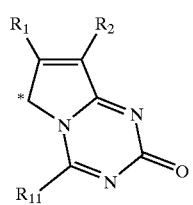
General formula (IX)
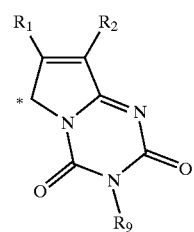
General formula (X)
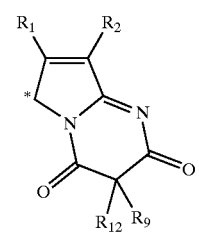
General formula (XI)
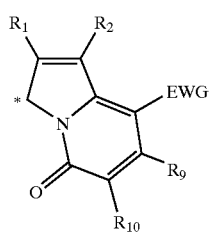
General formula (XII)
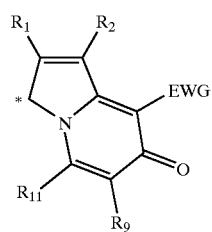
General formula (XIII)
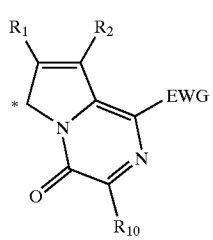
General formula (XIV)
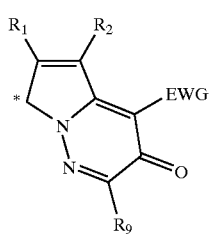
General formula (XV)
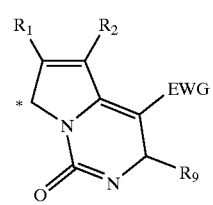
General formula (XVI)
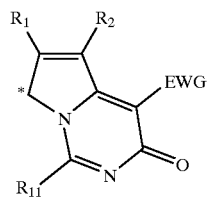
General formula (XVII)
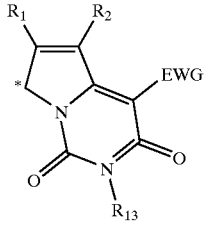
General formula (XVIII)
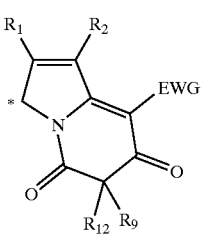
General formula (XIX)
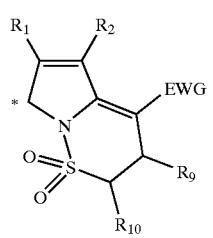

-continued

General formula (XX)

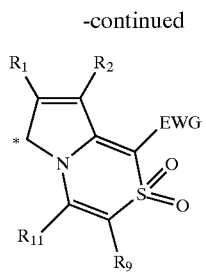

wherein $R_1$ and $R_9$–$R_{13}$ each independently represents a hydrogen atom or a second substituent selected from the group consisting of a halogen atom; an alkyl group; an alkenyl group; an aryl group; a heterocyclic group; a cyano group; a silyl group; a bydroxyl group; a nitro group; an alkoxy group; an aryloxy group; a heterocyclic oxy group; a silyloxy group; an acyloxy group; an alkoxycarbonyloxy group; an aryloxycarbonyloxy group; a carbamoyloxy group; a sulfamoyloxy group; an alkylsulfonyloxy group; an arylsulfonyloxy group; a carboxyl group; an acyl group; an alkoxycarbonyl group; an aryloxycarbonyl group; a carbamoyl group; an amino group; an anilino group; a heterocyclic amino group; a carbonamide group; a carbamoylamino group; an imide group; an alkoxycarbonylamino group; an aryloxycarbonylamino group; a sulfonamide group; a sulfamoylamino group; an azo group; an alkylthio group; an arylthio group; a heterocyclic thio group; an alkylsulfinyl group; an aryl sulfinyl group; an alkylsulfonyl group; an arylsulfonyl group; a sulfamoyl group; a sulfo group; a phosphonyl group; and a phosphonoylamino, and wherein the second substituent is unsubstituted or substituted with at least one substituent selected from the substituents from which the second substituent is chosen, EWG represents an electron-withdrawing group having a Hammett's substituent constant op value of 0.35 or more, and * represents a bonding position, and wherein $R_2$ represents a third substituent selected from the group consisting of a halogen atom; an alkyl group; an alkenyl group; an aryl group; a heterocyclic group; a cyano group; a silyl group; a hydroxyl group; a nitro group; an alkoxy group; an aryloxy group; a heterocyclic oxy group; a silyloxy group; an acyloxy group; an alkoxycarbonyloxy group; an aryloxycarbonyloxy group; a carbamoyloxy group; a sulfamoyloxy group; an alkylsulfonyloxy group; an arylsulfonyloxy group; a carboxyl group; an acyl group; an alkoxycarbonyl group; an aryloxycarbonyl group; a carbamoyl group; an amino group; an anilino group; a heterocyclic amino group; a carbonamide group; a carbamoylamino group; an imide group; an alkoxycarbonylamino group; an aryloxycarbonylamino group; a sulfonamide group; a sulfamoylamino group; an azo group; an alkylthio group; an arylthio group; a heterocyclic thio group; an alkylsulfinyl group; an aryl sulfinyl group; an alkylsulfonyl group; an arylsulfonyl group; a sulfamoyl group; a sulfo group; a phosphonyl group; and a phosphonoylamino, and wherein the third substituent is unsubstituted or substituted with at least one substituent selected from the substituents from which the third substituent is chosen.

13. An ink jet recording method according to claim 12, wherein A in general formula (I) is a group represented by general formula (IV).

14. An ink jet recording method according to claim 12, wherein the oil-soluble dye represented by general formula (I) is dispersed in a water-based medium.

15. An ink jet recording method according to claim 14, wherein the oil-soluble dye represented by general formula (I) is dissolved in a high boiling point organic solvent having a boiling point of at least 150° C. and a dielectric constant of 3 to 12 before being dispersed in the water-based medium.

16. An ink jet recording method according to claim 14, wherein coloring particulates, which contain the oil-soluble dye represented by general formula (I) and an oil-soluble polymer, are dispersed in the water-based medium.

17. An ink jet recording method according to claim 16, further comprising a high boiling point organic solvent.

18. An ink jet recording method according to claim 16, wherein, in the coloring particulates, the oil-soluble dye is dispersed in the oil-soluble polymer.

* * * * *